US012529984B2

(12) United States Patent
Samei et al.

(10) Patent No.: US 12,529,984 B2
(45) Date of Patent: Jan. 20, 2026

(54) HEATING DEVICE, FIXING DEVICE, AND IMAGE FORMING APPARATUS

(71) Applicants: Masahiro Samei, Osaka (JP); Takayuki Andoh, Kanagawa (JP); Kota Shiodera, Tokyo (JP); Hiroshi Yoshinaga, Chiba (JP); Toshiyuki Kabata, Kanagawa (JP); Tomoyuki Nishikawa, Saitama (JP); Yuusuke Furuichi, Kanagawa (JP); Hiroyuki Shimada, Tokyo (JP); Arinobu Yoshiura, Kanagawa (JP)

(72) Inventors: Masahiro Samei, Osaka (JP); Takayuki Andoh, Kanagawa (JP); Kota Shiodera, Tokyo (JP); Hiroshi Yoshinaga, Chiba (JP); Toshiyuki Kabata, Kanagawa (JP); Tomoyuki Nishikawa, Saitama (JP); Yuusuke Furuichi, Kanagawa (JP); Hiroyuki Shimada, Tokyo (JP); Arinobu Yoshiura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 22 days.

(21) Appl. No.: 18/607,588

(22) Filed: Mar. 18, 2024

(65) Prior Publication Data

US 2024/0319642 A1 Sep. 26, 2024

(30) Foreign Application Priority Data

Mar. 23, 2023 (JP) ................................ 2023-046731

(51) Int. Cl.
*G03G 15/20* (2006.01)

(52) U.S. Cl.
CPC ..... *G03G 15/2053* (2013.01); *G03G 15/2064* (2013.01)

(58) Field of Classification Search
CPC .......... G03G 15/2017; G03G 15/2053; G03G 2215/2003
See application file for complete search history.

(56) References Cited

U.S. PATENT DOCUMENTS

2008/0292374 A1* 11/2008 Hiraoka ............... G03G 15/206 399/328
2011/0142483 A1 6/2011 Oomoto et al.
(Continued)

FOREIGN PATENT DOCUMENTS

JP 2010-134133 A 6/2010
JP 2014-232308 A 12/2014
(Continued)

OTHER PUBLICATIONS

U.S. Appl. No. 18/225,158, filed Jul. 24, 2023.
Extended European Search Report issued Aug. 12, 2024 in European Patent Application No. 24163192.8, 8 pages.

*Primary Examiner* — Thomas S Giampaolo, II
(74) *Attorney, Agent, or Firm* — XSENSUS LLP

(57) ABSTRACT

A heating device includes a rotator, a heater, lubricant, a rotator support, and a cover. The rotator has an internal space inside a loop of the rotator. The rotator has an internal space inside a loop of the rotator. The heater heats the rotator. The lubricant is applied to an inner circumferential surface of the rotator. The rotator support supports an end of the rotator in a longitudinal direction of the rotator. The rotator support has a first opening communicating with the internal space of the rotator and penetrating through the rotator support to extend in the longitudinal direction. The cover covers the first opening and has a second opening communicating between the internal space of the rotator and an external space outside the cover.

20 Claims, 32 Drawing Sheets

(56) References Cited

U.S. PATENT DOCUMENTS

| | | | | |
|---|---|---|---|---|
| 2014/0178091 | A1* | 6/2014 | Sugiyama .......... | G03G 15/2028 399/92 |
| 2018/0259888 | A1 | 9/2018 | Mitsui | |
| 2023/0297010 | A1 | 9/2023 | Daisuke et al. | |
| 2023/0297011 | A1 | 9/2023 | Shiodera et al. | |
| 2023/0297015 | A1 | 9/2023 | Hiroshi et al. | |
| 2023/0297026 | A1 | 9/2023 | Andoh et al. | |
| 2023/0300269 | A1 | 9/2023 | Andoh et al. | |
| 2023/0305451 | A1 | 9/2023 | Sugiyama et al. | |
| 2023/0324838 | A1 | 10/2023 | Masahiro et al. | |
| 2023/0350329 | A1 | 11/2023 | Toshiyuki et al. | |
| 2024/0004329 | A1 | 1/2024 | Yoshinaga et al. | |
| 2024/0319640 | A1* | 9/2024 | Kabata ............... | G03G 15/2039 |
| 2024/0319641 | A1* | 9/2024 | Andoh ............... | G03G 15/2053 |

FOREIGN PATENT DOCUMENTS

| | | | |
|---|---|---|---|
| JP | 2015-169810 | A | 9/2015 |
| JP | 2016-224145 | A | 12/2016 |
| JP | 2017-009911 | A | 1/2017 |
| JP | 2018-112719 | A | 7/2018 |
| JP | 2021-071607 | A | 5/2021 |

* cited by examiner

FIG. 6
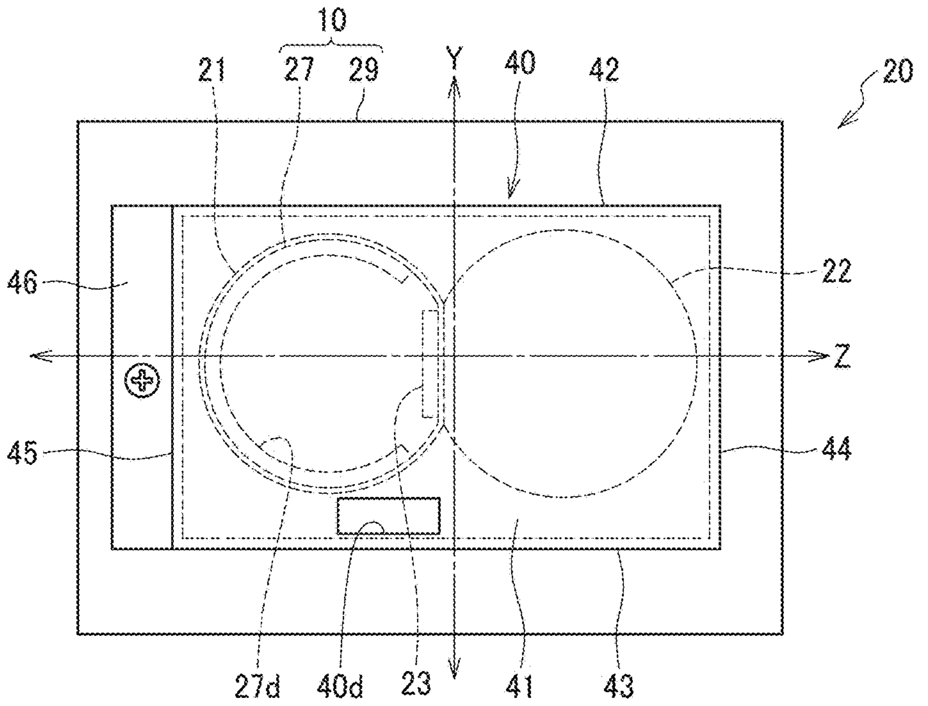
FIG. 7
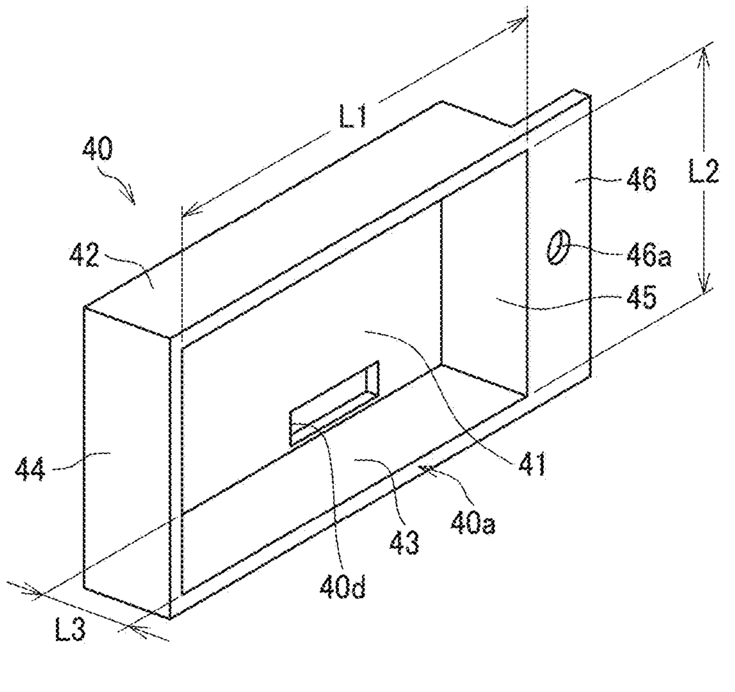
FIG. 8
| | NUMBER OF FP/UFP [PARTICLES/10min] |
|---|---|
| COMPARATIVE EXAMPLE | $A \times 10^{11}$ |
| PRESENT EMBODIMENT | $0.54 \times A \times 10^{11}$ |

HEATING DEVICE, FIXING DEVICE, AND IMAGE FORMING APPARATUS

CROSS-REFERENCE TO RELATED APPLICATION

This patent application is based on and claims priority pursuant to 35 U.S.C. § 119(a) to Japanese Patent Application No. 2023-046731, filed on Mar. 23, 2023, in the Japan Patent Office, the entire disclosure of which is hereby incorporated by reference herein.

BACKGROUND

Technical Field

Embodiments of the present disclosure generally relate to a heating device, a fixing device, and an image forming apparatus.

Related Art

One type of image forming apparatus such as a copier or a printer includes a fixing device that is a heating device heating a recording medium such as a sheet bearing an unfixed image to fix the unfixed image onto the recording medium.

Such a fixing device typically includes a rotator such as a belt and lubricant such as oil or grease applied to the inner face of the rotator in order to reduce sliding friction when the rotator rotates. The lubricant refers to a substance that is interposed between components to reduce frictional resistance between the components.

SUMMARY

This specification describes an improved heating device that includes a rotator, a heater, lubricant, a rotator support, and a cover. The rotator has an internal space inside a loop of the rotator. The heater heats the rotator. The lubricant is applied to an inner circumferential surface of the rotator. The rotator support supports an end of the rotator in a longitudinal direction of the rotator. The rotator support has a first opening communicating with the internal space of the rotator and penetrating through the rotator support to extend in the longitudinal direction. The cover covers the first opening and has a second opening communicating between the internal space of the rotator and an external space outside the cover.

This specification also describes a fixing device including the heating device and an image forming apparatus including the heating device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 6 is a side view of the fixing device illustrated in FIG. 5, as viewed from the left side of FIG. 5;

FIG. 7 is a perspective view of a cover of the fixing device according to the first embodiment of the present disclosure;

FIG. 8 is a table listing the results of tests in which the numbers of fine particles including ultrafine particles (FP/UFP) discharged from a fixing device of a comparative example to the outside of the fixing device and the number of the FP/UFP discharged from the fixing device according to the first embodiment of the present disclosure to the outside of the fixing device were measured;

Figure 1:
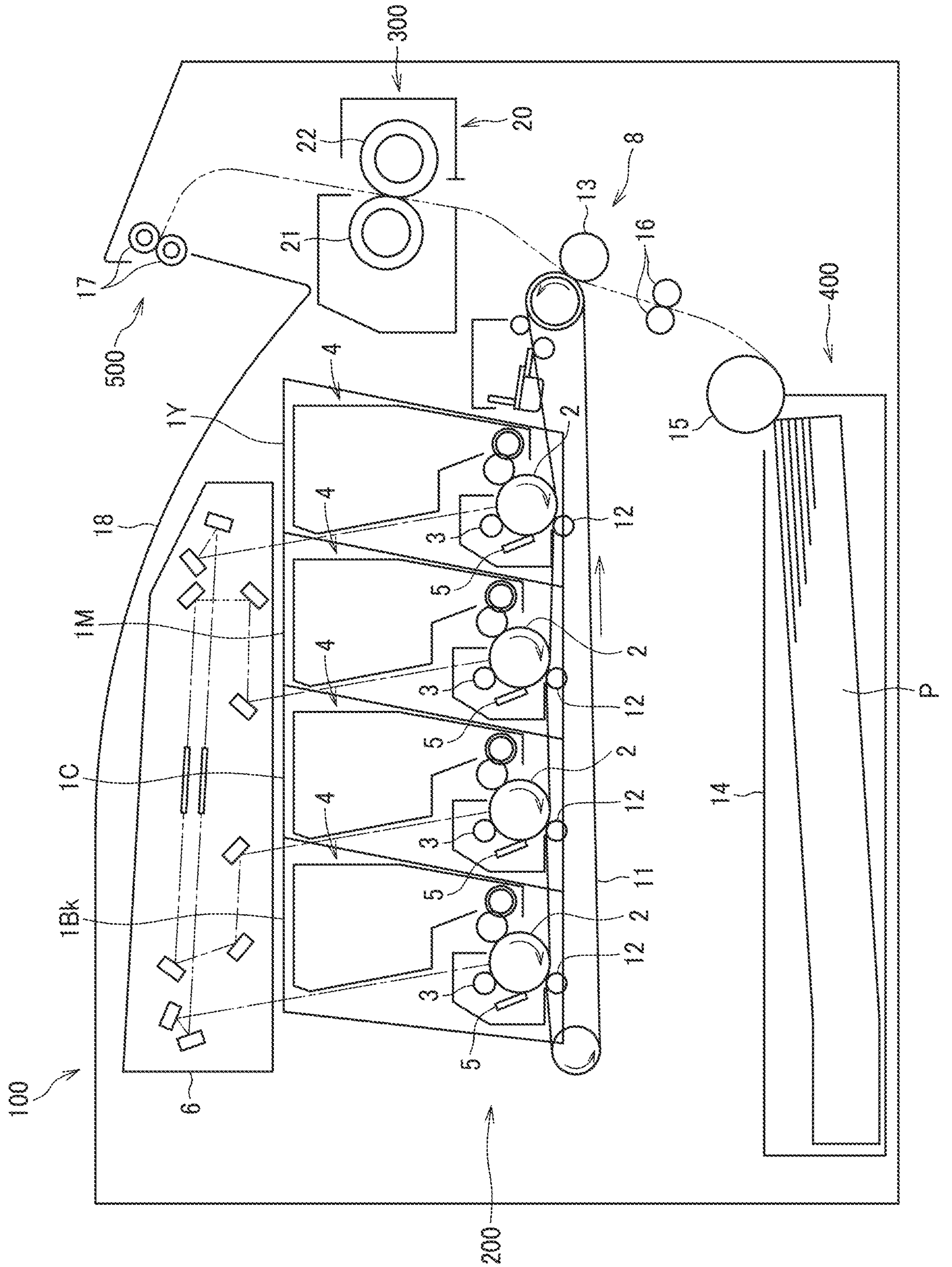
FIG. 1 is a schematic diagram of a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

With reference to drawings, descriptions are given below of embodiments of the present disclosure. In the drawings illustrating embodiments of the present disclosure, elements or components having identical or similar functions or shapes are given similar reference numerals as far as distinguishable, and redundant descriptions are omitted.

With reference to the accompanying drawings, descriptions are given below of embodiments of the present disclosure. In the drawings for illustrating embodiments of the present disclosure, like reference signs denote like elements, and overlapping description may be simplified or omitted as appropriate.

FIG. 1 is a schematic diagram of a configuration of an image forming apparatus according to an embodiment of the present disclosure. In the following description, the "image forming apparatus" includes a printer, a copier, a facsimile machine, or a multifunction peripheral having at least two of printing, copying, scanning, and facsimile functions. "Image formation" means the formation of images with meanings such as characters and figures and the formation of images with no meanings such as patterns. Initially, with reference to FIG. 1, a description is given below of the overall configuration and operation of an image forming apparatus 100 according to the present embodiment.

As illustrated in FIG. 1, the image forming apparatus 100 according to the present embodiment includes an image forming section 200 to form an image on a sheet-shaped recording medium such as a sheet, a fixing section 300 to fix the image onto the recording medium, a recording medium feeder 400 to feed the recording medium to the image forming section 200, and a recording medium ejection section 500 to eject the recording medium to an outside of the image forming apparatus 100.

The image forming section 200 includes four process units 1Y, 1M, 1C, and 1Bk as image forming units, an exposure device 6 to form an electrostatic latent image on a photoconductor 2 in each of the process units 1Y, 1M, 1C, and 1Bk, and a transfer device 8 to transfer an image onto the recording medium.

The process units 1Y, 1M, 1C, and 1Bk have the same configuration except for containing different color toners (developers), i.e., yellow (Y), magenta (M), cyan (C), and black (Bk) toners, respectively, corresponding to decomposed color separation components of a full-color image. Specifically, each of the process units 1Y, 1M, 1C, and 1Bk includes the photoconductor 2 serving as an image bearer bearing the image on the surface of the image bearer, a charger 3 to charge the surface of the photoconductor 2, a developing device 4 to supply the toner as the developer to the surface of the photoconductor 2 to form a toner image, and a cleaner 5 to clean the surface of the photoconductor 2.

The transfer device 8 includes an intermediate transfer belt 11, primary transfer rollers 12, and a secondary transfer roller 13. The intermediate transfer belt 11 is an endless belt stretched by a plurality of support rollers. Four primary transfer rollers 12 are disposed inside the loop of the intermediate transfer belt 11. Each of the primary transfer rollers 12 is in contact with the corresponding photoconductor 2 via the intermediate transfer belt 11 to form a primary transfer nip between the intermediate transfer belt 11 and each photoconductor 2. The secondary transfer roller 13 is in contact with the outer circumferential surface of the intermediate transfer belt 11 to form a secondary transfer nip.

The fixing section 300 includes a fixing device 20 as a heating device that heats the recording medium bearing the transferred image. The fixing device 20 includes a fixing belt 21 and a pressure roller 22. The fixing belt 21 heats the image on the recording medium. The pressure roller 22 contacts the fixing belt 21 to form an area of contact, called a fixing nip, between the fixing belt 21 and the pressure roller 22.

The recording medium feeder 400 includes a sheet tray 14 to store sheets P as recording media and a feed roller 15 to feed the sheet P from the sheet tray 14. Although a "recording medium" is described as a "sheet of paper" (referred to simply as "sheet") in the following description, the "recording medium" is not limited to the sheet of paper. Examples of the "recording medium" include not only a sheet of paper but also an overhead projector (OHP) transparency sheet, a fabric, a metallic sheet, a plastic film, and a prepreg sheet including carbon fibers previously impregnated with resin. Examples of the "sheet" include thick paper, a postcard, an envelope, thin paper, coated paper (e.g., coat paper and art paper), and tracing paper, in addition to plain paper.

The recording medium ejection section 500 includes an output roller pair 17 to eject the sheet P to the outside of the image forming apparatus 100 and an output tray 18 to place the sheet P ejected by the output roller pair 17.

To provide a fuller understanding of the embodiments of the present disclosure, a description is now given of printing operations of the image forming apparatus 100 according to the present embodiment, with continued reference to FIG. 1.

When the image forming apparatus 100 starts the printing operations, the photoconductors 2 in the process units 1Y, 1M, 1C, and 1Bk and the intermediate transfer belt 11 in the transfer device 8 start rotating. The feed roller 15 starts rotating to feed the sheet P from the sheet tray 14. The sheet P fed from the sheet tray 14 is brought into contact with a timing roller pair 16 and temporarily stopped until the image forming section 200 forms the image to be transferred to the sheet P.

In each of the process units 1Y, 1M, 1C, and 1Bk, the charger 3 uniformly charges the surface of the photoconductor 2 at a high electric potential. Based on image data of a document read by a document reading device or print data instructed to print by a terminal, the exposure device 6 exposes the charged surface of each of the photoconductors 2. As a result, the electric potential at an exposed portion on the surface of each of the photoconductors 2 is decreased. Thus, an electrostatic latent image is formed on the surface of each of the photoconductors 2. The developing device 4 supplies toner to the electrostatic latent image formed on the photoconductor 2 to form the toner image on the photoconductor 2. The toner images formed on the photoconductors 2 reach the primary transfer nips defined by the primary transfer rollers 12 with the rotation of the photoconductors 2 and are transferred onto the intermediate transfer belt 11 rotated counterclockwise in FIG. 1 successively such that the toner images are superimposed on the intermediate transfer belt 11, forming a full-color toner image thereon. Thus, the full-color toner image is formed on the intermediate transfer belt 11. The image forming apparatus 100 can form a monochrome toner image by using any one of the four process units 1Y, 1M, 1C, and 1Bk, or can form a bicolor toner image or a tricolor toner image by using two or three of the process units 1Y, 1M, 1C, and 1Bk. After the toner image is transferred to the intermediate transfer belt 11, the cleaner 5 removes the residual toner that remains on the photoconductor 2 from the surface of the photoconductor 2.

In accordance with the rotation of the intermediate transfer belt 11, the toner image transferred onto the intermediate transfer belt 11 is conveyed to the secondary transfer nip (the position of the secondary transfer roller 13) and is transferred onto the sheet P conveyed by the timing roller pair 16. The sheet P bearing the toner image is conveyed to the fixing device 20. In the fixing device 20, the fixing belt 21 and the pressure roller 22 apply heat and pressure to the toner image on the sheet P to fix the toner image onto the sheet P. Then, the sheet P bearing the fixed toner image is conveyed to the recording medium ejection section 500. In the recording medium ejection section 500, the output roller pair 17 ejects the sheet P onto the output tray 18. Thus, a series of printing operations is completed.

Figure 2:
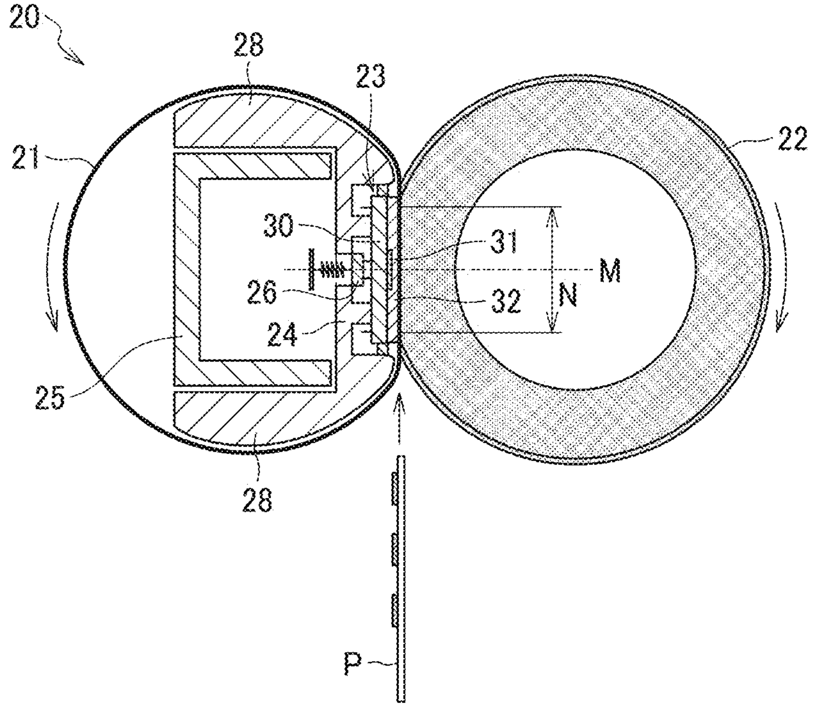
FIG. 2 is a cross-sectional view of a center portion of a fixing device according to an embodiment of the present disclosure.
Figure 3:
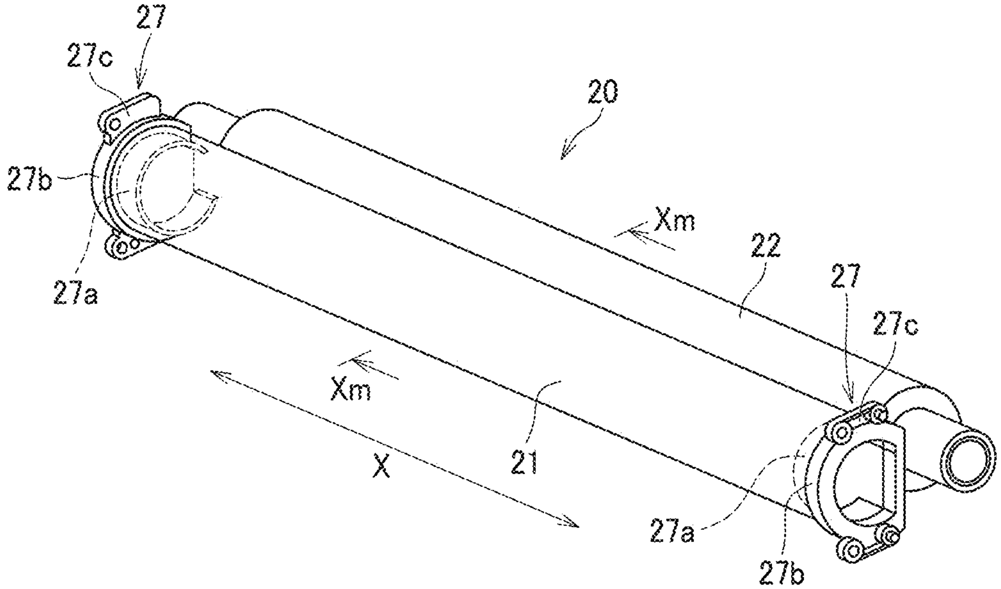
FIG. 3 is a perspective view of the fixing device of FIG. 2.

Subsequently, with reference to FIGS. 2 and 3, a description is given of a basic configuration of the fixing device 20 according to the present embodiment. FIG. 2 is a cross-sectional view of a center portion of the fixing device 20 according to the present embodiment, taken along a line Xm-Xm of FIG. 3 at the center of the fixing belt 21 in a longitudinal direction of the fixing belt 21. FIG. 3 is a perspective view of the fixing device 20 in the present embodiment. In the following description, the "longitudinal direction" of the fixing belt 21 means a direction orthogonal to the rotation direction of the fixing belt and along the outer circumferential surface of the fixing belt.

The above-described "longitudinal direction" of the fixing belt 21 is a direction indicated by a two-headed arrow X in FIG. 3 and a direction parallel with the rotation axis direction of the pressure roller 22 or the width direction of the sheet passing through the fixing nip between the fixing belt 21 and the pressure roller 22. The width direction of the sheet is a direction intersecting a sheet conveyance direction in which the sheet is conveyed.

As illustrated in FIG. 2, the fixing device 20 according to the present embodiment includes a heater 23, a heater holder 24, a stay 25, and temperature sensors 26 in addition to the fixing belt 21 and the pressure roller 22.

The fixing belt 21 is a rotator (specifically, a first rotator or a fixing rotator) that contacts a surface of the sheet P bearing unfixed toner to fix the unfixed toner (in other words, an unfixed image) onto the sheet P.

The fixing belt 21 is an endless belt including a base layer, an elastic layer, and a release layer successively layered from the inner circumferential surface to the outer circumferential surface. The base has, for example, a thickness of 30 μm to 50 μm and is made of metal such as nickel or stainless steel or resin such as polyimide. The elastic layer has a thickness of 100 μm to 300 μm and is made of rubber such as silicone rubber, silicone rubber form, or fluorine rubber. The elastic layer of the fixing belt 21 eliminates slight surface asperities of the fixing belt 21 at the fixing nip, thus facilitating uniform conduction of heat to the toner image on the sheet P. The release layer of the fixing belt 21 has a thickness of 10 μm to 50 μm and is made of, for example, tetrafluoroethylene-perfluoroalkylvinylether copolymer (PFA), polytetrafluoroethylene (PTFE), polyimide, polyetherimide, or polyether sulfide (PES). The release layer of the fixing belt 21 facilitates the separation of toner contained in the toner image on the sheet P from the fixing belt 21. In other words, the release layer of the fixing belt 21 facilitates the release of the toner from the fixing belt 21. To reduce the size and thermal capacity of the fixing belt 21, the fixing belt 21 preferably has a total thickness equal to or less than 1 mm and a loop diameter equal to or less than 30 mm.

Belt holders 27 illustrated in FIG. 3 are a pair of rotator holders and rotatably hold both end portions of the fixing belt 21 in the longitudinal direction. Both end portions of the fixing belt 21 in the longitudinal direction described above are not limited to both edges of the fixing belt 21, which are the most ends in the longitudinal direction of the fixing belt 21. Similarly, an "end portion" of the fixing belt 21 in the longitudinal direction, which is described below, is not limited to a longitudinal edge of the fixing belt 21, which is the most end in the longitudinal direction of the fixing belt 21. The end portion of the fixing belt 21 in the longitudinal direction includes, in addition to the longitudinal edge of the fixing belt 21, a position within a range having one-third of the length of the fixing belt 21 from the edge of the fixing belt 21 in the longitudinal direction of the fixing belt 21. Accordingly, the belt holder 27 may hold a portion of the fixing belt 21 that is not the longitudinal edge of the fixing belt 21 as the end portion of the fixing belt 21 in addition to the longitudinal edge of the fixing belt 21.

Specifically, the belt holder 27 includes an insertion 27*a*, a restraint 27*b*, and a fixed portion 27*c*. As illustrated in FIG. 3, the insertion 27*a* has a C-shape in the cross section and is inserted into the longitudinal end portion of the fixing belt 21. The restraint 27*b* has an outer diameter greater than that of the insertion 27*a*. The fixed portion 27*c* is fixed to a side plate described later. The restraint 27*b* has an outer diameter greater than that of at least the fixing belt 21 to restrain the deviation or movement of the fixing belt 21 in the longitudinal direction X. The insertion 27*a* has an outer diameter equal to or smaller than the inner diameter of the fixing belt 21 and is inserted into the longitudinal end portion of the fixing belt 21 to hold the inner circumferential surface of the fixing belt 21 such that the fixing belt 21 can rotate.

The pressure roller 22 is a rotator (specifically, a second rotator or counter rotator) disposed to face the outer circumferential surface of the fixing belt 21. The pressure roller 22 is a pressure rotator pressed against the outer circumferential surface of the fixing belt 21.

The pressure roller 22 is in contact with the outer circumferential surface of the fixing belt 21 to form the nip N between the pressure roller 22 and the fixing belt 21 to pass the sheet P.

Specifically, the pressure roller 22 includes a solid iron core, an elastic layer on an outer circumferential surface of the core, and a release layer resting on an outer circumferential surface of the elastic layer. The core may be hollow. The elastic layer is made of, for example, silicone rubber, silicone rubber form, or fluorine rubber. The release layer is made of a fluororesin such as PFA or PTFE.

The heater 23 heats the fixing belt 21. The heater 23 in the present embodiment as a heat source is a planar heater having a plate shape and including resistive heat generators 31. The heater 23 is disposed to contact the inner circumferential surface of the fixing belt 21. Power is supplied to the heater 23, and the resistive heat generators 31 generate heat. The heat is transferred to the fixing belt 21 to heat the fixing belt 21.

The heater holder 24 is a heat source holder to hold the heater 23 inside the loop of the fixing belt 21. Since the heater holder 24 is subject to temperature increase by heat from the heater 23, the heater holder 24 is made of a heat-resistant material. The heater holder 24 made of heat-resistant resin having low thermal conduction, such as a liquid crystal polymer (LCP), reduces heat transfer from the heater 23 to the heater holder 24 and provides efficient heating of the fixing belt 21. The heater holder 24 in the present embodiment includes a guide 28 to guide the fixing belt 21. The guide 28 has a guide face having an arc or a projected curve curving along the inner circumferential surface of the fixing belt 21. When the fixing belt 21 rotates, the guide face guides the fixing belt 21, and the fixing belt 21 slides on the guide face. In the present embodiment, the guide 28 is formed integrally with the heater holder 24 but may be formed separately.

The stay 25 is a reinforcement to reinforce the heater holder 24. The stay 25 supports a stay side face of the heater holder 24 opposite a nip side face of the heater holder 24.

the nip side face faces the pressure roller 22. Accordingly, the stay 25 prevents the heater holder 24 and the heater 23 from being bent (bent in a direction orthogonal to the longitudinal direction of the fixing belt 21, in particular) by the pressing force of the pressure roller 22. As a result, the fixing nip N having a uniform width is obtained. The stay 25 is preferably made of iron-based metal such as steel use stainless (SUS) or steel electrolytic cold commercial (SECC) to enhance the rigidity.

The temperature sensor 26 is a temperature detector that contacts the heater 23 and detects the temperature of the heater 23. The temperature sensor 26 in the present embodiment is disposed so as to be in contact with a surface of the heater 23 opposite a surface of the heater 23 facing the nip N. The temperature sensor 26 is not limited to the contact-type temperature sensor that contacts the heater 23. The temperature sensor 26 may be a non-contact-type temperature sensor that is disposed not to be in contact with the heater 23. The temperature sensor 26 may be, for example, a thermopile, a thermostat, a thermistor, or a non-contact-type (NC) temperature sensor.

Figure 4:
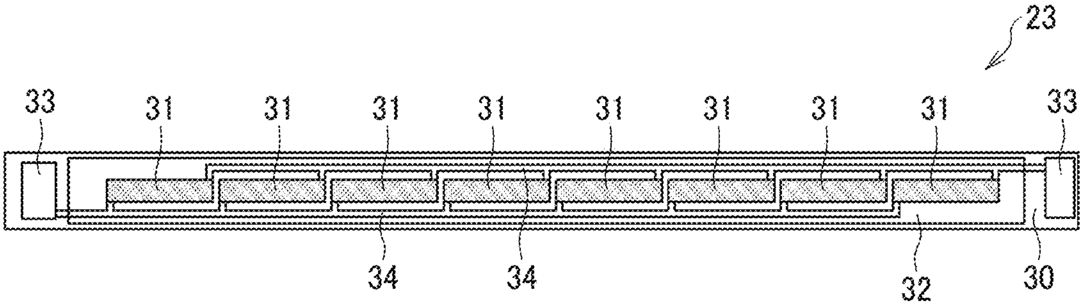
FIG. 4 is a plan view of a heater according to an embodiment of the present disclosure.

FIG. 4 is a plan view of the heater 23 according to the present embodiment.

As illustrated in FIG. 4, the heater 23 according to the present embodiment includes a base 30 having a plate shape, multiple resistive heat generators 31 disposed on the base 30, an insulation layer 32 covering the multiple resistive heat generators 31, and a pair of electrodes 33 connected to multiple heat generators 31 via power supply lines 34.

The base 30 is formed of a longitudinal plate extending in the lateral direction in FIG. 4. The base 30 is disposed such that the longitudinal direction of the base 30 is substantially parallel with the longitudinal direction X of the fixing belt 21 illustrated in FIG. 3. The material of the base 30 is preferably a nonmetallic material having excellent thermal resistance and insulating properties, such as glass, mica, or ceramic such as alumina or aluminum nitride. Interposing another insulation layer between the base 30 and the resistive heat generators 31 enables using a conductive material such as a metal material as the material of the base 30. Low-cost aluminum or stainless steel is favorable as the metal material of the base 30. To enhance the thermal uniformity of the heater 23 and image quality, the base 30 may be made of a material having high thermal conductivity, such as copper, graphite, or graphene.

The multiple resistive heat generators 31 function as a heat generation part to which the power is supplied to generate heat. The multiple resistive heat generators 31 are arranged at intervals in the longitudinal direction of the base 30. A gap between neighboring resistive heat generators 31 is preferably 0.2 mm or more, and is more preferably 0.4 mm or more from the viewpoint of maintaining the insulation between the neighboring resistive heat generators 31. In addition, the gap between the heat generators 31 adjacent to each other is preferably 5 mm or less, and is more preferably 1 mm or less from the viewpoint of reducing temperature unevenness across an area in the longitudinal direction because a too large gap between the heat generators 31 adjacent to each other easily causes a temperature drop in the gap. The resistive heat generator 31 is, for example, produced as below. Silver palladium (AgPd) and glass powder are mixed to make paste. The paste is screen-printed on the surface of the base 30. After the paste is screen-printed, the base 30 is subject to firing. Thus, the resistive heat generator 31 is produced. The material of the resistive heat generator 31 may contain a resistance material, such as silver alloy (e.g., AgPt) or ruthenium oxide (e.g., $RuO_2$).

The resistive heat generator 31 is coupled to the pair of electrodes 33 via the power supply lines 34.

In the present embodiment, one of the pair of electrodes 33 is disposed on one end of the base 30 in the longitudinal direction, and the other one of the pair of electrodes 33 is disposed on the other end of the base 30 in the longitudinal direction of the base 30. The resistive heat generators 31 are electrically coupled in parallel to the pair of electrodes 33. Connecting the connector as a power supply component to each of the electrodes 33 enables supplying power from a power supply to each resistive heat generator 31.

The insulation layer 32 covers the resistive heat generators 31 and power supply lines 34 to enhance durability and insulate the resistive heat generators 31 and power supply lines 34 from other parts. However, the insulation layer 32 does not cover the electrode 33 to expose the electrode 33 so as to be connected to the connector. The insulation layer 32 may be made of, for example, heat-resistant glass. Although the resistive heat generators 31, the electrodes 33, the power supply lines 34, and the insulation layer 32 are disposed on the side of the base 30 facing the fixing belt 21 (that is, the fixing nip N) in the present embodiment (see FIG. 2), the resistive heat generators 31, the electrodes 33, the power supply lines 34, and the insulation layer 32 may be disposed on the opposite side of the base 30, that is, the side facing the heater holder 24. In this case, since the heat of the resistive heat generators 31 is transmitted to the fixing belt 21 through the base 30, it is preferable that the base 30 be made of a material with high thermal conductivity such as aluminum nitride.

The heat source to heat the fixing belt 21 may be a radiant heat type heater such as a halogen heater, a carbon heater, or a ceramic heater, or an electromagnetic induction heating system, in addition to the planar heater 23 having the plate shape as in the present embodiment.

The fixing device 20 according to the present embodiment operates as follows.

When printing starts, a driver drives and rotates the pressure roller 22 in a direction indicated by an arrow in FIG. 2, and the rotation of the pressure roller 22 rotates the fixing belt 21. The power is supplied to the heater 23, and the heater 23 generates heat to heat the fixing belt 21. At this time, the temperature sensors 26 detect the temperatures of the heater 23, and a controller controls the heat generation amount of the heater 23 based on the detected temperatures so that the fixing belt 21 keeps a predetermined fixing temperature that can fix the toner image onto the sheet. The sheet P bearing the unfixed toner image is conveyed to the fixing nip N between the fixing belt 21 and the pressure roller 22, and the fixing belt 21 and the pressure roller 22 apply heat and pressure to the sheet P to fix the unfixed toner image onto the sheet P.

In the fixing device 20 according to the present embodiment, rotating the fixing belt 21 results in sliding the fixing belt 21 on the heater 23 and the guides 28 of the heater holder 24, which generates sliding friction between the fixing belt 21 and the heater 23 and sliding friction between the fixing belt 21 and the heater holder 24. To reduce such sliding friction, a lubricant such as silicone oil, silicone grease, fluorine grease, or fluorine oil is typically applied to the inner circumferential surface of the fixing belt 21 so that such a lubricant is interposed between the fixing belt 21 and the heater 23 and between the fixing belt 21 and the heater holder 24.

In the configuration in which the pair of belt holders 27 holds the fixing belt 21 as described above, rotating the fixing belt 21 also causes sliding friction between the fixing belt 21 and the belt holders 27. For this reason, the same lubricant as described above is interposed between each belt holder 27 and the fixing belt 21.

In the fixing device 20 using the lubricant as described above, when the heater 23 generates heat, the heat increases the temperature of the lubricant on the inner circumferential surface of the fixing belt 21, and thus fine particles may be generated from the lubricant. Specifically, a temperature rise of the lubricant on the inner circumferential surface of the fixing belt 21 volatilizes a part of the low-molecular components of the lubricant, and the volatilized components are cooled by air and aggregated. As a result, fine particles are generated. The "fine particles" described above and below mean fine particles including ultrafine particles (that are referred to as "FP/UFP" below) measured by an apparatus and conditions in conformity with the fine particles' standard of Blue Angel and mean particles having a particle size of 5.6 nm or more and 560 nm or less.

Currently, due to an increase in the awareness of environmental issues, the reduction of FP/UFP discharged from products has been desired. Developing the image forming apparatuses that reduce the generation of FP/UFP has been also desired.

Figure 65:
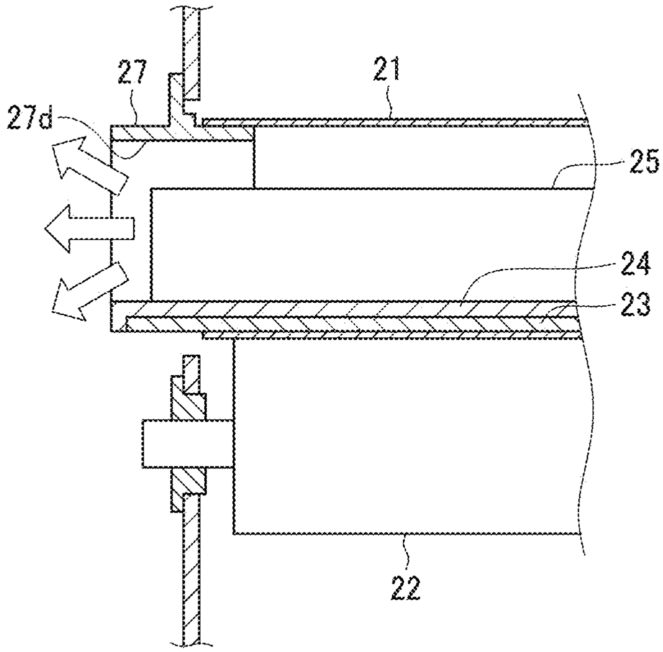
FIG. 65 is a cross-sectional view of an end portion of a fixing device in a longitudinal direction of the fixing device according to a comparative example.

However, as illustrated in FIG. 65, the belt holders 27 each having the C-shape in the cross section, or a tube shape hold both end portions of the fixing belt 21 in the longitudinal direction of the fixing belt 21. In the above-described configuration, an internal space inside the loop of the fixing belt 21 communicates with an external space of the fixing belt 21 through an opening 27*d* formed by a cylindrical wall of the belt holder 27. As a result, the FP/UFP generated from the lubricant inside the loop of the fixing belt 21 are discharged to the outside through the opening 27*d* of the belt holder 27 as indicated by arrows in FIG. 65.

In the embodiments of the present disclosure, the following countermeasures are taken to reduce the amount of FP/UFP discharged to the outside. A configuration of a first embodiment of the present disclosure is described below with reference to FIGS. 5 to 7.

Figure 5:
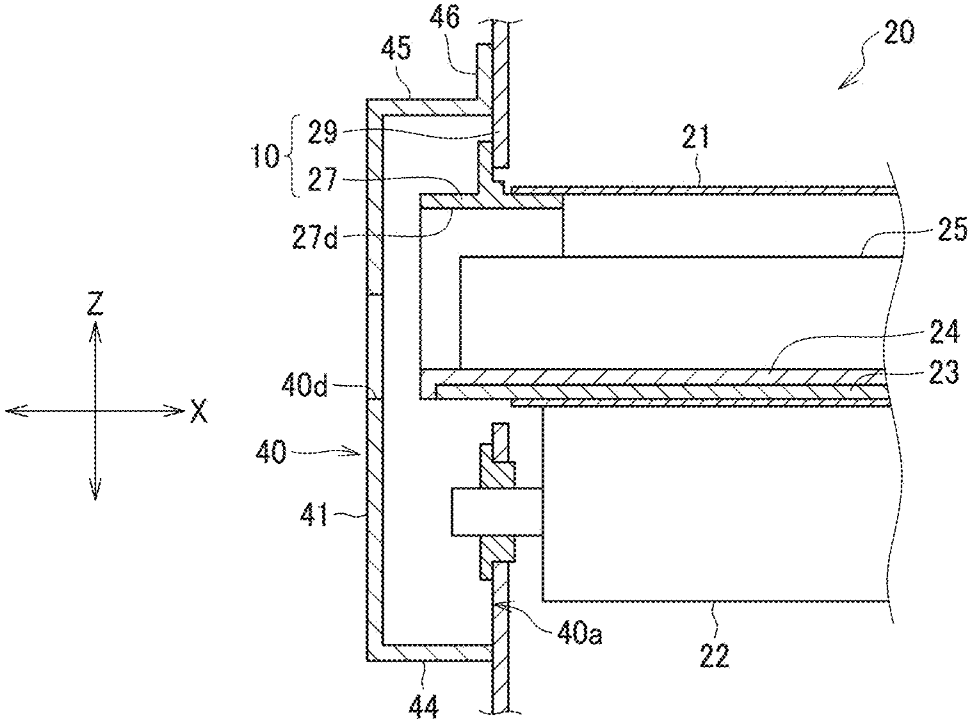
FIG. 5 is a cross-sectional view of an end portion of a fixing device in a longitudinal direction of the fixing device according to a first embodiment of the present disclosure.

FIG. 5 is a cross-sectional view of an end portion of the fixing device 20 in the longitudinal direction of the fixing device 20 according to the first embodiment of the present disclosure. FIG. 6 is a side view of the fixing device 20 illustrated in FIG. 5 as viewed from the left side of FIG. 5, and FIG. 7 is a perspective view of a cover 40 included in the fixing device 20 according to the first embodiment.

As illustrated in FIGS. 5 and 6, the fixing device 20 according to the first embodiment includes a side plate 29 as a support to support the belt holder 27. In the first embodiment, the side plate 29 supports the fixing belt 21 via the belt holder 27. The belt holder 27 and the side plate 29 function as a rotator support 10 that rotatably supports the end portion of the fixing belt 21 in the longitudinal direction of the fixing belt 21. In the present embodiment, the belt holder 27 and the side plate 29 are configured as separate parts but may be configured integrally as one part.

Since the belt holder 27 has the C-shape in the cross section or the tube shape, the opening 27*d* of the belt holder 27 penetrates the inside of the belt holder 27 and extends in the longitudinal direction X of the fixing belt 21. As a result, the internal space of the fixing belt 21 is opened to the outside through the opening 27*d* of the belt holder 27.

The fixing device 20 according to the first embodiment includes a cover 40 that covers the opening 27*d* of the belt holder 27 to prevent the FP/UFP generated inside the loop of the fixing belt 21 from being discharged to the outside. As illustrated in FIG. 5, the cover 40 is disposed outside from the side plate 29 in the longitudinal direction X of the fixing belt 21 and covers the outside of the opening 27*d*.

Although FIG. 5 illustrates the cover 40 disposed on one side plate 29 adjacent to one end portion of the fixing belt 21 in the longitudinal direction, the cover 40 is also disposed on the other side plate adjacent to the other end portion of the fixing belt 21 in the longitudinal direction.

Subsequently, the configuration of the cover 40 according to the first embodiment is described below with reference to FIG. 7.

As illustrated in FIG. 7, the cover 40 is a box-shaped component having a rectangular opening 40*a*. The cover 40 has a bottom wall 41 and four side walls 42 to 45 extending from the bottom wall 41 in a direction intersecting or orthogonal to the bottom wall 41. The four side walls 42 to 45 form an opening 40*a*. The bottom wall 41 and the side walls 42 to 45 are seamlessly connected to each other and form the cover 40 as one component.

The cover 40 includes an attachment plate 46 attached to an outer face of the side plate 29 in the longitudinal direction X of the fixing belt 21. The attachment plate 46 protrudes from one side wall 45 of the four side walls 42 to 45. The attachment plate 46 has a hole 46*a* through which a screw as a fastener is inserted. Inserting the screw into the hole 46*a* and fastening the screw to the side plate 29 attaches the cover 40 to the outer face of the side plate 29.

As illustrated in FIGS. 5 and 6, the cover 40 is attached to and placed on the side plate 29 such that the side plate 29 covers the opening 40*a* of the cover 40, and the cover 40 covers the entire opening 27*d* of the belt holder 27 (in other words, overlays the entire opening region of the opening 27*d*) when viewed from the longitudinal direction X of the fixing belt 21 (see FIG. 6).

As illustrated in FIGS. 5 and 6, the bottom wall 41 of the cover 40 attached to the side plate 29 faces the opening 27*d* in the longitudinal direction X of the fixing belt 21, and the side walls 42 to 45 are disposed to surround the periphery of the opening 27*d*. In other words, the cover 40 includes a first wall (the bottom wall 41), a second wall (the side wall 42), a third wall (the side wall 43), a fourth wall (the side wall 44), and a fifth wall (the side wall 45). The first wall faces the opening 27*d* in the longitudinal direction X of the fixing belt 21. The second wall and the third wall are closer to the opening 27*d* than the first wall in the longitudinal direction X of the fixing belt 21. The second wall and the third wall face each other across the opening 27*d* in a direction Y (see FIG. 6) perpendicular to the longitudinal direction X. The fourth wall and the fifth wall are closer to the opening 27*d* than the first wall in the longitudinal direction X of the fixing belt 21. The fourth wall and the fifth wall face each other across the opening 27*d* in a direction Z (see FIG. 6) perpendicular to the longitudinal direction X and the direction Y. In the present embodiment, the second to fifth walls (side walls 42 to 45) are connected to each other so as to continuously surround the opening 27*d* when viewed from the longitudinal direction X of the fixing belt 21 (see FIG. 6).

As described above, since the cover 40 in the first embodiment covers the entire opening 27*d*, the cover 40 prevents the FP/UFP generated from the lubricant inside the loop of the fixing belt 21 by the temperature rise of the lubricant from being discharged to the outside through the opening 27*d*. In other words, the FP/UFP generated inside the loop of the fixing belt 21 move to the outside through the opening 27*d* of the belt holder 27, but the cover 40 regulates the movement of the FP/UFP to prevent the FP/UFP from being discharged to the outside.

The cover 40 in the first embodiment covers the entire opening 27*d* to prevent the FP/UFP from being discharged but, in addition to the FP/UFP, prevents hot air inside the loop of the fixing belt 21 from being discharged to the outside. As a result, continuous printing causes a temperature rise inside the loop of the fixing belt 21, which may cause disadvantages such as disconnection of the heater 23 and deterioration of components.

To countermeasure the above-described disadvantage, the cover 40 in the first embodiment has another opening 40*d*. In the following description, the opening 27*d* of the belt holder 27 is referred to as a first opening 27*d*, and the opening 40*d* is referred to as a second opening 40*d*. The second opening 40*d* is a through hole penetrating the cover 40 in the longitudinal direction X of the fixing belt 21. As a result, the internal space of the fixing belt 21 communicates with an external space of the cover 40 through the second opening 40*d*.

Since the internal space of the fixing belt 21 communicates with the external space of the cover 40 through the second opening 40*d* in the first embodiment as described above, the hot air in the internal space of the fixing belt 21 can be discharged to the outside through the second opening 40*d*. Specifically, the hot air in the internal space of the fixing belt 21 passes through the first opening 27*d* of the belt holder 27, further passes through the second opening 40*d* of the cover 40, and is discharged to the outside. Air in the external space of the cover 40 can also flow into the internal space of the fixing belt 21 through the second opening 40*d* and the first opening 27*d*. As a result, the air in the internal space of the fixing belt 21 can be replaced with the air in the external space of the cover 40, which enables reducing the temperature rise in the air in the internal space of the fixing belt 21 and avoiding the occurrence of the disadvantages such as the disconnection of the heater 23 and the deterioration of the components due to the temperature rise.

The above-described second opening 40*d* of the cover 40 in the first embodiment can generate preferable air flows between the internal space of the fixing belt 21 and the external space of the cover 40. However, the FP/UFP in the internal space of the fixing belt 21 may be likely to be discharged to the outside from the second opening 40*d*.

To reduce the FP/UFP, the second opening 40*d* in the present embodiment is at a position spaced apart from the first opening 27*d* in the longitudinal direction X of the fixing belt 21. After the FP/UFP pass through the first opening 27*d*, the FP/UFP are less likely to pass through the second opening 40*d* at the position spaced apart from the first opening 27*d*. As a result, the FP/UFP are likely to stay in the cover 40, which promotes the aggregation of the FP/UFP. Promoting the aggregation of the FP/UFP increases the particle diameter and decreases the number of FP/UFP, and the FP/UFP adhere to the inner face of the cover 40. As a result, the number of FP/UFP discharged to the outside can be decreased.

In order to further promote the aggregation of the FP/UFP in the cover 40, the second opening 40*d* is preferably disposed at a position different from the first opening 27*d* so that the second opening does not overlap the first opening 27*d* when viewed from the longitudinal direction X of the fixing belt 21 (see FIG. 6). In other words, the preferable position of the second opening 40*d* is different from the position of the first opening 27*d* in a plane orthogonal to the longitudinal direction X of the fixing belt 21. Specifically, the preferable plane coordinates of the second opening 40*d* in the plane orthogonal to the longitudinal direction X are different from the plane coordinates of the first opening 40*d* in the plan.

The above-described structure is less likely to discharge the FP/UFP that have passed through the first opening 27*d* to the outside from the second opening 40*d* and is more likely to stay the FP/UFP in the cover 40. As a result, the above-described structure can more effectively promote the aggregation of the FP/UFP.

The meaning of "the second opening 40*d* is disposed at the position different from the first opening 27*d*" includes "a part of the second opening 40*d* is disposed at the position different from the first opening 27*d*" in addition to "the entire second opening 40*d* is disposed at the position different from the first opening 27*d* when viewed from the longitudinal direction X of the fixing belt 21. In order to effectively reduce the discharge of FP/UFP from the second opening 40*d*, as illustrated in FIG. 6, it is preferable that the entire second opening 40*d* be disposed at a position different from the first opening 27*d*, but a part of the second opening 40*d* may be disposed at a position different from the first opening 27*d*. In this case, a part of the second opening 40*d* is disposed so as to overlap the first opening 27*d*. Even in such a case, the FP/UFP are less likely to pass through the second opening 40*d*, which promotes the aggregation of the FP/UFP and reduces the amount of the FP/UFP discharged to the outside. The number of the second opening 40*d* is not limited to one, and multiple second openings may be disposed at different positions.

Since the FP/UFP are discharged together with the hot air inside the loop of the fixing belt 21, the FP/UFP tend to move upward together with the updraft of the hot air. Accordingly, the second opening 40*d* is preferably disposed below the first opening 27*d* as illustrated in FIG. 6. Locating the second opening 40*d* below the first opening 27*d* can effectively reduce the discharge of the FP/UFP from the second opening 40*d* and promotes the aggregation of the FP/UFP in the cover 40.

In order to effectively reduce the discharge of the FP/UFP to the outside while the air flows are maintained, the opening area of the second opening 40*d* is preferably designed not to be too large. Specifically, the present inventors experimentally found that the opening area S2 of the second opening 40*d* is preferably 25% or less of a surface area S1 of an internal space of the cover 40 as illustrated in the following mathematical expression (1).

Expression 1

$$S2/S1 \leq 0.25 \qquad \text{Expression (1)}$$

The above-described surface area S1 of the internal space of the cover 40 means not only a sum of areas of inner faces of the cover 40 but also a sum of the opening area S2 of the second opening and the sum of areas of inner faces of the cover 40. When the internal space of the cover 40 has a lateral width L1, a longitudinal width L2, and a height L3 that are inner dimensions not including the thicknesses of the plates as illustrated in FIG. 7, the surface area S1 of the internal space of the cover 40 in the present embodiment is expressed by the following mathematical expression (2).

Expression 2

$$S1 = L1 \times L2 + L1 \times L3 \times 2 + L2 \times L3 \times 2 \qquad \text{Expression (2)}$$

Designing the opening area S2 of the second opening 40*d* to be 25% or less of the surface area S1 of the internal space of the cover 40 reduces the FP/UFP discharged through the second opening 40*d*. In contrast, if the opening area S2 of the second opening 40*d* is larger than 25% of the surface area S1 of the internal space of the cover 40 (S2/S1>0.25), the FP/UFP are easily discharged to the outside through the second opening 40*d*, which shortens the time for which the FP/UFP stay in the cover 40. Accordingly, designing the opening area S2 of the second opening 40*d* to be 25% or less of the surface area S1 of the internal space of the cover 40 as in the above mathematical expression (1) (S2/S1≤0.25) increases the time for which the FP/UFP stay in the cover 40 and thus promotes the aggregation of the FP/UFP to effectively reduce an amount of the FP/UFP discharged to the outside.

In addition, in order to more effectively promote the aggregation of the FP/UFP in the cover 40, it is preferable that the internal space of the cover 40 is large. Specifically, the present inventors experimentally found that the volume V1 of the internal space of the cover 40 is preferably equal to or larger than 8 $cm^3$ as illustrated in the following mathematical expression (3). The volume V1 of the internal space of the cover 40 in the first embodiment is expressed by the following mathematical expression (4) using the inner dimensions L1, L2, and L3.

Expression 3

$$V1 \geq 8[\text{cm}^3] \qquad \text{Expression (3)}$$

Expression 4

$$V1 = L1 \times L2 \times L3 \qquad \text{Expression (4)}$$

Designing the volume V1 of the internal space of the cover 40 to be equal to or larger than 8 $cm^3$ as described above further promotes the aggregation of the FP/UFP in the cover 40 and thus can further reduce the amount of the FP/UFP discharged to the outside from the second opening 40*d*.

According to the configuration of the first embodiment, simply attaching the cover 40 to the outer face of the side plate 29 (the outer face in the longitudinal direction X of the fixing belt 21) enables reducing the discharge of the FP/UFP while maintaining the air flows between the internal space of the fixing belt 21 and the external space of the cover 40. Adding simple components without a significant design change enables providing the fixing device and the image forming apparatus that can reduce the amount of FP/UFP discharged.

Since the cover 40 is exposed to the hot air inside the loop of the fixing belt 21, the cover 40 is preferably made of a heat-resistant material. As the material of the cover 40, a resin, a metal, or a combination of the resin and the metal may be used.

FIG. 8 is a table listing the results of tests performed by the present inventors. In the tests, the present inventors measured the numbers of FP/UFP discharged from the fixing device of a comparative example illustrated in FIG. 65 to the outside of the fixing device and the numbers of FP/UFP discharged from the fixing device according to the first embodiment of the present disclosure to the outside of the fixing device.

In the tests, two image forming apparatuses were prepared, one includes the fixing device as the comparative example, and another includes the fixing device according to the first embodiment. The tests were performed as follows. Each of the image forming apparatuses was placed in a test room (that is a chamber having a volume of 2.18 $m^3$). While the image forming apparatus continuously performs the printing operations for ten minutes and outputs sheets, the generation rates of FP/UFP were measured. During the printing operations, the image forming apparatuses formed no image on the sheets.

The numbers of FP/UFP discharged to the outside of the image forming apparatus were measured with a measuring device (FAST MOBILITY PARTICLE SIZER (FMPS) Model 3091 manufactured by TSI Incorporated)

The reason why the present inventor measures the generation rates of FP/UFP for ten minutes is that image forming apparatuses in the market are mostly used for continuous printing within several minutes and are rarely used for continuous printing for five minutes or longer. The reason why the image forming apparatus formed no image on the sheet is in order to avoid measuring FP/UFP generated from wax in the toner. In addition to measuring the FP/UFP while the image forming apparatus formed no image on the sheets the measurement was performed with an apparatus and under conditions compliant with the FP/UFP (fine particles) standards specified by the Blue Angel.

As illustrated in FIG. 8, the fixing device according to the comparative example discharged the FP/UFP by $A \times 10^{11}$ [particles/10 minutes] during the continuous printing for ten minutes. In contrast, the fixing device according to the first embodiment of the present disclosure discharged the FP/UFP by $0.54 \times A \times 10^{11}$ [particles/10 minutes] during the continuous printing for ten minutes, which was less than the amount of the FP/UFP discharged by the fixing device according to the comparative example. From the test results, it was confirmed that the fixing device according to the first embodiment of the present disclosure can reduce the FP/UFP discharged from the fixing device.

Subsequently, other embodiments different from the above-described first embodiment are described. Differences from the above-described embodiment are mainly described, and descriptions of the same portions are appropriately omitted.

Figure 9:
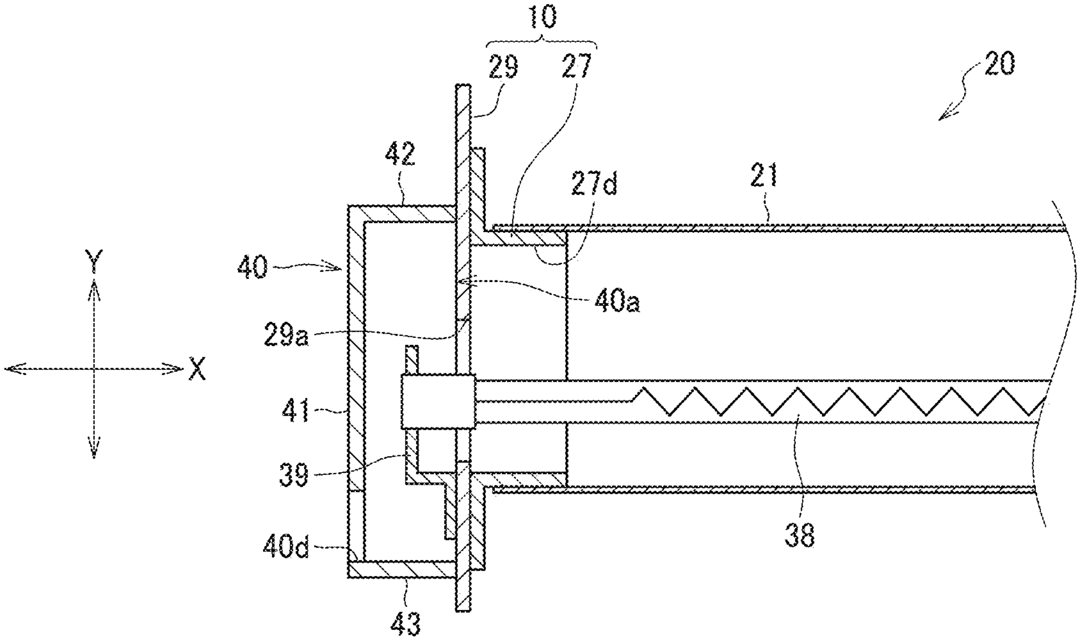
FIG. 9 is a cross-sectional view of an end portion of a fixing device in a longitudinal direction of the fixing device according to a second embodiment of the present disclosure.
Figure 10:
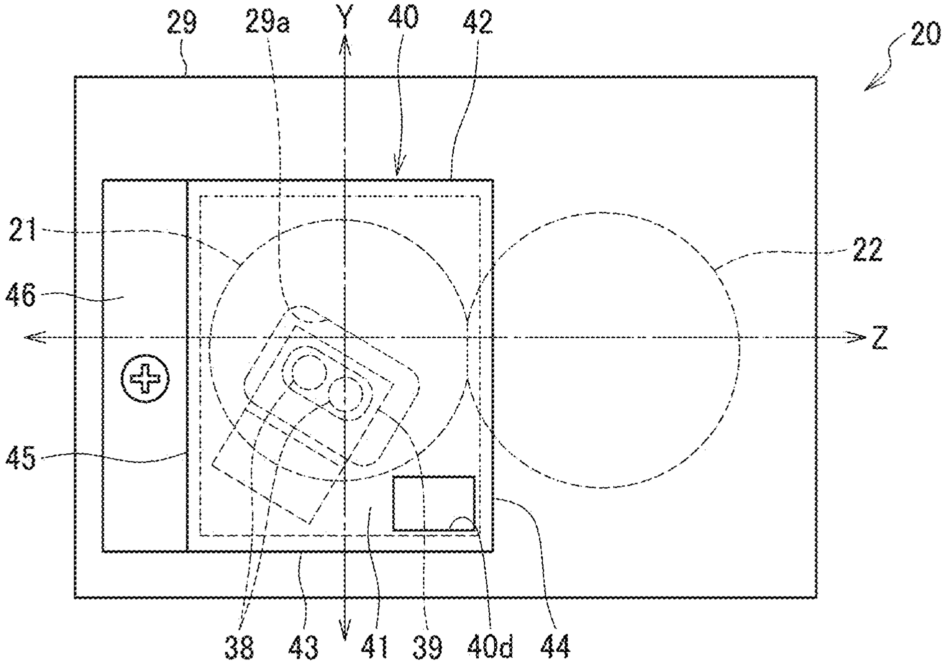
FIG. 10 is a side view of the fixing device illustrated in FIG. 9, as viewed from the left side of FIG. 9.

FIGS. 9 and 10 are views of the configuration of the fixing device 20 according to a second embodiment of the present disclosure.

In the second embodiment illustrated in FIGS. 9 and 10, the fixing device 20 includes a halogen heater 38 as the heat source to heat the fixing belt 21. The halogen heater 38 is disposed inside the loop of the fixing belt 21. The halogen heater 38 is a non-contact-type heat source that irradiates the inner circumferential surface of the fixing belt 21 with infrared light to heat the fixing belt 21. Each of both ends of the halogen heater 38 in the longitudinal direction of the halogen heater is inserted through an opening 29*a* of the side plate 29, exposed to the outside of the side plate 29, and supported by a bracket 39 as a heat source support fixed to the outer face of the side plate 29.

As described above, the fixing device 20 according to the second embodiment has the opening 29*a* to expose the end of the halogen heater 38 in the longitudinal direction to the outside of the side plate 29, and thus the internal space of the fixing belt 21 is opened to the outside through the opening 29*a*. To reduce the FP/UFP discharged from the opening 29*a* to the outside of the fixing device 20, the fixing device 20 according to the second embodiment includes the cover 40 disposed outside from the bracket 39 in the longitudinal direction X of the fixing belt 21 to cover the entire opening 29*a*. As a result, the fixing device 20 according to the second embodiment can also reduce the FP/UFP discharged from the internal space of fixing belt 21 to the outside of the fixing device 20 as in the first embodiment.

In the second embodiment, the internal space of the fixing belt 21 is opened to the outside through the opening 27*d* of the belt holder 27 in addition to the opening 29*a* of the side plate 29. Accordingly, the opening of the rotator support 10 that supports the fixing belt 21 includes the opening 27*d* of the belt holder 27 in addition to the opening 29*a* of the side plate 29. In other words, the rotator support 10 has two openings 29*a* and 27*d* having different sizes and disposed at different positions. The opening (that is the first opening) covered with the cover 40 in the present disclosure means an opening formed in the face of a component facing the cover 40. Since the face of the component facing the cover 40 in the second embodiment is the outer face of the side plate 29, the cover 40 covers the entire opening 29*a* formed on the outer face of the side plate 29.

Alternatively, contrary to the second embodiment, the cover 40 may be disposed inside the side plate 29, and the cover 40 may cover the entire opening 29*a* formed on the inner face of the side plate 29.

The cover 40 in the second embodiment has the second opening 40*d* in addition to the opening 29*a* of the side plate 29. The opening 29*a* is referred to as the first opening in the following description. The second opening can generate preferable air flows between the internal space of the fixing belt 21 and the external space of the cover 40 to reduce the temperature rise in the internal space of the fixing belt 21.

In addition, the second opening 40*d* in the second embodiment is disposed at the position spaced apart from the first opening 29*a*, and when viewed from the longitudinal direction X of the fixing belt 21 (see FIG. 10), the second opening 40*d* is disposed at the position different from the first opening 29*a*. As a result, the FP/UFP is less likely to be discharged through the second opening 40*d*, which enables more effectively promoting the aggregation of the FP/UFP. Since the FP/UFP is likely to move upward, the second opening 40*d* is preferably disposed below the first opening 29*a* as illustrated in FIGS. 9 and 10.

Figure 11:
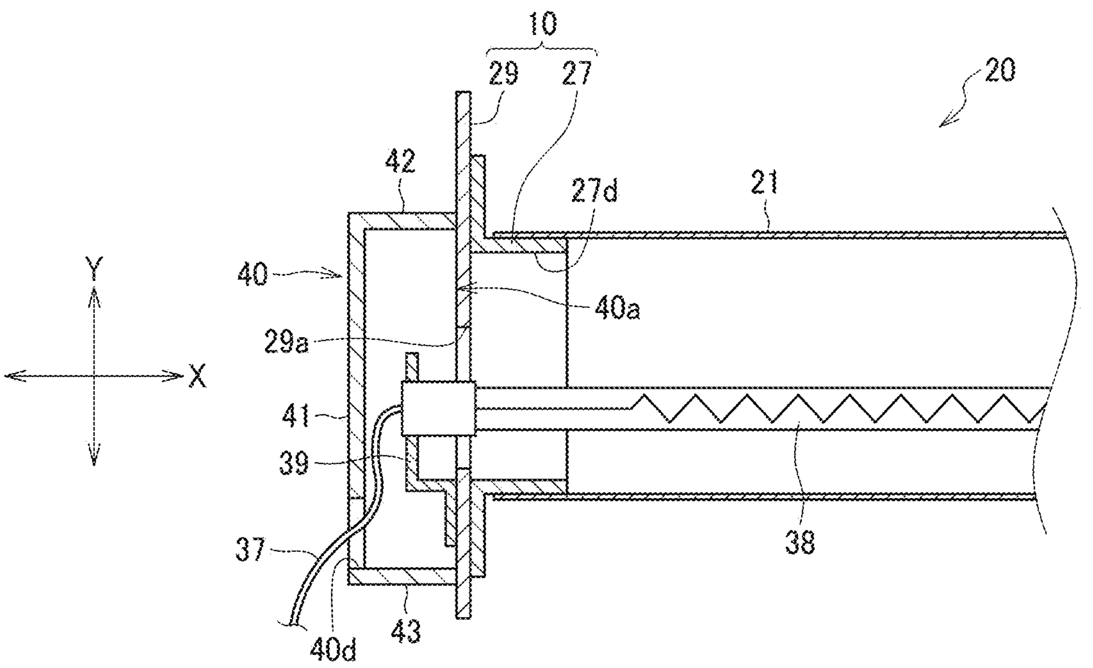
FIG. 11 is a cross-sectional view of an end portion of a fixing device in a longitudinal direction of the fixing device according to a third embodiment of the present disclosure.
Figure 12:
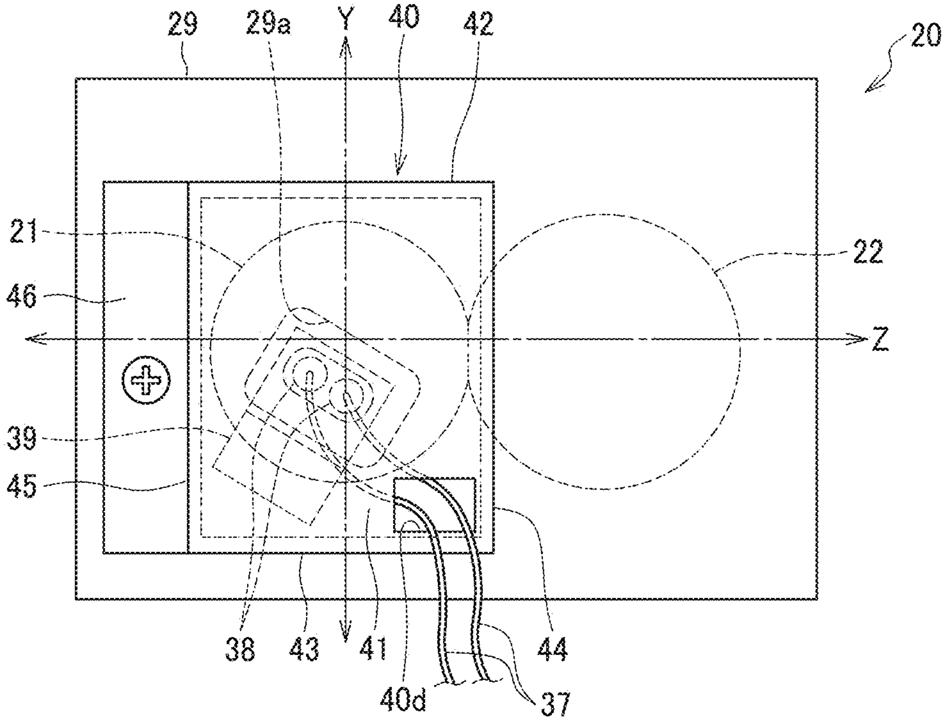
FIG. 12 is a side view of the fixing device illustrated in FIG. 11, as viewed from the left side of FIG. 11.

FIGS. 11 and 12 are views of the configuration of the fixing device 20 according to a third embodiment of the present disclosure.

In the third embodiment illustrated in FIGS. 11 and 12, the second opening 40*d* of the cover 40 is used as an opening through which a harness 37 extending from the halogen heater 38 passes. The other configurations are the same as those of the second embodiment illustrated in FIGS. 9 and 10.

The harness 37 includes a conductive wire that electrically connects the halogen heater 38 to an external power supply. The harness 37 is exposed to the outside through the second opening 40*d* and connected to the external power supply. As described above, the second opening 40*d* of the cover 40 may be used as the opening through which the harness 37 passes.

The configuration of the third embodiment is applicable to the configuration that includes the planar heater 23 including the resistive heat generators 31 in the first embodiment in addition to the configuration including the halogen heater 38 as the heat source. The second opening 40*d* may be used as an opening through which a harness such as a harness connected to the planar heater 23 or a harness connected to the temperature sensor inside the loop of the fixing belt 21 passes.

Figure 13:
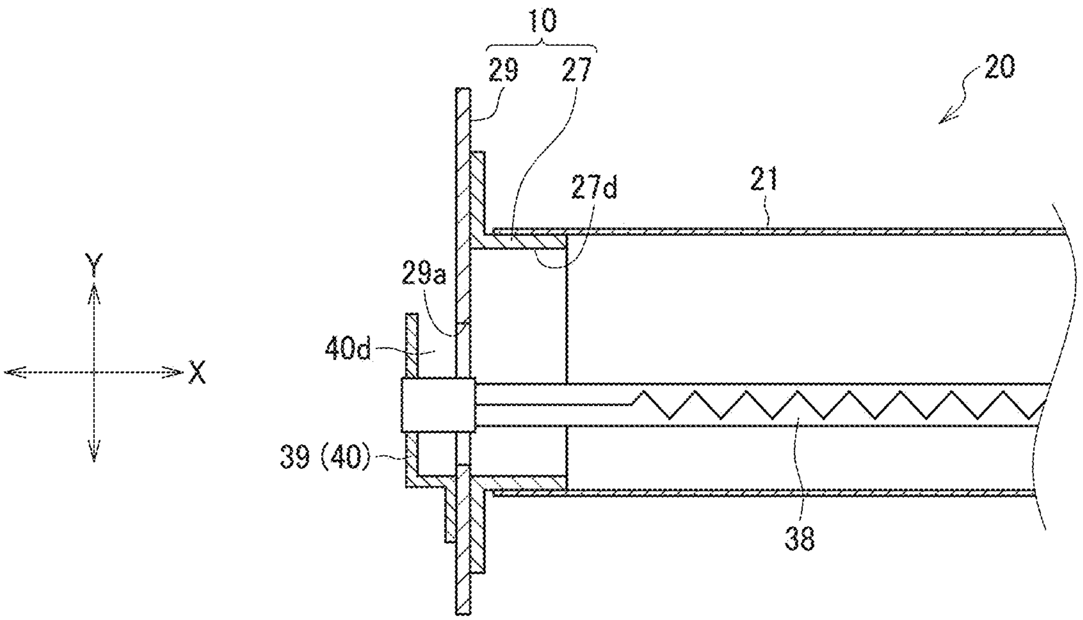
FIG. 13 is a cross-sectional view of an end portion of a fixing device in a longitudinal direction of the fixing device according to a fourth embodiment of the present disclosure.
Figure 14:
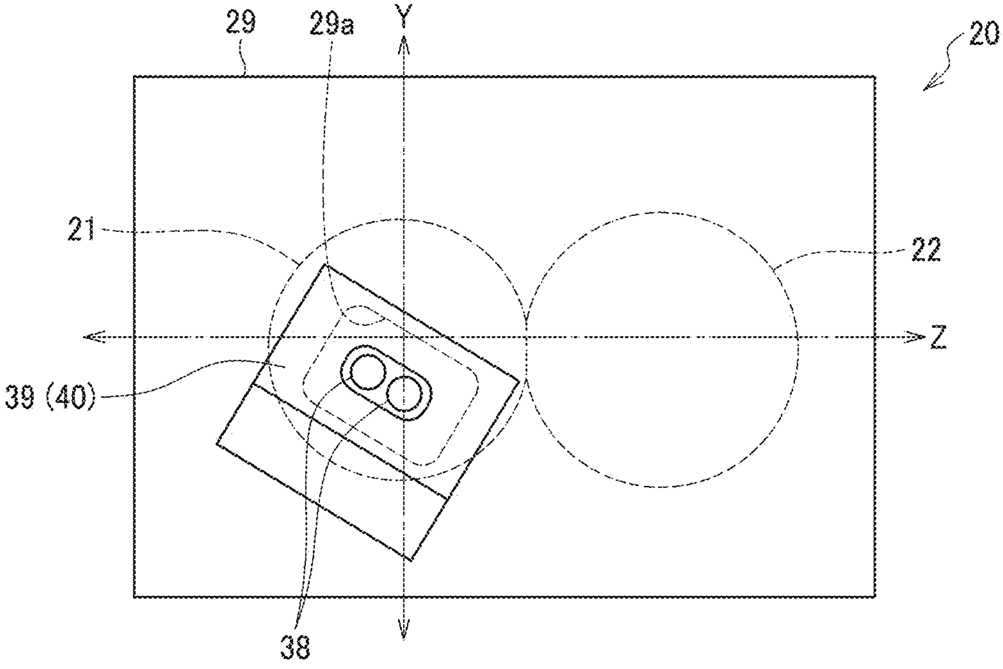
FIG. 14 is a side view of the fixing device illustrated in FIG. 13, as viewed from the left side of FIG. 13.

FIGS. 13 and 14 are views of the configuration of the fixing device 20 according to a fourth embodiment of the present disclosure.

In the fourth embodiment illustrated in FIGS. 13 and 14, the bracket 39 to support the halogen heater 38 is used as the cover 40. In this case, as illustrated in FIG. 14, the bracket 39 as the cover 40 is disposed so as to cover the entire opening 29*a* of the side plate 29 (in other words, so as to overlay the entire opening region of the opening 29*a*) when viewed from the longitudinal direction X of the fixing belt 21.

The FP/UFP are generated in the internal space of the fixing belt 21 and move to the outside through the opening 29*a*, but in the fourth embodiment, the bracket 39 covering the entire opening 29*a* as described above restricts the movement of the FP/UFP. Since the bracket 39 restricts the movement of the FP/UFP, the FP/UFP stays between the bracket 39 and the side plate 29, which promotes the aggregation of the FP/UFP. The above-described structure reduces the number of FP/UFP and causes the FP/UFP to adhere to the inner face of the bracket 39. As a result, the above-described structure can reduce the amount of the FP/UFP discharged to the outside. Since the bracket 39 functions as the cover 40, the above-described structure does not need the dedicated cover 40. As a result, the above-described structure can simplify and downsize the fixing device.

In the fourth embodiment, a gap (see FIG. 13) is formed between the bracket 39 and the side plate 29. The gap functions as the second opening 40*d* to generate the air flows between the internal space of the fixing belt 21 and the external space of the bracket 39.

Figure 15:
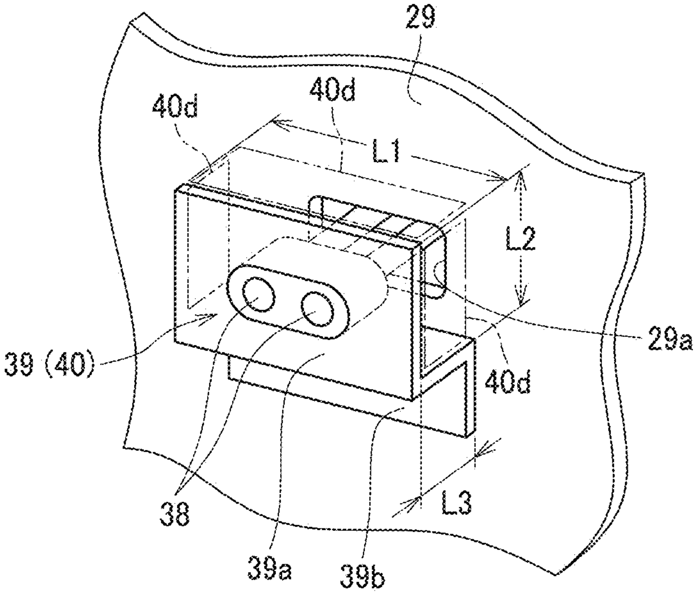
FIG. 15 is a perspective view of a bracket and a side plate to illustrate a gap formed between the bracket and the side plate, according to an embodiment of the present disclosure.

As illustrated in FIG. 15, the bracket 39 according to the fourth embodiment includes a rectangular holding plate 39*a* and a bent portion 39*b*. The holding plate 39*a* holds the end of the halogen heater 38 in the longitudinal direction of the halogen heater 38. The bent portion 39*b* is formed by bending one side of the holding plate 39*a* to form an L shape. The bent portion 39*b* is attached to the side plate 29 to attach the bracket 39 to the side plate 29. The holding plate 39*a* has four sides. One of the four sides forms the bent portion 39*b*. The other three sides form the gap serving as the second opening 40*d*, which is surrounded by alternate long and two short dashes lines in FIG. 15. In the fourth embodiment, the hot air in the internal space of the fixing belt 21 is discharged to the outside through the gaps formed by the three sides, and the air in the external space of the bracket 39 flows into the internal space of the fixing belt 21 through the gaps formed by the three sides.

As described above, the gap between the bracket 39 and the side plate 29 functions as the second opening 40*d* to form the air flow between the internal space of the fixing belt 21 and the external space of the bracket 39, which enables reducing the temperature rise in the internal space of the fixing belt 21.

However, too large gap (serving as the second opening 40*d*) between the bracket 39 and the side plate 29 causes the FP/UFP to be easily discharged to the outside through the gap. Therefore, the opening area S2 of the gap is preferably designed to be a size satisfying the mathematical expression (1). In other words, the opening area S2 of the gap between the bracket 39 and the side plate 29 is preferably 25% or less of the surface area S1 of the internal space formed by the bracket 39 as the cover 40.

The above-described surface area S1 of the internal space formed by the bracket 39 means not only a sum of areas of inner faces of the bracket 39 but also a sum of the opening area S2 of the gap formed between the bracket 39 and the side plate 29 and the sum of areas of inner faces of the bracket 39. When the holding plate 39*a* has a lateral width L1 and a longitudinal width L2 and forms a height L3 from the side plate 29 to the holding plate 39*a* as illustrated in FIG. 15, the surface area S1 of the internal space of the bracket 39 in the fourth embodiment is expressed by the following mathematical expression (5).

Expression 5

$$S1 = L1 \times L2 + L1 \times L3 \times 2 + L2 \times L3 \times 2 \quad \text{Expression (5)}$$

The opening area S2 of the gap is expressed by the following mathematical expression (6) using the dimensions L1, L2, and L3 of the holding plate 39*a*.

Expression 6

$$S2 = L1 \times L3 + L2 \times L3 \times 2 \quad \text{Expression (6)}$$

Designing the opening area S2 of the gap formed between the bracket 39 and the side plate 29 to be 25% or less of the surface area S1 of the internal space formed by the bracket 39 causes the FP/UFP to be less likely to discharge through the gap and thus can effectively reduce the amount of the FP/UFP discharged to the outside.

In addition, in order to more effectively promote the aggregation of the FP/UFP, it is preferable that the internal space formed by the bracket 39 is large. Specifically, the volume V1 of the internal space formed by the bracket 39 as the cover 40 is preferably equal to or larger than 8 $cm^3$ as illustrated in the above mathematical expression (3). The volume V1 of the internal space formed by the bracket 39 in the fourth embodiment is expressed by the following mathematical expression (7) using the above-described dimensions L1, L2, and L3.

Expression 7

$$V1 = L1 \times L2 \times L3 \quad \text{Expression (7)}$$

Designing the volume V1 of the internal space formed by the bracket 39 to be equal to or larger than 8 $cm^3$ as described above further promotes the aggregation of the FP/UFP in the internal space formed by the bracket 39 and thus can further reduce the amount of the FP/UFP discharged to the outside from the gap.

Subsequently, modifications of the cover 40 according to embodiments of the present disclosure are described.

In the first embodiment illustrated in FIGS. 5 to 7, all of the four side walls 42 to 45 (that are the second to fifth walls) forming the cover 40 seamlessly contact the side plate 29, but any one or some of the four side walls 42 to 45 may be disposed so as not to be in contact with the side plate 29.

Figure 16:
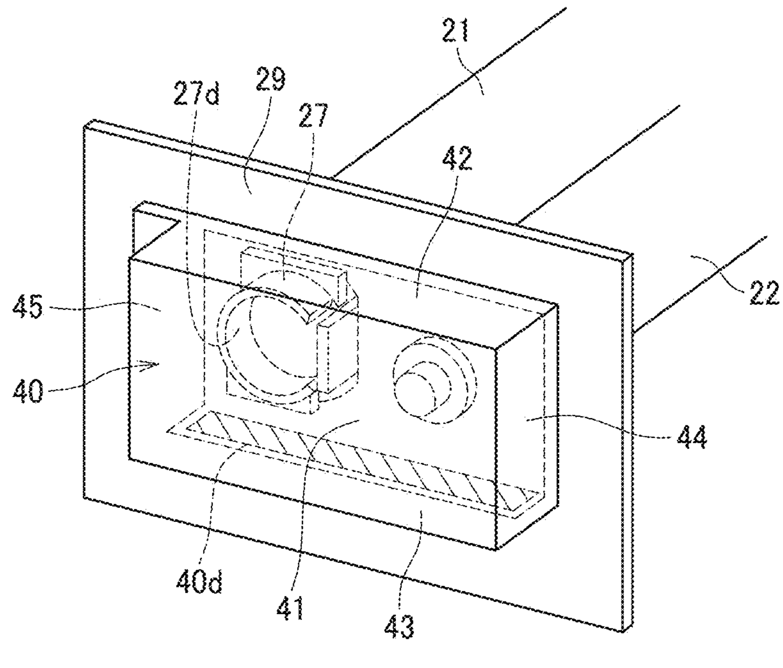
FIG. 16 is a perspective view of a modification of a cover according to a modification of an embodiment of the present disclosure.

For example, as in a modification illustrated in FIG. 16, the lower side wall 43 of the cover 40 in FIG. 16 may be disposed so as not to contact the side plate 29 to form a gap (the hatched portion in FIG. 16) between the side wall 43 and the side plate 29. In this case, the gap between the side wall 43 and the side plate 29 functions as the second opening 40*d* to generate the air flows between the internal space of the fixing belt 21 and the external space of the cover 40.

Figure 17:
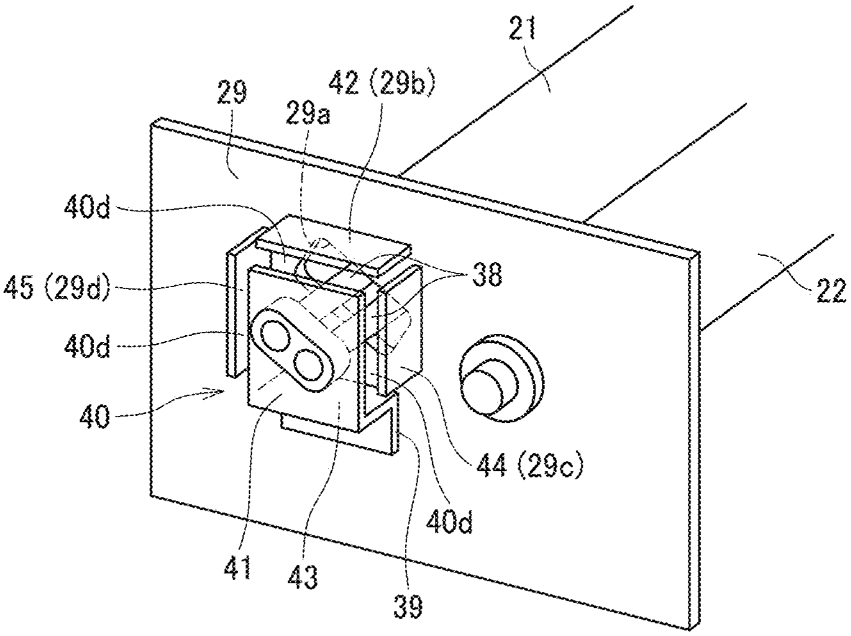
FIG. 17 is a perspective view of a cover according to another modification of an embodiment of the present disclosure.

As in a modification illustrated in FIG. 17, the cover 40 may be formed of multiple components instead of one component. In this case, the cover 40 includes the bracket 39 supporting the halogen heater 38 and three projections 29*b*, 29*c* and 29*d* on the side plate 29. The bracket 39 forms the bottom wall 41 and the side wall 43 of the cover 40, and three projections 29*b*, 29*c*, and 29*d* on the side plate 29 form the remaining three side walls 42, 44, and 45 of the cover 40.

The bracket 39 and the projections 29*b*, 29*c*, and 29*d* are not connected to each other and form gaps between the bracket 39 and the projections 29*b*, 29*c*, and 29*d*. Through these gaps, hot air in the internal space of the fixing belt 21 can be discharged to the external space of the cover 40, and the air in the external space of the cover 40 can flow into the internal space of the fixing belt 21. In other words, the gaps between the bracket 39 and the respective projections 29*b*, 29*c*, and 29*d* function as the second opening 40*d* to generate the air flows between the internal space of the fixing belt 21 and the external space of the cover 40.

Figure 18:
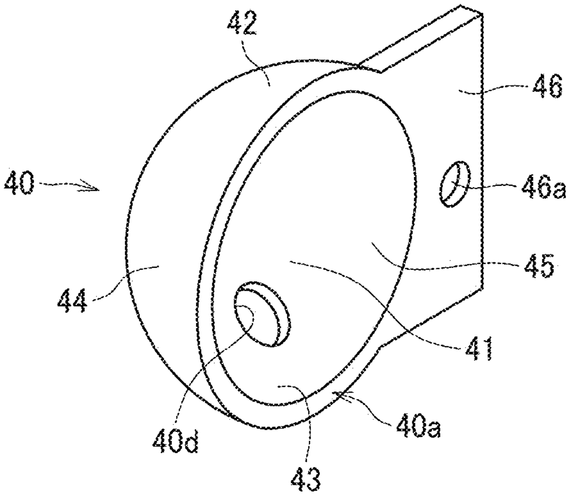
FIG. 18 is a perspective view of a cover according to still another modification of an embodiment of the present disclosure.
Figure 19:
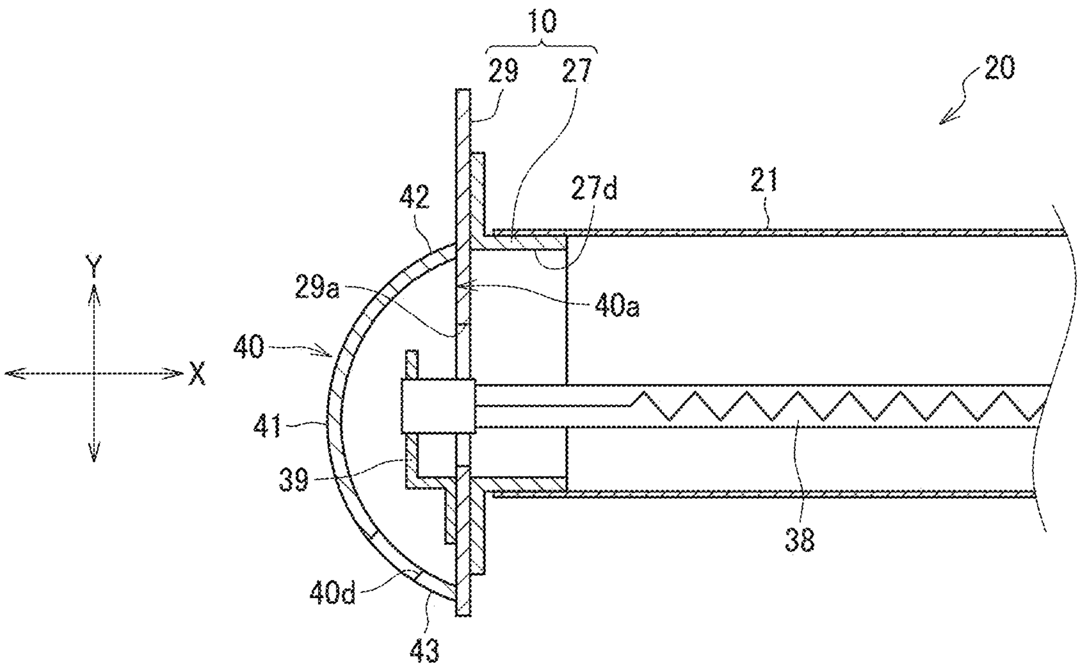
FIG. 19 is a cross-sectional view of a part of a fixing device to which the cover illustrated in FIG. 18 is attached.

The shape of the cover 40 is not limited to the box shape (in other words, a cubic shape or a rectangular parallelepiped shape) and may be a hemispherical shape as in a modification illustrated in FIG. 18.

Figure 20:
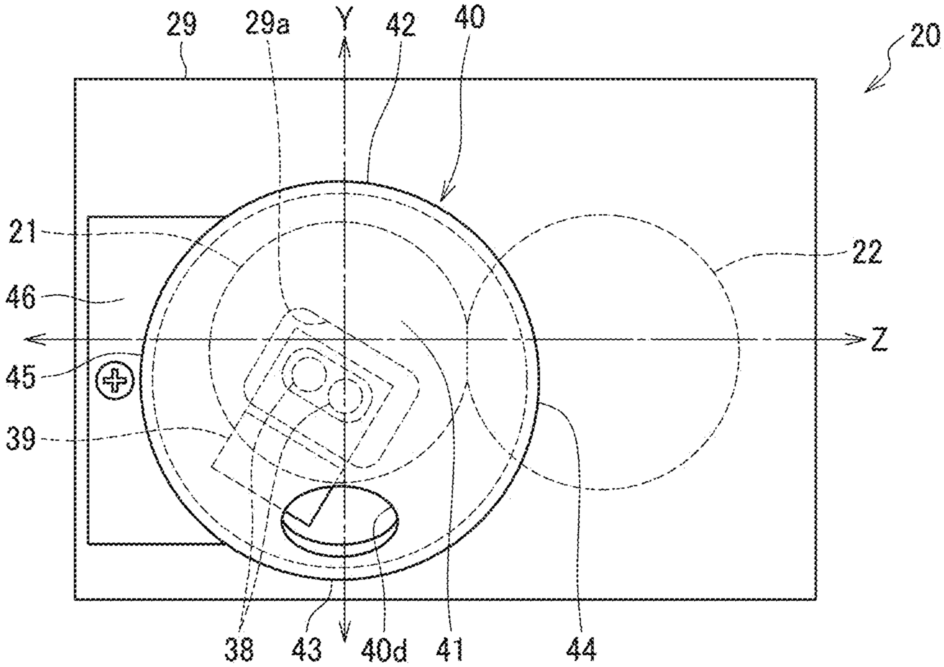
FIG. 20 is a side view of the fixing device of FIG. 19.

In this case, the cover 40 also includes the first wall (the bottom wall 41), the second wall (the side wall 42), the third wall (the side wall 43), the fourth wall (the side wall 44), and the fifth wall (the side wall 45). The first wall faces the opening 29*a* in the longitudinal direction X of the fixing belt 21. The second wall and the third wall face each other across the opening 29*a* in the direction Y (see FIG. 20) perpendicular to the longitudinal direction X. The fourth wall and the fifth wall face each other across the opening 29*a* in the direction Z (see FIG. 20) perpendicular to the longitudinal direction X and the direction Y.

The shape of the cover 40 may be an elliptical shape or other curved shapes, or a shape including a curved face and a flat face, in addition to the hemispherical shape as described above.

As described above, the cover according to the present disclosure covers the first opening of the rotator support, which enables reducing the FP/UFP discharged from the first opening. In addition, the cover according to the present disclosure has the second opening that communicates the internal space of the rotator with the external space of the cover, which enables generating the air flow between the internal space of the rotator and the external space of the cover to reduce the temperature rise in the internal space of the rotator. As a result, the fixing device according to the present disclosure enables avoiding damage and deterioration of components due to the temperature rise in the internal space of the rotator and reducing the amount of FP/UFP discharged. The environmentally friendly fixing device and image forming apparatus can be provided.

Although the fluorine grease, the fluorine oil, the silicone oil, and the silicone grease have been described as example substances that generate the FP/UFP in the above embodiments, another liquid or semi-solid lubricating substance (i.e., liquid or semi-solid substance having lubricity) besides these substances may be used in another embodiment of the present disclosure. In the embodiments of the present disclosure, the lubricating substance (i.e., the substance having lubricity) refers to a substance that is interposed between components to reduce frictional resistance between the components. Even when the liquid or semi-solid substance having lubricity other than silicone oil, silicone grease, fluorine oil, and fluorine grease is used, the configuration according to the present disclosure can reduce the discharge of FP/UFP generated from the substance having lubricity.

According to the embodiments of the present disclosure, the configuration of the fixing device is not limited to the configuration described above. The embodiments of the present disclosure may be applied to fixing devices having various configurations. A description is now given of some examples of the configuration of the fixing device to which the embodiments of the present disclosure are applicable.

Figure 21:
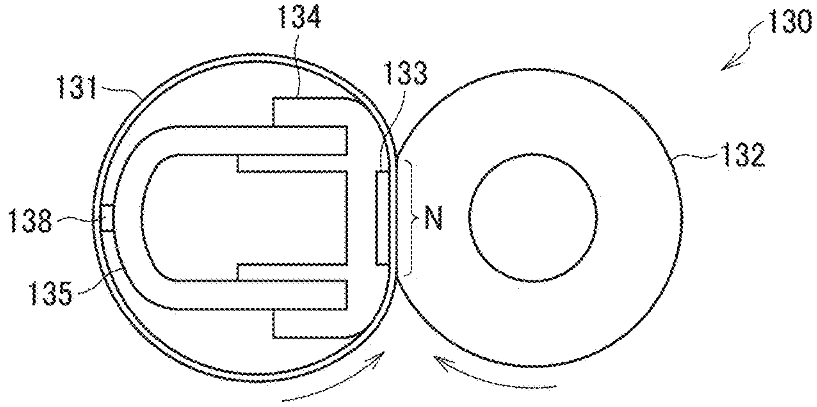
FIG. 21 is a cross-sectional view of a fixing device that is different from the fixing device of FIG. 2 but applicable to the above-described embodiments.
Figure 22:
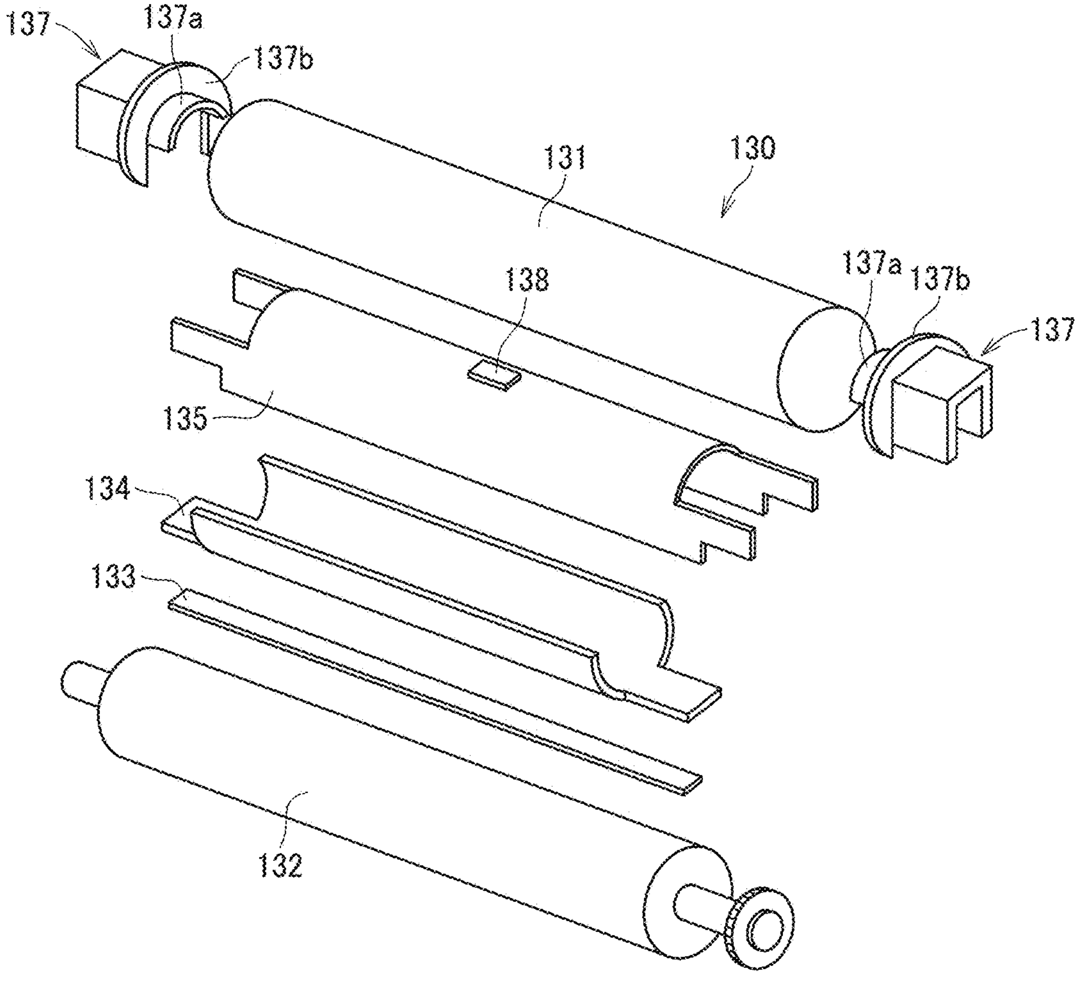
FIG. 22 is an exploded perspective view of the fixing device illustrated in FIG. 21.

A fixing device 130 illustrated in FIGS. 21 and 22 includes a fixing belt 131 as the first rotator, a pressure roller 132 as the second rotator, a heater 133 as the heat source, a heater holder 134 as the heat source holder, a pressure stay 135 as the reinforcement, flanges 137 (see FIG. 22) as rotator holders, and a thermistor 138 as the temperature detector.

Functions and configurations of the fixing belt 131, the pressure roller 132, the heater 133, the heater holder 134, the pressure stay 135, and the flanges 137 illustrated in FIGS. 21 and 22 are basically the same as those of the fixing belt 21, the pressure roller 22, the heater holder 24, the stay 25, and the belt holders 27 illustrated in FIG. 2. Similar to the above-described belt holder 27, the flange 137 has a backup portion 137*a* as the insertion portion to be inserted into the fixing belt 131 and a flange portion 137*b* as the restraint to restrain the movement of the fixing belt 131 in the longitudinal direction of fixing belt 131. A biasing member such as a spring presses the flange 137 against the end of the fixing belt 131 to hold the flange 137 inserted into the loop of the fixing belt 131.

The thermistor 138 disposed on the pressure stay 135 is a contact-type temperature detector that is in contact with the inner circumferential surface of the fixing belt 131 to detect the temperature of the inner circumferential surface of the fixing belt 131. In this case, the amount of heat to be generated by the heaters 133 is controlled based on the temperature of the fixing belt 131 detected by the thermistor 138 to achieve a given fixing temperature of the fixing belt 131 at which the image can be fixed.

Figure 23:
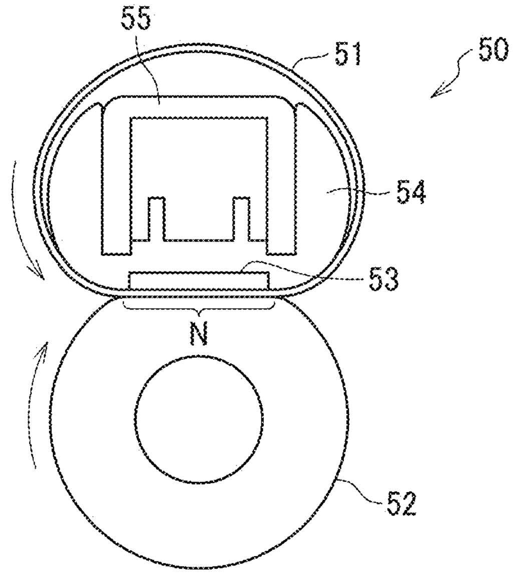
FIG. 23 is a cross-sectional view of a fixing device that is different from the fixing devices of FIGS. 2 and 21 but applicable to the above-described embodiments.
Figure 24:
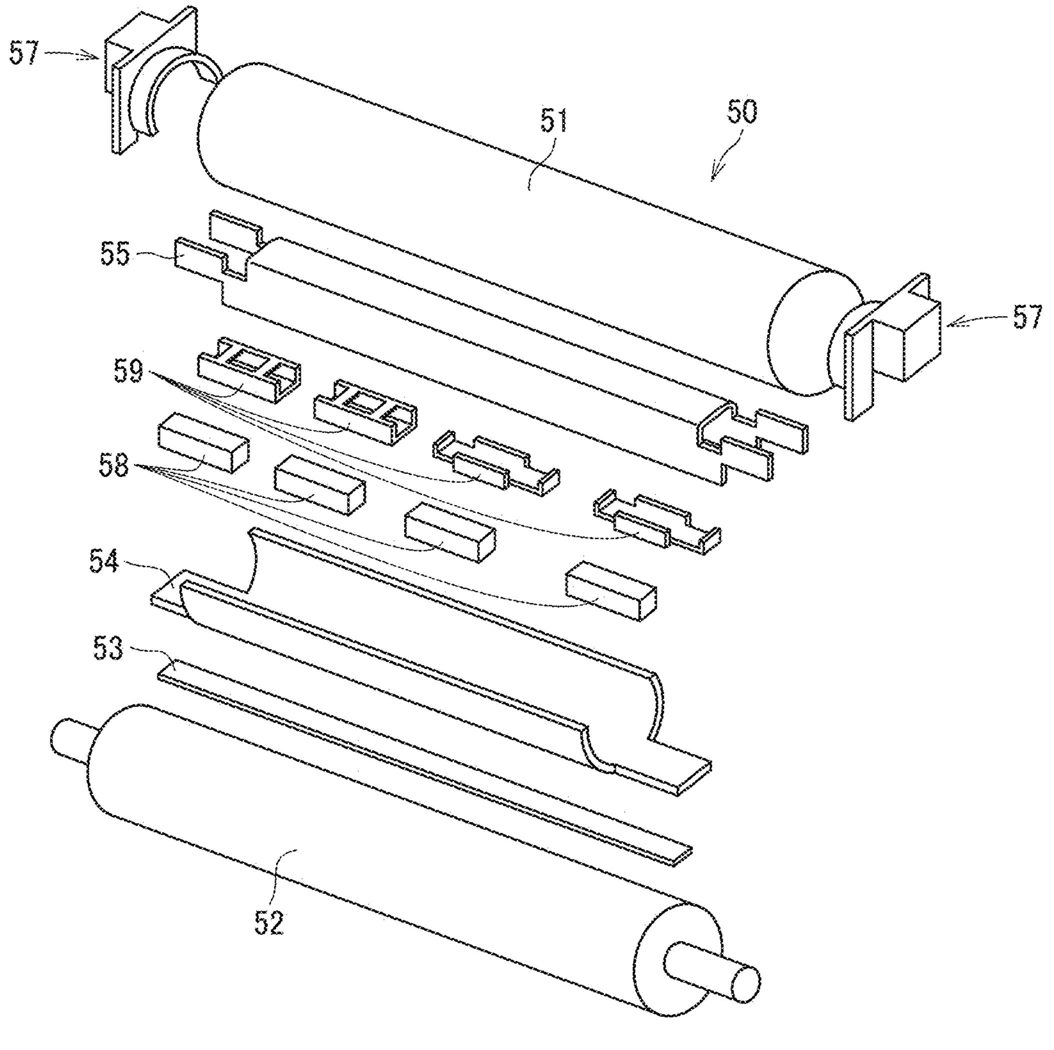
FIG. 24 is an exploded perspective view of the fixing device illustrated in FIG. 23.

Subsequently, a fixing device 50 illustrated in FIGS. 23 and 24 is described. Similar to the fixing device 130 illustrated in FIGS. 21 and 22, the fixing device 50 includes the ceramic heater (that is a heater 53). Specifically, the fixing device 50 illustrated in FIGS. 23 and 24 includes a fixing belt 51 as the first rotator, a pressure rotator 52 as the second rotator, the heater 53 as the heat source, a heater holder 54 as the heat source holder, a reinforcement 55, belt holders 57 as the rotator holders (see FIG. 24), heat-sensitive members 58 (see FIG. 24) as the temperature detector, and covers 59 (see FIG. 24).

Functions and configurations of the fixing belt 51, the pressure rotator 52, the heater 53, the heater holder 54, the reinforcement 55, and the belt holders 57 illustrated in FIGS. 23 and 24 are basically the same as those of the fixing belt 131, the pressure roller 132, the heater 133, the heater holder 134, the pressure stay 135, and the flanges 137 illustrated in FIGS. 21 and 22.

The heat-sensitive members 58 are disposed on a side of the heater holder 54 opposite a side of the heater holder 54 to hold the heater 53 and detect the temperature of the heater 53 via the heater holder 54. Based on temperatures detected by the heat-sensitive members 58, heat generation of the heater 53 is controlled so that the fixing belt 51 is maintained at a predetermined fixing temperature.

The covers 59 are box-shaped members made of heat-resistant resin. Each cover 59 is disposed so as to face the heater holder 54 via the heat-sensitive member 58 inside the loop of the fixing belt 51 to cover the corresponding heat-sensitive member 58.

Figure 25:
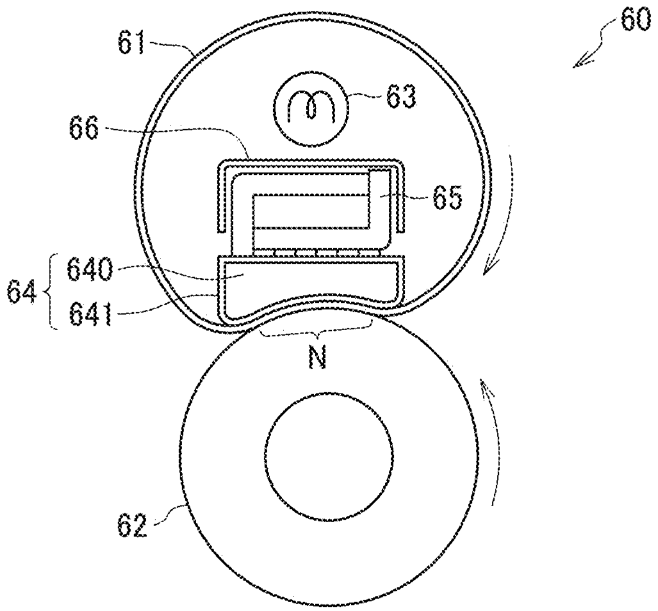
FIG. 25 is a cross-sectional view of a fixing device that is different from the fixing devices of FIGS. 2, 21, and 23 but applicable to the above-described embodiments.
Figure 26:
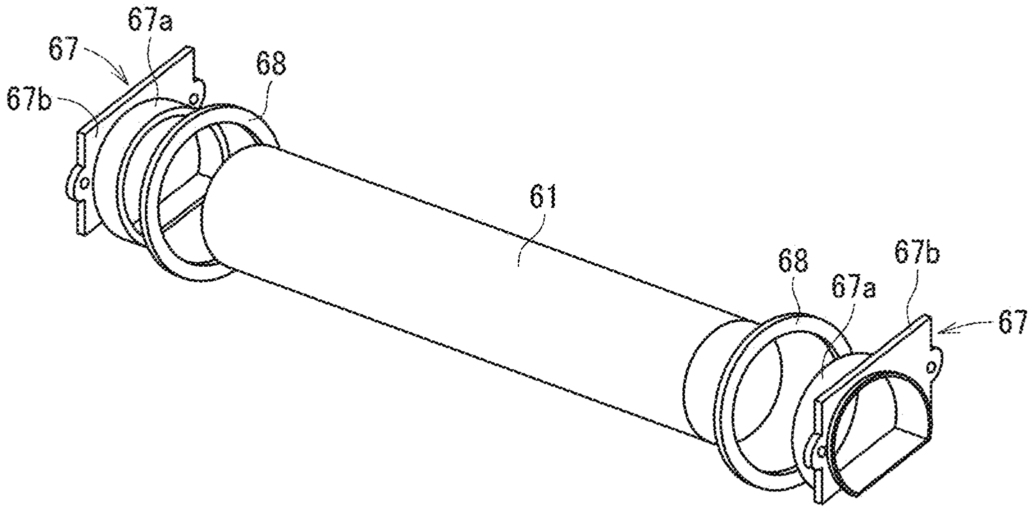
FIG. 26 is an exploded perspective view of the fixing device illustrated in FIG. 25.

Subsequently, a fixing device 60 illustrated in FIGS. 25 and 26 is described below. The fixing device 60 includes a halogen heater (i.e., a heater 63) as the heat source. Specifically, the fixing device 60 illustrated in FIGS. 25 and 26 includes a fixing belt 61 as the first rotator, a pressure roller 62 as the second rotator, the heater 63 as the heat source, a nip formation pad 64, a support 65 as the reinforcement, a reflective plate 66 as a reflector, retention frames 67 as the rotator holders (see FIG. 26), and rings 68 as slide aids (see FIG. 26).

Functions and configurations of the fixing belt 61, the pressure roller 62, and the retention frames 67 illustrated in FIGS. 25 and 26 are basically the same as those of the fixing belt 21, the pressure roller 22, and the belt holders 27 illustrated in FIG. 2.

The heater 63 is the halogen heater and is disposed inside the loop of the fixing belt 61. The heater 63 irradiates the inner circumferential surface of the fixing belt 61 with infrared light to heat the fixing belt 61.

The nip formation pad 64 is disposed inside the loop of the fixing belt 61. The nip formation pad 64 forms a nip N between the fixing belt 61 and the pressure roller 62 under pressure from the pressure roller 62. The nip formation pad 64 has one side pressed by the pressure roller 62 and the other side opposite the one side, and the support 65 supports the other side of the nip formation pad 64. The support 65 prevents the nip formation pad 64 from being bent by the pressure of the pressure roller 62. As a result, the nip N having a uniform width is obtained. The nip formation pad 64 includes a metal base pad 640 and a fluororesin sliding sheet 641 that is interposed between the base pad 640 and an inner circumferential surface of the fixing belt 61. The sliding sheet 641 interposed between the base pad 640 and the fixing belt 61 reduces the sliding friction of the fixing belt 61 with respect to the base pad 640.

The reflective plate 66 is disposed inside the loop of the fixing belt 61 to face the heater 63. In this configuration, the reflective plate 66 reflects a part of the infrared light emitted from the heater 63 to the inner circumferential surface of the fixing belt 61. As a result, the fixing belt 61 is heated by the infrared light reflected by the reflective plate 66 in addition to the infrared light directly emitted from the heater 63.

The ring 68 is mounted on an outer circumferential surface of a cylindrical portion 67*a* as an insertion portion of the retention frame 67 that is inserted into the loop formed by the fixing belt 61. The ring 68 is interposed between a longitudinal edge of the fixing belt 61 and a fixing plate 67*b* as a restraint of the retention frame 67. As the fixing belt 61 rotates, the ring 68 rotates together with the fixing belt 61, or the fixing belt 61 slides over the low-friction ring 68. Thus, the sliding friction that is generated between the fixing belt 61 and the retention frame 67 is reduced.

Figure 27:
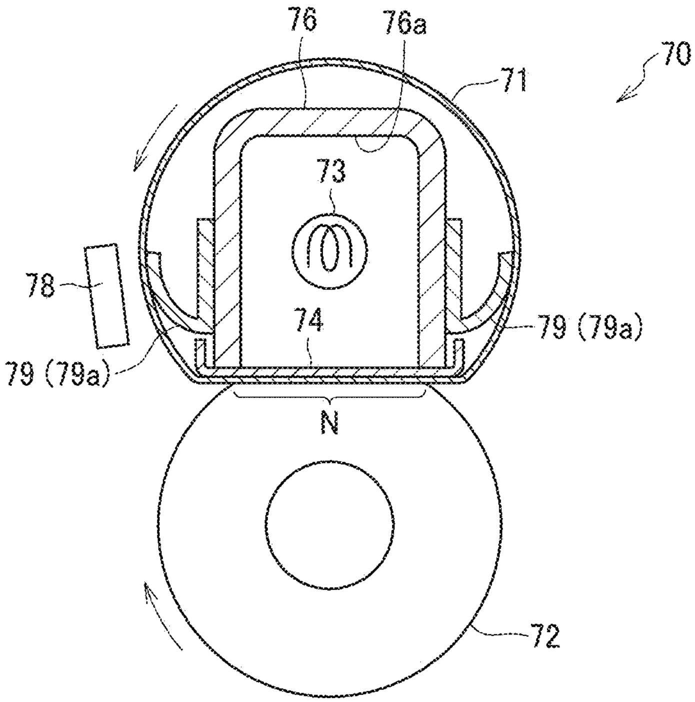
FIG. 27 is a cross-sectional view of a fixing device that is different from the fixing devices of FIGS. 2, 21, 23, and 25 but applicable to the above-described embodiments.
Figure 28:
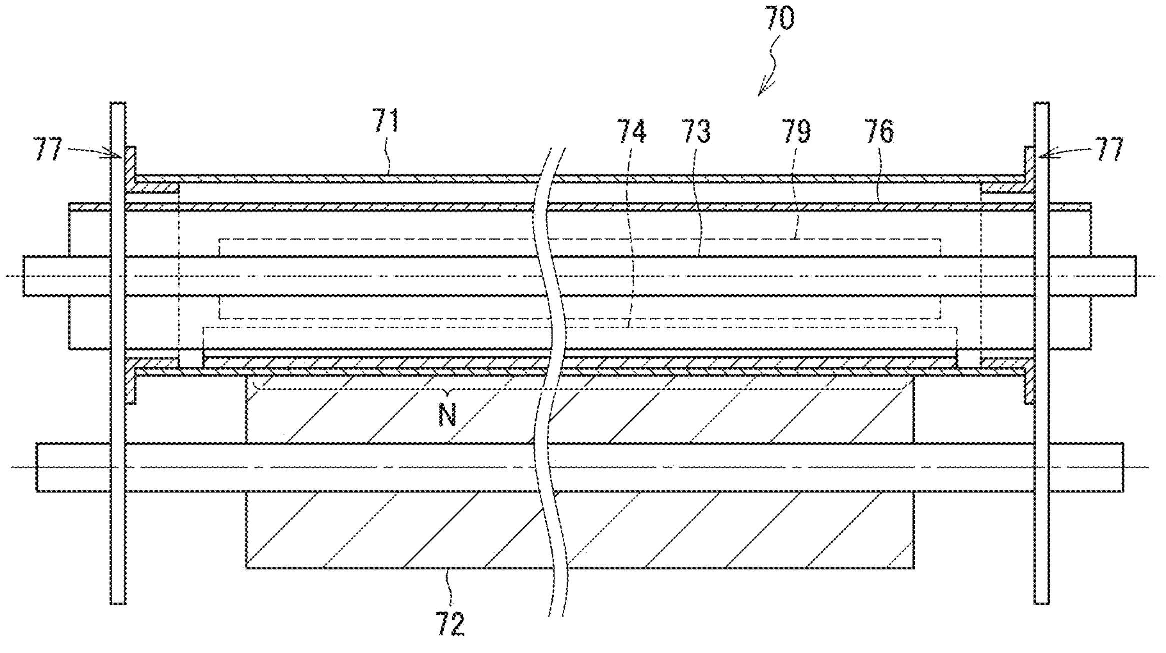
FIG. 28 is a cross-sectional view of the fixing device illustrated in FIG. 27, taken along a longitudinal direction of a fixing belt included in the fixing device.

Subsequently, a fixing device 70 illustrated in FIGS. 27 and 28 is described below. The fixing device 70 includes a fixing belt 71 as the first rotator, a pressure roller 72 as the second rotator, a halogen heater 73 as the heat source, a nip formation pad 74, a reflector 76, belt supports 77 (see FIG.

28) as a rotator holders, a temperature sensor 78 as the temperature detector, and guides 79.

Functions of the fixing belt 71, the pressure roller 72, and the belt supports 77 illustrated in FIGS. 27 and 28 are basically the same as those of the fixing belt 21, the pressure roller 22, and the belt holders 27 illustrated in FIG. 2.

The temperature sensor 78 is a non-contact-type temperature detector that is disposed not to be in contact with the outer circumferential surface of the fixing belt 71 and detects the temperature of the fixing belt 71.

The nip formation pad 74 is disposed inside the loop of the fixing belt 71 and sandwiches the fixing belt 71 together with the pressure roller 72, to form the nip N.

The reflector 76 is disposed inside the loop of the fixing belt 71 and has a U-shape in a cross section so as to surround the halogen heater 73. The inner face of the reflector 76 includes a reflecting surface 76*a* having a high reflectivity and facing the halogen heater 73. When the infrared light is emitted from the halogen heater 73, the reflecting surface 76*a* of the reflector 76 reflects the infrared light to the nip formation pad 74. As a result, the nip formation pad 74 is heated by the infrared light directly emitted from the halogen heater 73 to the nip formation pad 74 and the infrared light reflected by the reflector 76 to the nip formation pad 74. The heat is conducted from the nip formation pad 74 to the fixing belt 71 at the nip N to heat the fixing belt 71. The nip formation pad 74 forms the nip N and, in addition, functions as a heat conductor that conducts heat to the fixing belt 71 at the nip N. To function as described above, the nip formation pad 74 is made of metal having good thermal conductivity such as copper or aluminum.

The reflector 76 also functions as a reinforcement (in other words, a stay) that supports and reinforces the nip formation pad 74. Since the reflector 76 supports the nip formation pad 74 throughout the length of the fixing belt 71, the bending of the nip formation pad 74 is prevented and the nip N having a uniform width is formed between the fixing belt 71 and the pressure roller 72. The reflector 76 is preferably made of metal having relatively high rigidity such as SUS or SECC to have the function as a support.

The guides 79 are disposed inside the loop of the fixing belt 71 to guide the inner circumferential surface of the fixing belt 71 rotating. Each of the guides 79 has a guide face 79*a* curving along the inner circumferential surface of the fixing belt 71. As the fixing belt 71 is guided along the guide face 79*a*, the fixing belt 71 smoothly rotates without being largely deformed.

Figure 29:
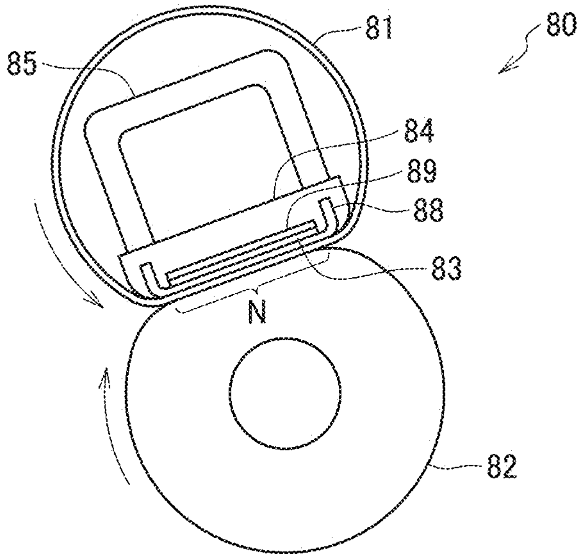
FIG. 29 is a cross-sectional view of a fixing device that is different from the fixing devices of FIGS. 2, 21, 23, 25, and 27 but applicable to the above-described embodiments.
Figure 30:
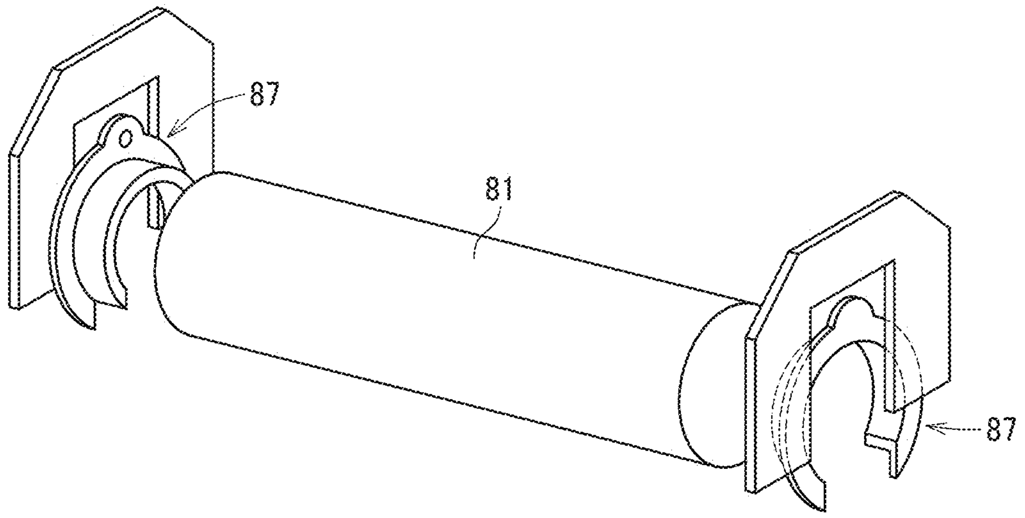
FIG. 30 is an exploded perspective view of the fixing device illustrated in FIG. 29.

Subsequently, a fixing device 80 illustrated in FIGS. 29 and 30 is described below. The fixing device 80 includes a ceramic heater (i.e., a heater 83) as the heat source. The fixing device 80 illustrated in FIGS. 29 and 30 includes a fixing belt 81 as the first rotator, a pressure roller 82 as the second rotator, the heater 83 as the heat source, a holder 84 as the heat source holder, a stay 85 as the reinforcement, arc-shaped guides 87 (see FIG. 30) as the rotator holders, a heat diffuser 88 as the heat conductor, and a heat retaining plate 89 as the heat insulator.

Functions and configurations of the fixing belt 81, the pressure roller 82, the heater 83, the holder 84, the stay 85, and the arc-shaped guides 87 illustrated in FIGS. 29 and 30 are basically the same as those of the fixing belt 21, the pressure roller 22, the heater 23, the heater holder 24, the stay 25, and the belt holders 27 illustrated in FIG. 2. In addition to the heater 83, the holder 84 holds the heat diffuser 88 and the heat retaining plate 89 that are overlaid.

The heat diffuser 88 is made of metal such as stainless steel, aluminum alloy, or iron. The heat diffuser 88 is disposed so as to be in contact with the inner circumferential surface of the fixing belt 81, transmits heat generated by the heater 83 to the fixing belt 81, and is in contact with the pressure roller 82 via the fixing belt 81 to form the nip N. Thermal conductive grease is applied between the heater 83 and the heat diffuser 88 to enhance heat transfer efficiency from the heater 83 to the heat diffuser 88. On the other hand, the heat retaining plate 89 is disposed on a side of the heater 83 opposite a side of the heater 83 facing the heat diffuser 88 to prevent the heat of the heater 83 from being transmitted to the holder 84 and the stay 85.

Since the fixing belt 81 rotates and slides on the heat diffuser 88, lubricant is applied between the fixing belt 81 and the heat diffuser 88 to enhance sliding performance. A sliding surface of the heat diffuser 88 in contact with the fixing belt 81 is formed with a surface layer such as a glass coating layer or a hard chromium plating layer each having low friction and wear resistance.

Figure 31:
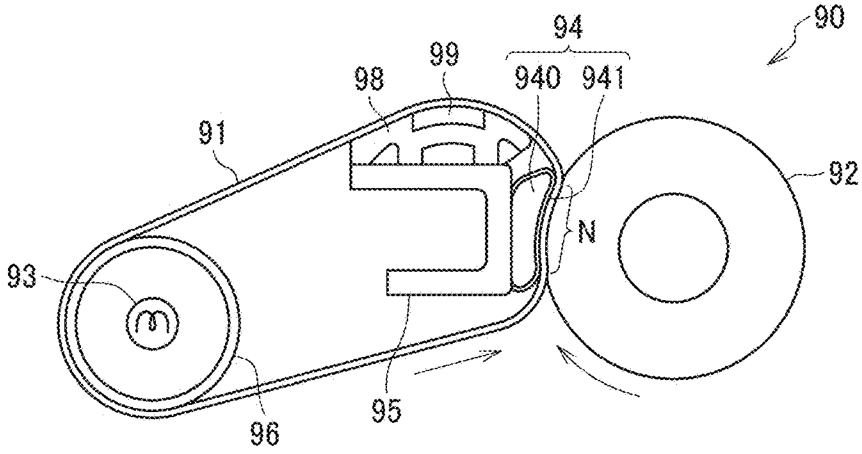
FIG. 31 is a cross-sectional view of a fixing device that is different from the fixing devices of FIGS. 2, 21, 23, 25, 27, and 29 but applicable to the above-described embodiments.
Figure 32:
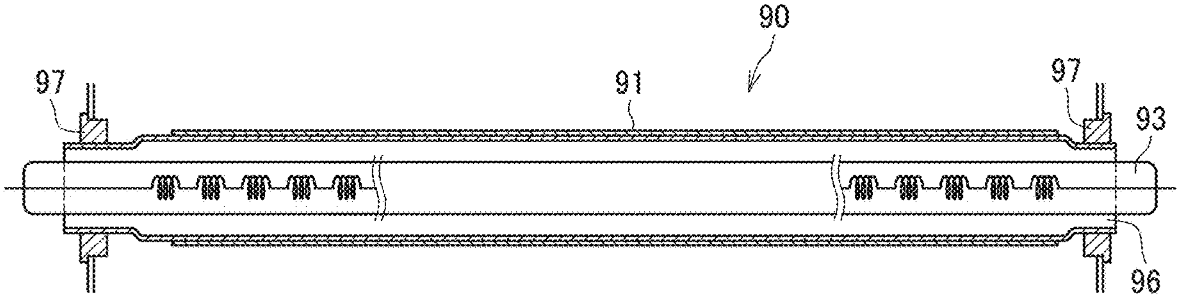
FIG. 32 is a cross-sectional view of a holding structure to hold a heating roller illustrated in FIG. 31.

Subsequently, a fixing device 90 illustrated in FIGS. 31 and 32 is described below. The fixing device 90 includes an endless belt 91 as the first rotator, a heating roller 96 as a heating member, a heater 93 as the heating source, a pressure roller 92 as the second rotator, a nip formation pad 94, a support 95 as the reinforcement, a guide 98, a lubricant applicator 99 as a lubricant supplier, and bearings 97 (see FIG. 32).

As illustrated in FIG. 31, the belt 91 is wound around the heating roller 96, the nip formation pad 94, and the guide 98. As illustrated in FIG. 32, the heating roller 96 is rotatably held by a pair of bearings 97 disposed on the outer circumferential surface of both ends of the heating roller 96 in the axial direction (longitudinal direction) of the heating roller 96. In addition, a biasing member such as a spring presses the heating roller 96 in a direction away from the nip formation pad 94 to apply a predetermined tension to the belt 91. In this state, rotating the pressure roller 92 rotates the belt 91.

The nip formation pad 94 includes a pressing member 940 and a low-friction sliding sheet 941 that is interposed between the pressing member 940 and the inner circumferential surface of the fixing belt 91. The pressing member 940 is supported by the support 95 to receive the pressing force of the pressure roller 92 and form the nip N.

The heater 93 is the halogen heater and is disposed in the heating roller 96. The heater 93 generating heat heats the heating roller 96, and the heat of the heating roller 96 is transmitted to the belt 91.

The lubricant applicator 99 comes into contact with the inner circumferential surface of the belt 91 and supplies the lubricant to enhance slidability with respect to the inner circumferential surface of the belt 91. The lubricant supplied to the inner circumferential surface of the belt 91 is interposed between the guide 98 and the belt 91 and between the nip formation pad 94 and the belt 91 as the belt 91 rotates, so that the belt 91 can smoothly rotate.

Figure 33:
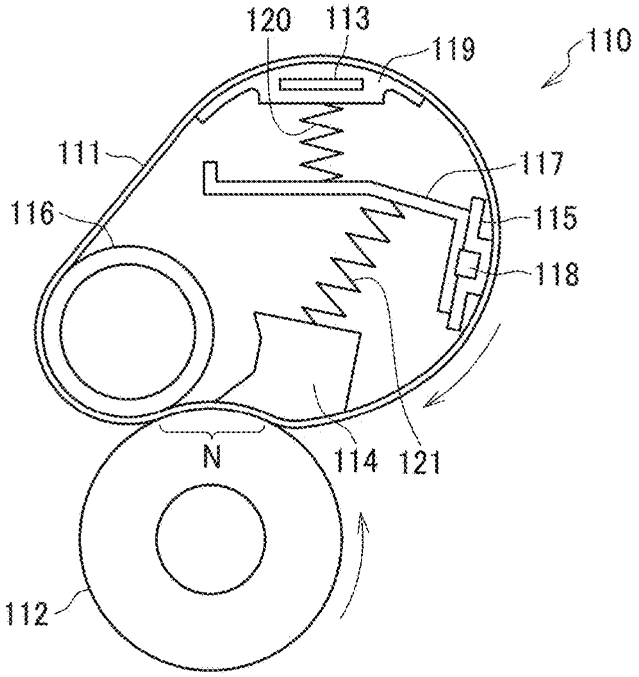
FIG. 33 is a cross-sectional view of a fixing device that is different from the fixing devices of FIGS. 2, 21, 23, 25, 27, 29, and 31 but applicable to the above-described embodiments.
Figure 34:
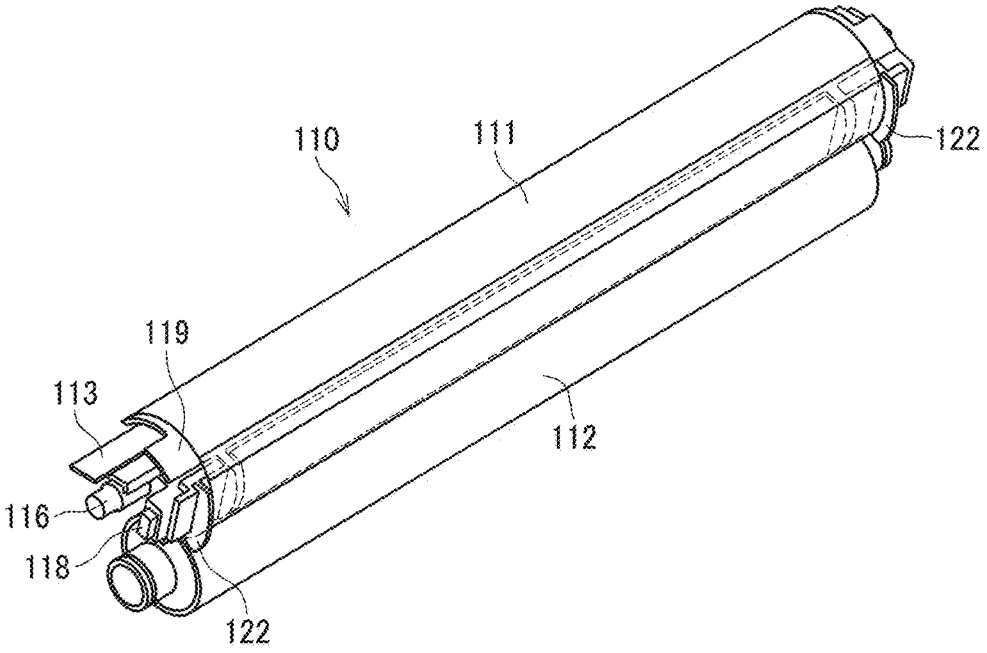
FIG. 34 is a perspective view of a part of the fixing device illustrated in FIG. 33.

Subsequently, a fixing device 110 illustrated in FIGS. 33 and 34 is described below. The fixing device 110 includes a fixing belt 111 as the first rotator, a fixing roller 116, a pressure roller 112 as the second rotator, a heater 113 as the heat source, a pressing pad 114 as the nip formation pad, a guide 115, a support 117 as the reinforcement, a temperature sensor 118 as the temperature detector, a heat transferor 119, and belt holders 122 (see FIG. 34) as the rotator holders.

The fixing belt 111 is wound around the fixing roller 116, the pressure pad 114, the guide 115, and the heat transferor 119. The pressure roller 112 is at a position opposite the pressure pad 114 and pressed against the outer circumferential surface of the fixing belt 111. In such a configuration, rotating the pressure roller 112 rotates the fixing roller 116.

The heater 113 is a planar heater or a plate-shaped heater such as a ceramic heater and disposed in the heat transferor 119. The heat transferor 119 is interposed between the heater 113 and the fixing belt 111 to transfer the heat of the heater 113 to the fixing belt 111. A spring 120 attached to the support 117 biases the heat transferor 119 against the fixing belt 111 so that the heat transferor 119 comes into contact with the inner circumferential surface of the fixing belt 111.

Another spring 121 attached to the support 117 biases the pressing pad 114 against the fixing belt 111 so that the pressing pad 114 comes into contact with the inner circumferential surface of the fixing belt 111. As a result, the pressing pad 114 is pressed against the pressure roller 112 via the fixing belt 111 to form the nip N between the fixing belt 111 and the pressure roller 112.

The guide 115 is attached to and supported by the support 117. A temperature sensor 118 is attached to the guide 115 and detects the temperature of the fixing belt 111.

Figure 35:
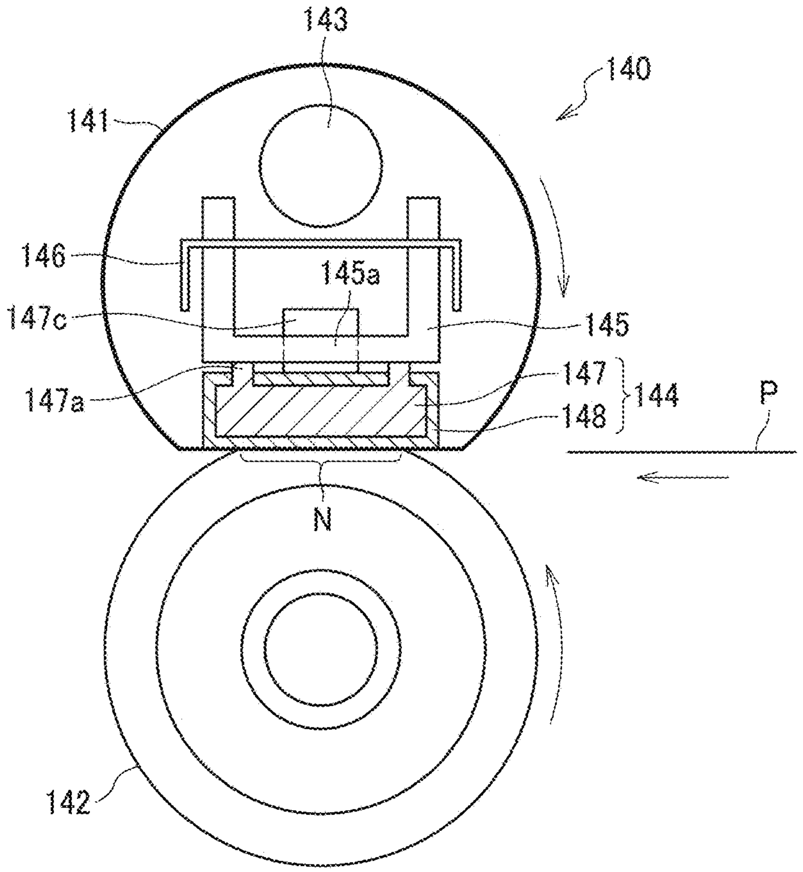
FIG. 35 is a cross-sectional view of a fixing device that is different from the fixing devices of FIGS. 2, 21, 23, 25, 27, 29, 31, and 33 but applicable to the above-described embodiments.
Figure 36:
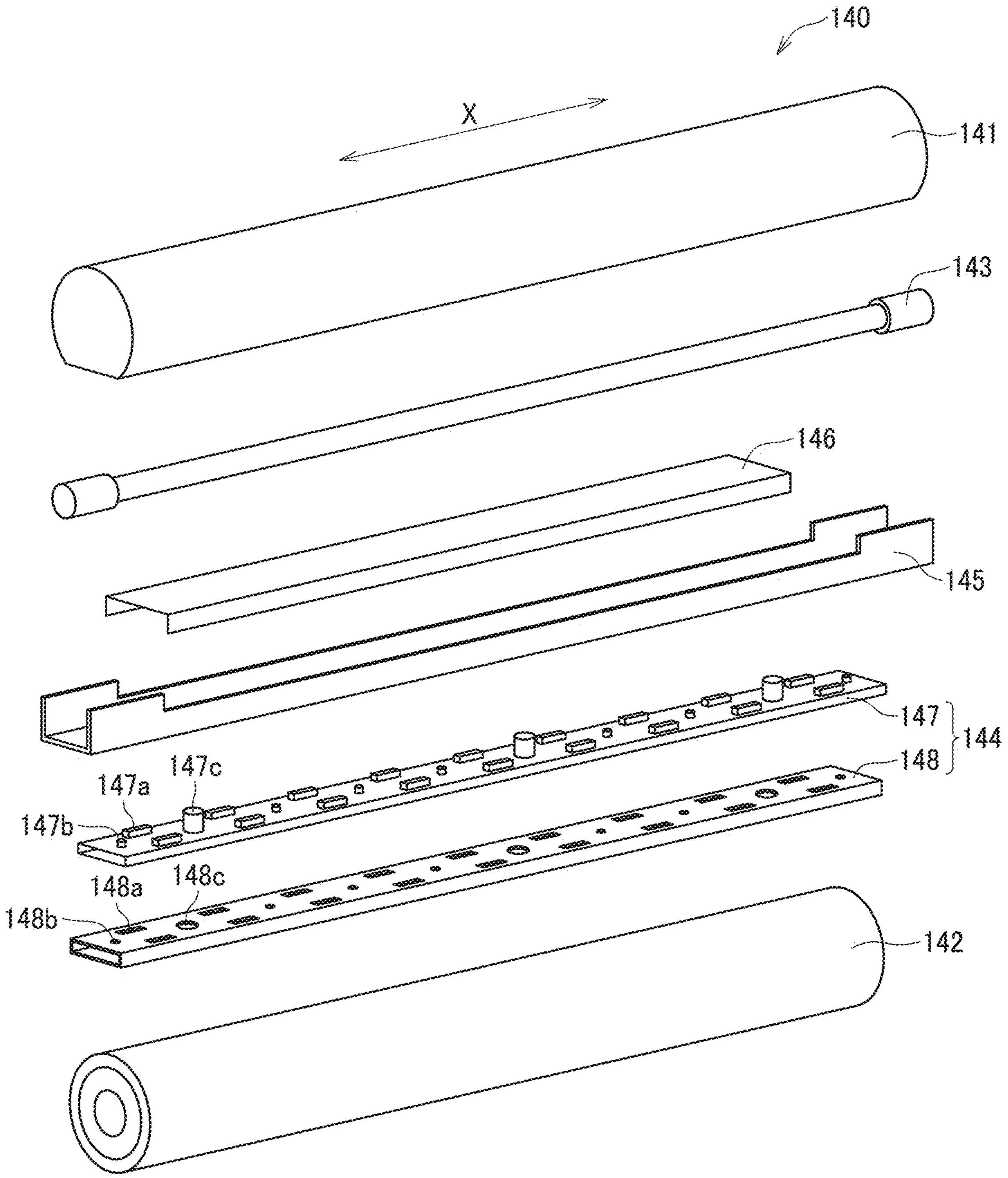
FIG. 36 is an exploded perspective view of the fixing device illustrated in FIG. 35.

Subsequently, a fixing device 140 illustrated in FIGS. 35 and 36 is described below. The fixing device 140 includes a fixing belt 141 as the first rotator, a pressure roller 142 as the second rotator, a heater 143 as the heat source, a nip formation pad 144, a stay 145 as the reinforcement, and a reflector 146 as the reflector. The nip formation pad 144 includes a metal supporter 147 and a pad 148.

The fixing belt 141 is an endless belt having a predetermined inner diameter and a width larger than the width of the sheet P. The fixing belt 141 is made of a flexible material, and includes, for example, a base layer, an elastic layer on the outer circumferential face of the base layer, and a release layer on the outer circumferential face of the elastic layer.

The base layer is made of metal such as SUS or nickel (Ni). The elastic layer is made of, for example, silicone rubber. The release layer is made of, for example, a PFA tube. A fixing housing as the rotator support rotatably supports both ends of the fixing belt 141 in the longitudinal direction of the fixing belt 141.

A stay 145 penetrates through a lower portion of a space extending in the longitudinal direction of the fixing belt 141 inside the loop of the fixing belt 141. The stay 145 is a channel-shaped component having side walls projecting upward and longer than the length of the fixing belt 141 in the longitudinal direction X of the fixing belt 141. The fixing housing supports both ends of the stay 145 in the longitudinal direction.

The stay 145 has a bottom plate having three positioning holes 145*a* (see FIG. 35) arranged at predetermined intervals in the longitudinal direction X of the fixing belt 141. Upper ends of the side walls of the stay 145 support the reflector 146.

The heater 143 (for example, the halogen heater) has a length equivalent to the length of the fixing belt 141 in the longitudinal direction X. The heater 143 is disposed in an upper portion of the space inside the loop of the fixing belt 141 (in other words, above the stay 145), and the fixing housing supports both ends of the heater 143 in the longitudinal direction.

The heater 143 radiates radiant heat (including infrared light) to the inner circumferential surface of the fixing belt 141 (mainly a portion slightly narrower than the upper half circumferential surface of the fixing belt 141) to heat the fixing belt 141. The radiant heat radiated downward from the heater 143 is reflected by the reflector 146 to the inner circumferential surface of the fixing belt 141. The heater 143 is controlled by a controller.

The pressure roller 142 includes a core, an elastic layer on the outer circumferential face of the core, and a release layer on the outer circumferential face of the elastic layer. The elastic layer is made of, for example, silicone rubber.

The release layer is made of, for example, a PFA tube.

The pressure roller 142 is disposed below the fixing belt 141 and is supported by the fixing housing. The pressure roller 142 is in contact with the outer circumferential surface of the fixing belt 141 to form the nip N between the pressure roller 142 and the fixing belt 141. The pressure roller 142 is coupled to, for example, a motor, and the motor rotates the pressure roller 142. The controller controls the motor. The fixing belt 141 is driven by the pressure roller 142. Rotating the pressure roller 142 counterclockwise in FIG. 35 rotates the fixing belt 141 in a clockwise direction reverse to the rotation direction of the pressure roller 142. The rotating pressure roller 142 and the rotating fixing belt 141 convey the sheet P after the sheet P enters the nip N, and the sheet P passes through the nip N.

The metal supporter 147 has a flat rectangular parallelepiped shape extending in the longitudinal direction X of the fixing belt 141 and is made of, for example, metal. The metal supporter 147 includes multiple (eighteen) projections 147*a*, multiple (seven) fixing pins 147*b*, and multiple (three) positioning pins 147*c* that project upward from predetermined positions on the upper face of the metal support 147.

The pad 148 is a rectangular sheet having a width equal to the width of the metal supporter 147 and a length that allows the pad to be wound around the metal supporter 147 once and, for example, made by weaving PTFE fibers and PPS fibers.

The pad 148 is wound around the metal supporter 147 by one turn, and both ends of the pad 148 are overlapped on the upper face of the metal supporter 147. Both ends of the pad 148 have openings 148*a*, fixing holes 148*b*, and positioning holes 148*c*, and the projections 147*a*, the fixing pins 147*b*, and the positioning pins 147*c* on the metal support 147 are fitted into the openings 148*a*, the fixing holes 148*b*, and the positioning holes 148*c*, respectively.

Fitting the positioning pins 147*c* of the metal supporter 147 into the positioning holes 145*a* of the stay 145 positions the nip formation pad 144 with respect to the stay 145.

Lubricant such as oil or grease may be applied to the pad 148. In this case, the pad 148 is in contact with the inner circumferential surface of the fixing belt 141 via the lubricant.

The above-described fixing devices to which the embodiments according to the present disclosure are applicable each include a rotator such as the fixing belt and a component inside the loop of the rotator, and the rotator slides on the component. Accordingly, the lubricant is used to reduce the sliding friction between the component and the rotator. Heating the rotator increases the temperature of the lubricant applied to the inner circumferential surface of the rotator which generates the FP/UFP from the lubricant and may cause the discharge of the FP/UFP from the opening of the rotator support supporting the rotator. Applying any one of the embodiments of the present disclosure to these fixing devices and covering the opening of the rotator support with the cover can reduce the discharge of FP/UFP to the outside, similarly to the fixing device according to any one of the above-described embodiments.

The embodiments of the present disclosure are also applicable to fixing devices as illustrated in FIGS. 37 to 40, respectively, in addition to the fixing devices described above. The configurations of fixing devices illustrated in FIGS. 37 to 40 are described below.

Figure 37:
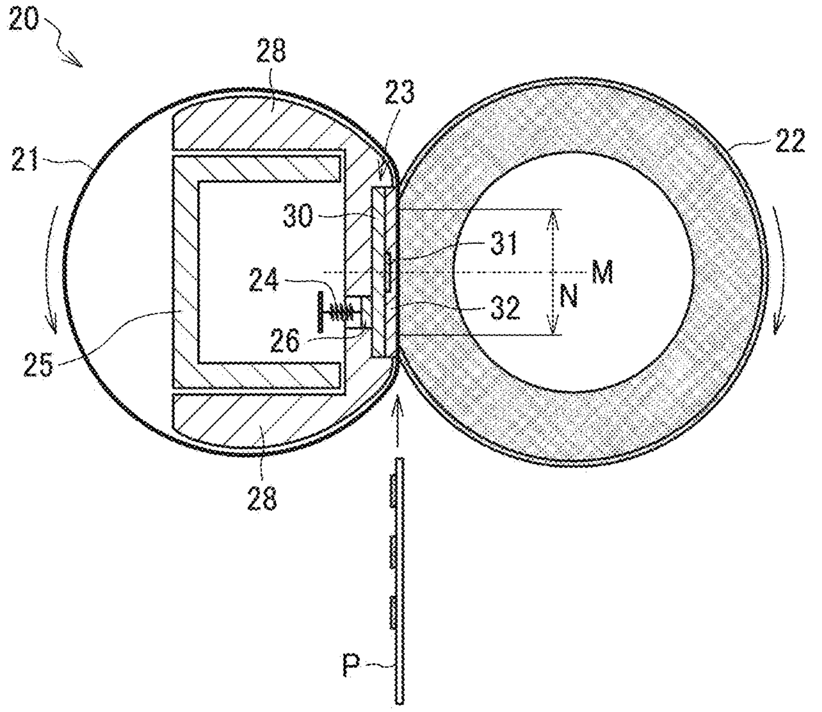
FIG. 37 is a cross-sectional view of a fixing device having a configuration different from the above-described fixing devices.

A different point between the fixing device 20 illustrated in FIG. 37 and the fixing device 20 illustrated in FIG. 2 is the position of the temperature sensor 26 to detect the temperature of the heater 23. Other than that, the configuration illustrated in FIG. 37 is the same as that in FIG. 2. In the fixing device 20 illustrated in FIG. 37, the temperature sensor 26 is disposed upstream from the center M of the nip N in the sheet conveyance direction (that is, near a nip entrance). In the fixing device 20 illustrated in FIG. 2, the temperature sensor 26 is disposed in the center M of the nip N in the sheet conveyance direction. The temperature sensor 26 disposed upstream from the center M of the nip N in the sheet conveyance direction as illustrated in FIG. 37 can accurately detect the temperature near the nip entrance. Since the sheet P entering the nip N particularly easily takes the heat of the fixing belt 21 away in a portion near the nip entrance, the temperature sensor 26 that accurately detects the temperature at the portion near the nip entrance enables enhancing the fixing property of the image and effectively preventing the occurrence of fixing offset (that is, a state in which the toner image cannot be sufficiently heated).

Figure 38:
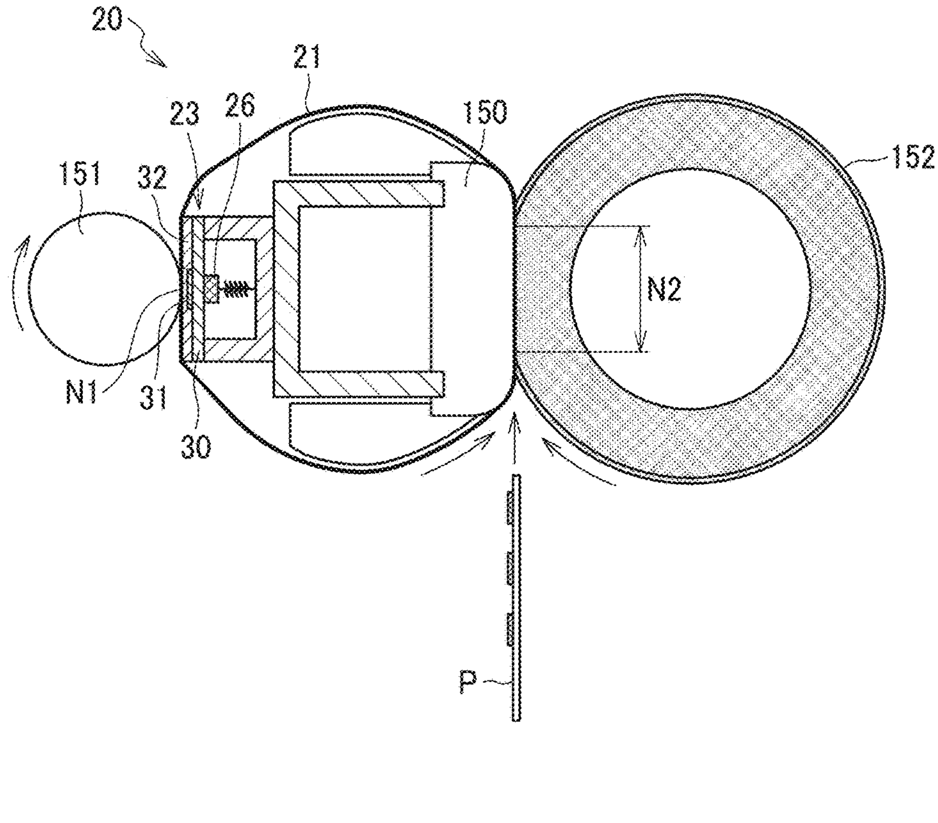
FIG. 38 is a cross-sectional view of a fixing device having a configuration different from the above-described embodiments.

Subsequently, the fixing device 20 in the present embodiment is described with reference to FIG. 38. The fixing device 20 illustrated in FIG. 38 has a heating nip N1 in which the heater 23 heats the fixing belt 21 and a fixing nip N2 through which the sheet P passes, and the heating nip N1 and the nip N2 are formed at different positions. Specifically, the fixing device 20 in the present embodiment includes a nip formation pad 150 inside the loop of the fixing belt 21 in addition to the heater 23. A pressure roller 151 presses the heater 23 via the fixing belt 21 to form the heating nip N1 between the heater 23 and the pressure rollers 151. A pressure roller 152 presses the nip formation pad 150 to form the fixing nip N2 between the nip formation pad 150 and the pressure roller 152. In the above-described fixing device 20, the heater 23 heats the fixing belt 21 in the heating nip N1, and the fixing belt 21 applies the heat to the sheet P in the fixing nip N2 to fix the unfixed image onto the sheet P.

Figure 39:
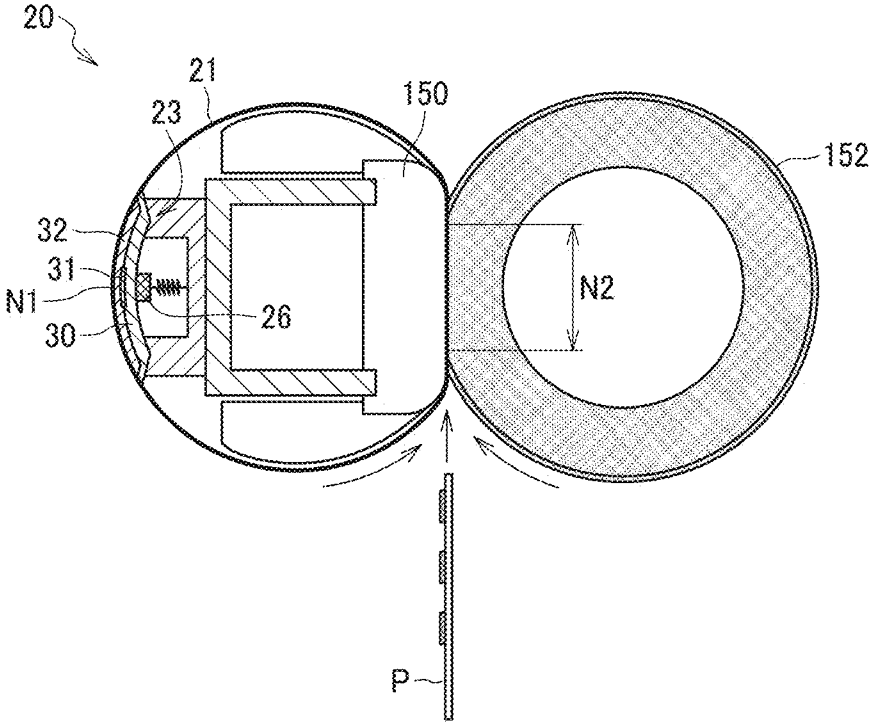
FIG. 39 is a cross-sectional view of a fixing device having a configuration different from the above-described embodiments.

Subsequently, the fixing device 20 illustrated in FIG. 39 is described. The fixing device 20 illustrated in FIG. 39 omits the above-described pressure roller 151 adjacent to the heater 23 from the fixing device 20 illustrated in FIG. 38 and includes the heater 23 formed to be arc having a curvature of the fixing belt 21. The other configuration is the same as the configuration illustrated in FIG. 38. In this case, the arc-shaped heater 23 surely maintains a length of the contact between the fixing belt 21 and the heater 23 in a belt rotation direction to efficiently heat the fixing belt 21.

Figure 40:
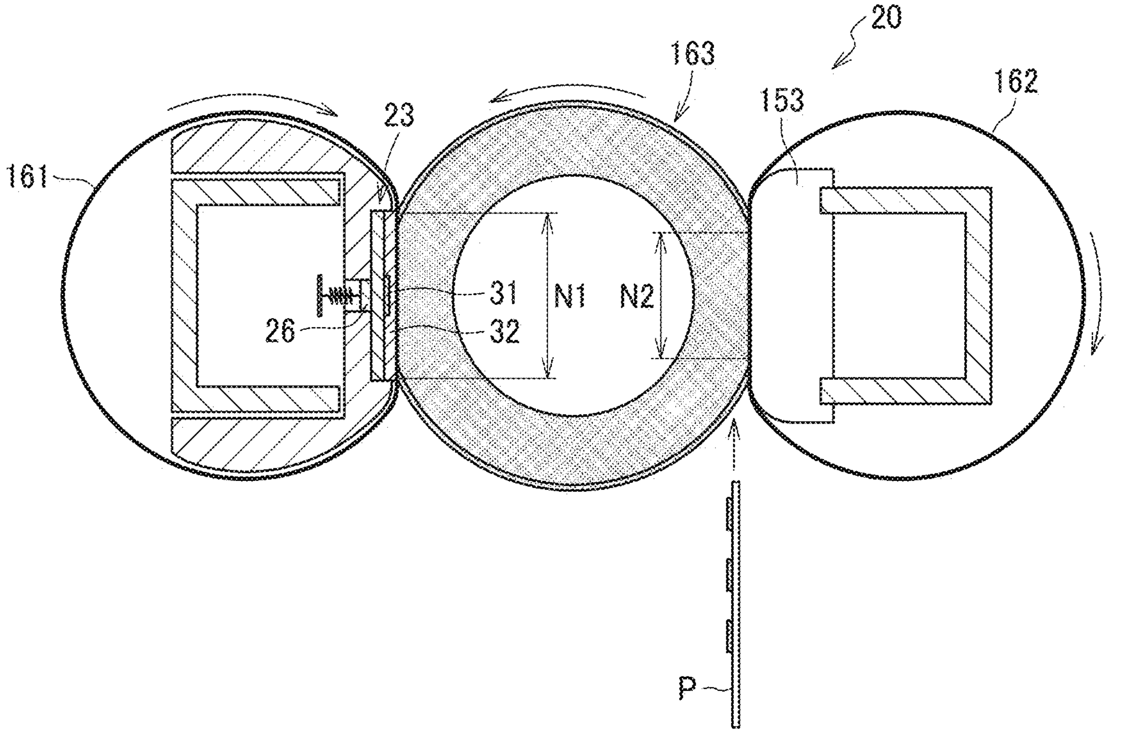
FIG. 40 is a cross-sectional view of a fixing device having a configuration different from the above-described embodiments.

Subsequently, the fixing device 20 illustrated in FIG. 40 is described. The fixing device 20 illustrated in FIG. 40 includes a roller 163 between a pair of belts 161 and 162. The fixing device 20 includes the heater 23 disposed inside the loop of the belt 161 on the left side in FIG. 40 and a nip formation pad 153 disposed inside the loop of the belt 162 on the right side in FIG. 40. The heater 23 is in contact with the roller 163 via the left belt 161 to form the heating nip N1. The nip formation pad 153 is in contact with the roller 163 via the right belt 162 to form the fixing nip N2.

Applying any one of the embodiments of the present disclosure to the above-described fixing devices illustrated in FIGS. 37 to 40 can reduce the discharge of FP/UFP to the outside, similarly to the fixing device according to any one of the above-described embodiments.

Figure 41:
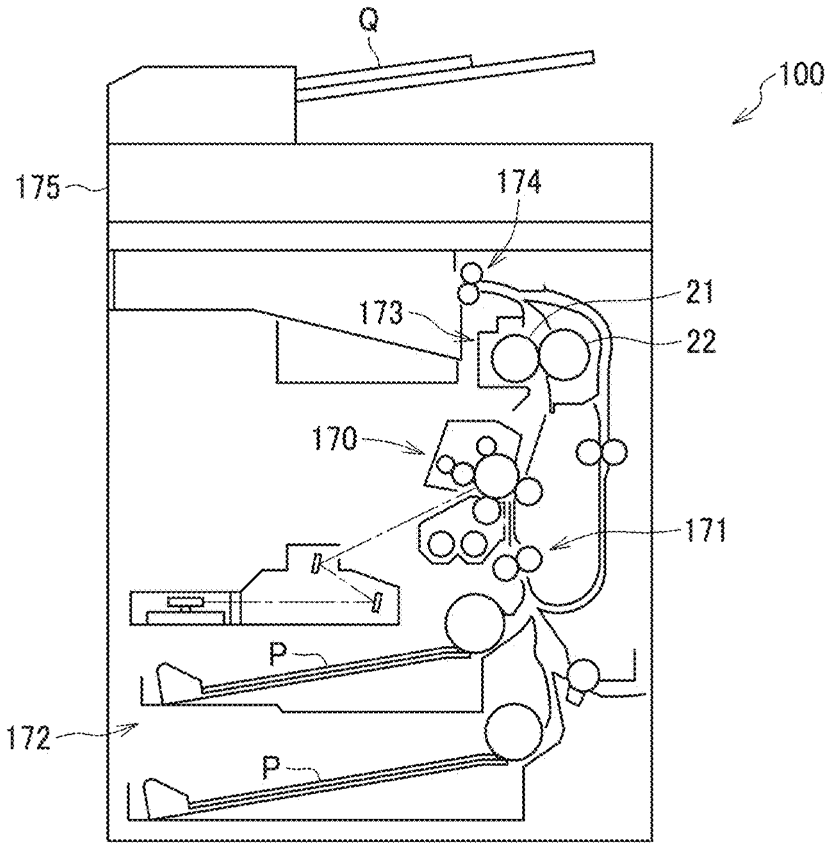
FIG. 41 is a schematic diagram of an image forming apparatus having a configuration different from the image forming apparatus according to the above-described embodiment.

The image forming apparatus to which the embodiments of the present disclosure are applied is not limited to the color image forming apparatus illustrated in FIG. 1, and the embodiments of the present disclosure may be applied to an image forming apparatus having a configuration illustrated in FIG. 41. The following describes another embodiment of the image forming apparatus to which the present embodiments may be applied.

The image forming apparatus 100 illustrated in FIG. 41 includes an image forming device 170 including a photoconductor drum, a sheet conveyer including a timing roller pair 171, a sheet feeder 172, a fixing device 173, a sheet ejection device 174, and a reading device 175. The sheet feeder 172 includes a plurality of sheet feeding trays, and the sheet feeding trays store sheets of different sizes, respectively.

The reading device 175 reads an image of a document Q. The reading device 175 generates image data from the read image. The sheet feeder 172 stores the sheets P and feeds the sheet P to the conveyance path. The timing roller pair 171 conveys the sheet P on the conveyance path to the image forming device 170.

The image forming device 170 forms a toner image on the sheet P. Specifically, the image forming device 170 includes the photoconductor drum, a charging roller, the exposure device, the developing device, a supply device, a transfer roller, the cleaning device, and a discharger. The fixing device 173 heats and presses the toner image to fix the toner image on the sheet P. Conveyance rollers convey the sheet P on which the toner image has been fixed to the sheet ejection device 174. The sheet ejection device 174 ejects the sheet P to the outside of the image forming apparatus 100.

Subsequently, a fixing device 173 according to the present embodiment is described with reference to FIG. 42. In the configuration illustrated in FIG. 42, components common to those of the fixing device 20 of the above-described embodiment illustrated in FIG. 2 are denoted by like reference signs, and overlapping description may be simplified or omitted as appropriate.

Figure 42:
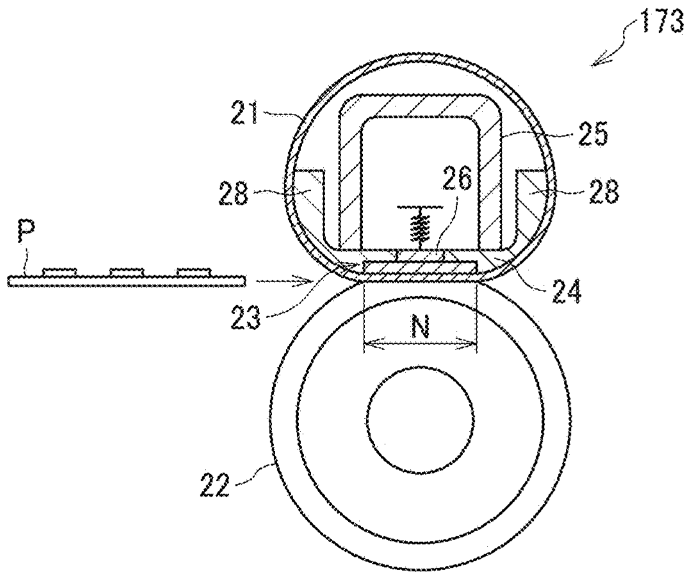
FIG. 42 is a cross-sectional view of the fixing device illustrated in FIG. 41.

As illustrated in FIG. 42, the fixing device 173 includes the fixing belt 21, the pressure roller 22, the heater 23, the heater holder 24, the stay 25, and the temperature sensors 26.

The nip N is formed between the fixing belt 21 and the pressure roller 22. The nip width of the nip Nis 10 mm, and the linear velocity of the fixing device 173 is 240 mm/s.

The fixing belt 21 includes a polyimide base layer and the release layer and does not include the elastic layer. The release layer is made of a heat-resistant film material made of, for example, fluororesin. The outer loop diameter of the fixing belt 21 is about 24 mm.

The pressure roller 22 includes the core, the elastic layer, and the release layer. The pressure roller 22 has an outer diameter of 24 mm to 30 mm, and the elastic layer has a thickness of 3 mm to 4 mm.

The heater 23 includes the base, a thermal insulation layer, a conductor layer including the resistive heat generators, and the insulation layer, and is formed to have a thickness of 1 mm as a whole. The width of the heater 23 in the sheet conveyance direction is, for example, 13 mm.

Figure 43:
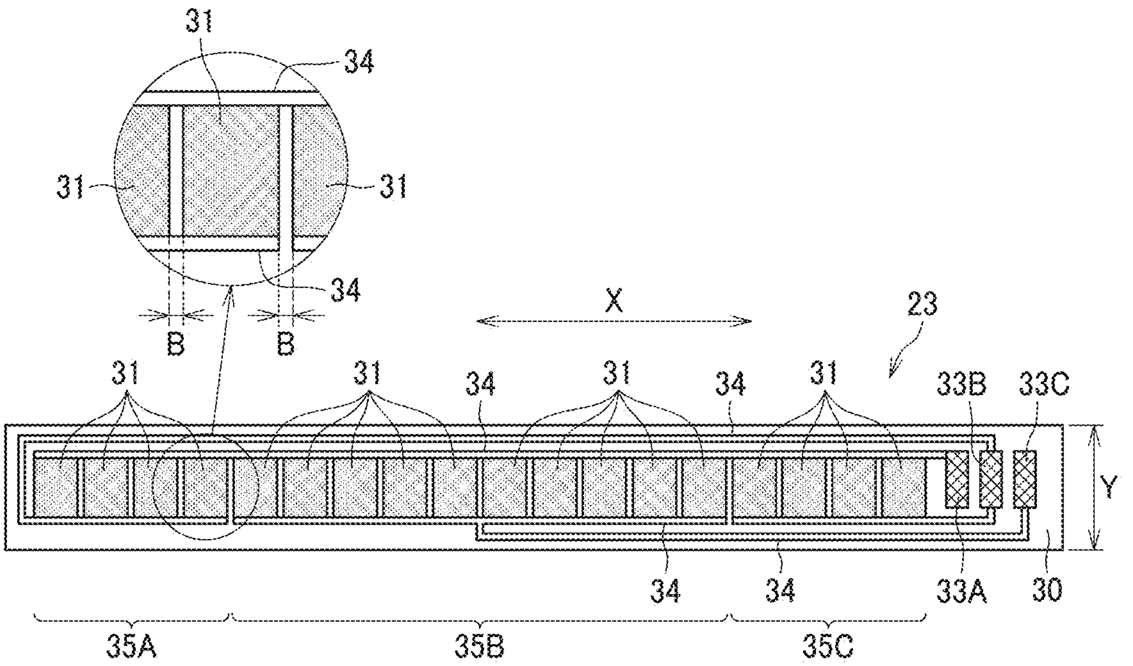
FIG. 43 is a plan view of the heater illustrated in FIG. 42.

As illustrated in FIG. 43, the conductor layer of the heater 23 includes the resistive heat generators 31, the power supply lines 34, and electrodes 33A to 33C. The resistive heat generators 31 are arranged at intervals in the longitudinal direction of the heater 23 (that is, the direction indicated by the arrow X). In the following description, a portion between the neighboring resistive heat generators 31 is referred to as a separation area B. As illustrated in an enlarged view of FIG. 43, the separation area B is formed between neighboring resistive heat generators of the resistive heat generators 31. The enlarged view of FIG. 43 illustrates two separation areas B, but the separation area B is formed between the neighboring resistive heat generators of all the resistive heat generators 31. In FIG. 43, a direction indicated by an arrow Y is a direction intersecting or orthogonal to the longitudinal direction X of the heater 23, which is referred to as a longitudinal intersecting direction. The longitudinal intersecting direction is different from the thickness direction of the base 30.

In addition, the direction indicated by the arrow Y is the same as a direction intersecting an arrangement direction of the resistive heat generators 31, a short-side direction of the heater 23 along a surface of the base 30 on which the resistive heat generators 31 are disposed, and the sheet conveyance direction of the sheet passing through fixing device.

The heater 22 includes a central heat generation portion 35B and end heat generation portions 35A and 35C at both sides of the central heat generation portion 35B. The central heat generation portion 35B and the end heat generation portions 35A and 35C are configured by the resistive heat generators 31. The end heat generation portions 35A and 35C can generate heat separately from the central heat generation portion 35B. For example, choosing a left electrode 33A and a central electrode 33B of the three electrodes 33A to 33C and applying a voltage between the left electrode 33A and the central electrode 33B in FIG. 43 causes the end heat generation portions 35A and 35C adjacent to both sides of the central heat generation portion 35B to generate heat. Applying the voltage between the left electrode 33A and the right electrode 33C causes the central heat generation portion 35B to generate heat. To fix the image onto a small sheet, the central heat generation portion 35B alone can generate heat. To fix the image onto a large sheet, all the heat generation portions 35A to 35C can generate heat. As a result, the heater in the fixing device can generate heat in accordance with the size of the sheet.

Figure 44:
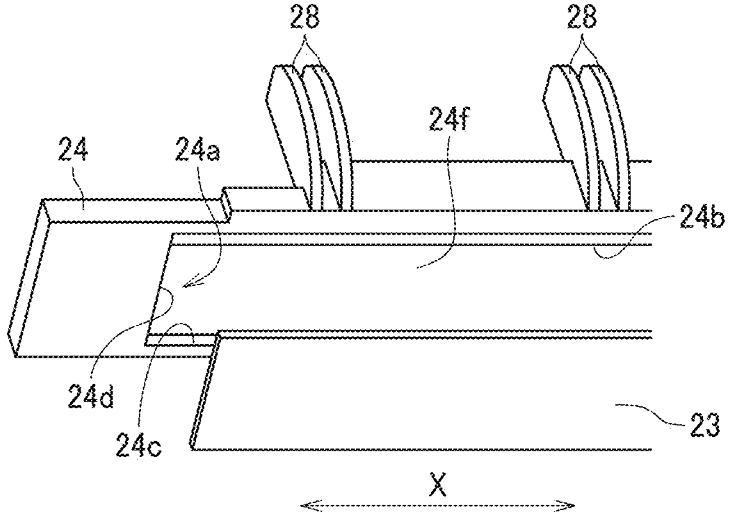
FIG. 44 is a partial perspective view of the heater and the nip formation pad illustrated in FIG. 42.

As illustrated in FIG. 44, the heater holder 24 according to the present embodiment includes a recessed portion 24*a* to receive and hold the heater 23. The recessed portion 24*a* is formed on the side of the heater holder 24 facing the heater 23. The recessed portion 24*a* has a bottom 24*f* formed in a rectangular shape substantially the same size as the heater 23, and four side walls 24*b*, 24*c*, 24*d*, and 24*e* disposed on four sides of the bottom 24*f*, respectively. In FIG. 44, the right side wall 24*e* is omitted. The recessed portion 24*a* may have an opening that opens toward one end in the longitudinal direction of the heater 23. The opening is configured by removing one of a pair of the left side wall 24*d* and the right side wall 24*e* that intersect the longitudinal direction X of the heater 23 (that is, the arrangement direction of the resistive heat generators 31).

Figure 45:
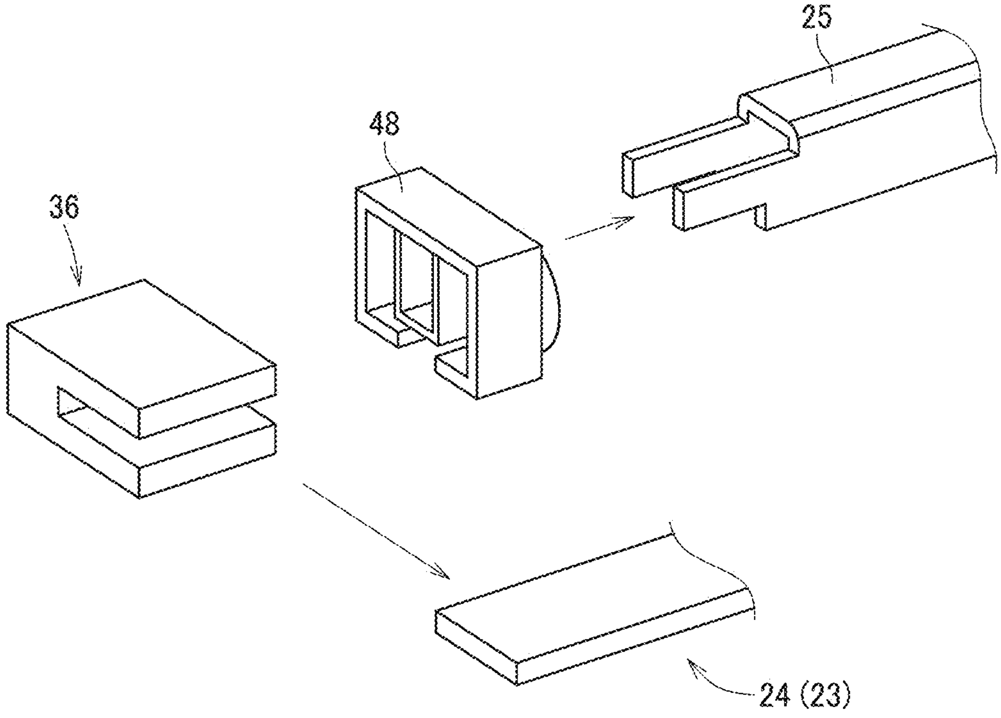
FIG. 45 is a view to illustrate a method of attaching a connector to the heater illustrated in FIG. 42.

As illustrated in FIG. 45, a connector 36 holds the heater 23 and the heater holder 24 according to the present embodiment. The connector 36 includes a housing made of resin such as LCP and multiple contact terminals fixed to the inner face of the housing.

To attach to the heater 23 and the heater holder 24, the connector 36 is moved in the direction intersecting the longitudinal direction X of the heater 23 that is the arrangement direction of the resistive heat generators 31 (see a direction indicated by an arrow extending from the connector 36 in FIG. 45). The connector 36 is attached to one end of the heater 23 and one end of the heater holder 24 in the longitudinal direction X of the heater 23 that is the arrangement direction of the resistive heat generators 31. The one end of the heater 23 and the one end of the heater holder 24 are farther from a portion in which the pressure roller 22 receives a driving force from a drive motor than the other end of the heater 23 and the other end of the heater holder 24, respectively. The connector 36 and the heater holder 24 may have a convex portion and a recessed portion to attach the connector 36 to the heater holder 24. The convex portion disposed on one of the connector 36 and the heater holder 24 engages with the recessed portion disposed on the other and relatively move in the recessed portion to attach the connector 36 to the heater holder 24.

After the connector 36 is attached to the heater 23 and the heater holder 24, the heater 23 and the heater holder 24 are sandwiched and held by the connector 36. In this state, the contact terminals contact and press against the electrodes of the heater 23, respectively, and the resistive heat generators 31 are electrically coupled to the power supply disposed in the image forming apparatus via the connector 36. As a result, the power supply can supply electric power to the resistive heat generators 31.

A pair of flanges 48 one of which is illustrated in FIG. 45 is a pair of belt holders contacting the inner circumferential surface of the fixing belt 21 at both ends of the fixing belt 21 in the longitudinal direction of the fixing belt 21 to hold the fixing belt 21. The flanges 48 are inserted into both ends of the stay 25 and fixed to a pair of side plates that are frame members of the fixing device, respectively.

Figure 46:
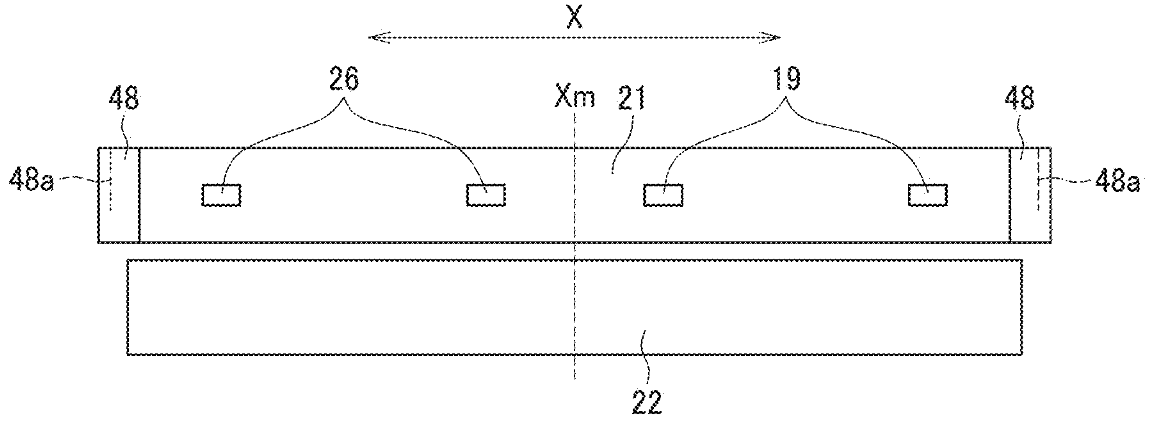
FIG. 46 is a diagram illustrating an arrangement of temperature sensors and thermostats included in the fixing device illustrated in FIG. 41.

FIG. 46 is a diagram illustrating an arrangement of temperature sensors 26 and thermostats 19 included in the fixing device according to the present embodiment. Each of the thermostats 19 cuts off a current flowing through the resistive heat generators under a certain condition.

As illustrated in FIG. 46, one of the temperature sensors 26 according to the present embodiment is disposed to face the inner circumferential surface of the fixing belt 21 near the center Xm of the fixing belt 21 in the longitudinal direction X of the fixing belt 21, and the other one of the temperature sensors 26 is disposed to face the inner circumferential surface of the fixing belt 21 near the end of the fixing belt 21 in the longitudinal direction X. One of the temperature sensors 26 is disposed at a position corresponding to the separation area B (see FIG. 43) between the resistive heat generators of the heater 23.

In addition, one of the thermostats 19 is disposed to face the inner circumferential surface of the fixing belt 21 near the center Xm of the fixing belt 21, and the other one of the thermostats 19 is disposed to face the inner circumferential surface of the fixing belt 21 near the end of the fixing belt 21. Each thermostat 19 detects the temperature of the inner circumferential surface of the fixing belt 21 or the ambient temperature in the vicinity of the inner circumferential surface of the fixing belt 21.

The thermostat 19 cuts off the current flowing to the heater 23 in response to detecting the temperature that exceeds a preset threshold value.

Figure 47:
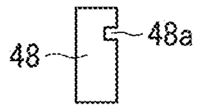
FIG. 47 is a schematic diagram illustrating a groove of a flange illustrated in FIG. 45.

As illustrated in FIGS. 46 and 47, flanges 48 to hold both ends of the fixing belt 21 each have a slide groove 48*a*. The slide groove 48*a* extends in a direction in which the fixing belt 21 moves toward and away from the pressure roller 22. An engaging portion of the housing of the fixing device engages with the slide groove 48*a*. The relative movement of the engaging portion in the slide groove 48*a* enables the fixing belt 21 to move toward and away from the pressure roller 22.

The embodiments of the present disclosure are also applicable to the fixing devices having the following configurations.

Figure 48:
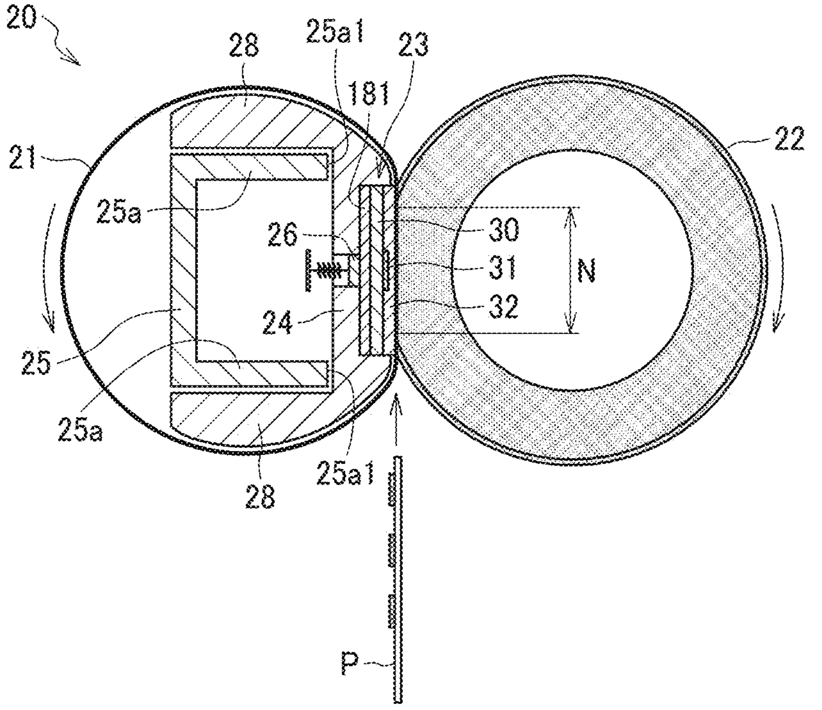
FIG. 48 is a cross-sectional view of a fixing device different from the fixing devices according to the above-described embodiments.

FIG. 48 is a schematic diagram illustrating a fixing device to which the above-described embodiments of the present disclosure can be applied.

The fixing device 20 illustrated in FIG. 48 includes the fixing belt 21 as the first rotator or the fixing rotator, the pressure roller 22 as the second rotator or the pressure rotator, the heater 23 as the heat source, the heater holder 24 as the heat source holder, the stay 25 as the reinforcement, the temperature sensor 26 (that is the thermistor) as the temperature detector, and a first high thermal conductor 181 as a thermal equalizer (in other words, a thermal conduction aid). The fixing belt 21 is the endless belt.

The pressure roller 22 is in contact with the outer circumferential surface of the fixing belt 21 to form the nip N between the pressure roller 22 and the fixing belt 21. The heater 23 heats the fixing belt 21. The heater holder 24 holds the heater 23 and the first high thermal conductor 181. The stay 25 supports the heater holder 24. The temperature sensor 26 detects the temperature of the first high thermal conductor 181. The direction orthogonal to the surface of the paper on which FIG. 48 is drawn is the longitudinal direction of the fixing belt 21, the pressure roller 22, the heater 23, the heater holder 24, the stay 25, and the first high thermal conductor 181, and this direction is referred to simply as the longitudinal direction below. The longitudinal direction is also the width direction of the conveyed sheet, the longitudinal direction of the fixing belt 21, and the axial direction of the pressure roller 22.

Like the heater illustrated in FIG. 43, the heater 23 illustrated in FIG. 48 includes the resistive heat generators 31 that are spaced from each other in the longitudinal direction of the heater 23.

In the heater 23 including the multiple resistive heat generators 31 arranged at intervals, the temperature of the heater 23 in the separation area B corresponding to the interval between the resistive heat generators 31 tends to be lower than the temperature of the heater 23 in a portion entirely occupied by the resistive heat generator 31. For this reason, the temperature of the fixing belt 21 corresponding to the separation area B also becomes low, which may cause an uneven temperature distribution of the fixing belt 21 in the longitudinal direction.

To prevent the above-described temperature drop in the separation area B and reduce the temperature unevenness in the longitudinal direction of the fixing belt 21, the heater 23 illustrated in FIG. 48 includes the first high thermal conductor 181. A detailed description is given below of the first high thermal conductor 181.

As illustrated in FIG. 48, the first high thermal conductor 181 is disposed between the heater 23 and the stay 25 in the lateral direction of FIG. 48 and is particularly sandwiched between the heater 23 and the heater holder 24. In other words, the first high thermal conductor 181 has one face in contact with the back side of the base 30 of the heater 23 and the other face (opposite the one face) in contact with the heater holder 24.

The stay 25 has two rectangular portions **25*a* extending in a thickness direction of the heater 23 and each having a contact surface 25*a*1 in contact with the back side of the heater holder 24 to support the heater holder 24, the first high thermal conductor 181, and the heater 23. In the direction intersecting the longitudinal direction that is the vertical direction in FIG. 48, the contact surfaces 25*a*1 are outside the resistive heat generators 31. The above-described structure prevents heat transfer from the heater 23 to the stay 25 and enables the heater 23 to effectively heat the fixing belt 21**.

Figure 49:
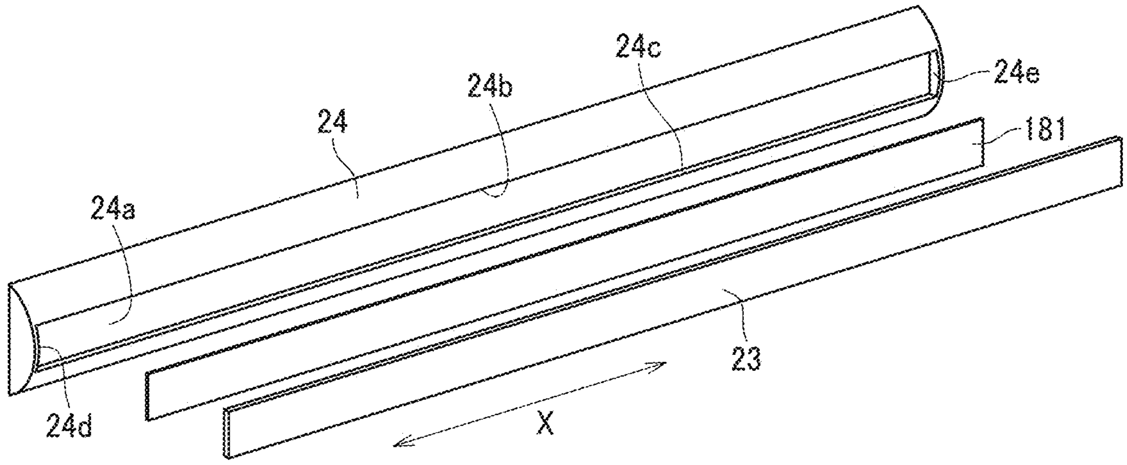
FIG. 49 is a perspective view of the heater, the first high thermal conductor, and the nip formation pad that are illustrated in FIG. 48.

As illustrated in FIG. 49, the first high thermal conductor 181 is a plate having a certain thickness such as 0 3 mm and having, for example, a length of 222 mm in the longitudinal direction, and a width of 10 mm in the direction intersecting the longitudinal direction. Although the first high thermal conductor 181 is a single plate according to the present embodiment, the first high thermal conductor 181 may have multiple parts. In FIG. 49, the guide 28 illustrated in FIG. 48 is omitted.

The first high thermal conductor 181 is fitted into the recessed portion **24*a* of the heater holder 24. The heater 23 is attached onto the first high thermal conductor 181. Thus, the first high thermal conductor 181 is sandwiched and held between the heater holder 24 and the heater 23. In FIG. 49, the length of the first high thermal conductor 181 in the longitudinal direction is substantially the same as the length of the heater 23 in the longitudinal direction. Both side walls 24*d* and 24*e* extending in a direction intersecting the longitudinal direction of the recessed portion 24*a* restrict movement of the heater 23 and movement of the first high thermal conductor 181 in the longitudinal direction and work as longitudinal direction regulators. Since the longitudinal displacement of the first high thermal conductor 181 in the fixing device is regulated, the thermal conduction efficiency is enhanced with respect to the target range in the longitudinal direction. Both side walls 24*b* and 24*c* extending in the longitudinal direction of the recessed portion 24*a* restrict movement of the heater 23 and movement of the first high thermal conductor 181** in the direction intersecting the longitudinal direction and work as direction-intersecting-arrangement-direction regulators.

Figure 50:
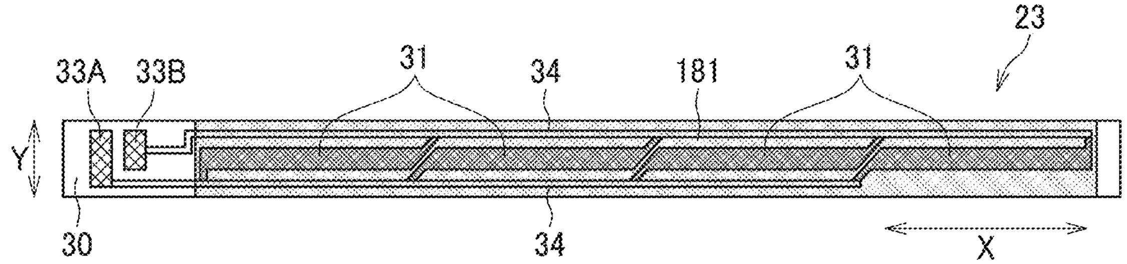
FIG. 50 is a plan view of a heater to illustrate an arrangement of a first high thermal conductor.

The range in which the first high thermal conductor 181 is disposed in the longitudinal direction indicated by the arrow X is not limited to the range illustrated in FIG. 49. For example, as illustrated in FIG. 50, the first high thermal conductor 181 may be disposed in only a longitudinal range in which the resistive heat generators 31 are disposed (see a hatched portion in FIG. 50).

Figure 51:
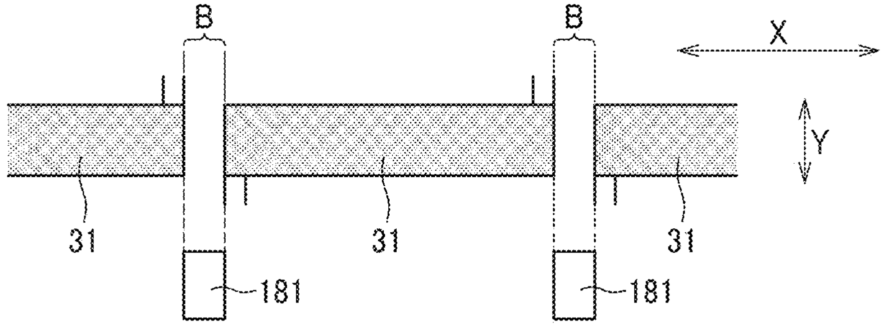
FIG. 51 is a schematic diagram illustrating another example of an arrangement of the first high thermal conductors in the heater that is different from the arrangement in FIG. 50.
Figure 52:
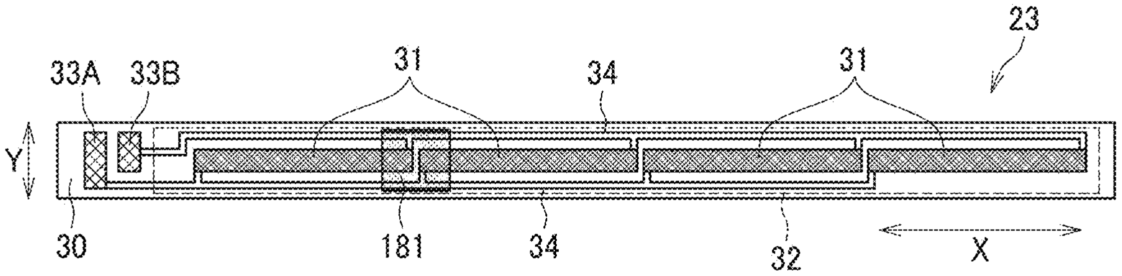
FIG. 52 is a plan view of a heater, illustrating still another example of an arrangement of the first high thermal conductor.

As illustrated in FIG. 51, the first high thermal conductors 181 may be disposed in only the entire separation areas at positions corresponding to the separation areas B (in other words, gap areas between the resistive heat generators) in the longitudinal direction indicated by the arrow X. Although the resistive heat generators 31 and the first high thermal conductor 181 are shifted in the vertical direction in FIG. 51 for convenience, the resistive heat generators 31 and the first high thermal conductor 181 are disposed at substantially the same position in the direction (indicated by double-head arrow Y) intersecting the longitudinal direction. The direction intersecting the longitudinal direction may be referred to simply as the direction Y in the following description. In addition, the first high thermal conductor 181 may be disposed over a part of the resistive heat generator 31 in the direction intersecting the longitudinal direction (the direction indicated by the arrow Y), or as in the example illustrated in FIG. 52, may be disposed so as to cover all the resistive heat generator 31 in the direction intersecting the longitudinal direction (the direction indicated by the arrow Y). As illustrated in FIG. 52, the first high thermal conductor 181 may be disposed to face a part of each of the neighboring resistive heat generators 31 in addition to the gap area between the neighboring resistive heat generators 31. The first high thermal conductor 181 may be disposed to face all separation areas B in the heater 23, one separation area B as illustrated in FIG. 52, or some of the separation areas B. At least a part of the first high thermal conductor 181 may be disposed to face the separation area B.

Due to the pressing force of the pressure roller 22, the first high thermal conductor 181 is sandwiched between the heater 23 and the heater holder 24 and is brought into close contact with the heater 23 and the heater holder 24. The first high thermal conductor 181 in contact with the heater 23 enhances the thermal conduction efficiency of the heater 23 in the longitudinal direction. The first high thermal conductor 181 facing the separation area B enhances the heat conduction efficiency of a part of the heater 23 facing the separation area B in the longitudinal direction, transmits heat to the part of the heater 23 facing the separation area B, and raise the temperature of the part of the heater 23 facing the separation area B. Thus, the first high thermal conductor 181 reduces the temperature unevenness of the heater 23 in the longitudinal direction and the temperature unevenness of the fixing belt 21 in the longitudinal direction. As a result, the above-described structure can prevent uneven fixing and uneven gloss in the image fixed on the sheet. Since the heater 23 does not need to generate additional heat to obtain a sufficient fixing performance in the part of the heater 23 facing the separation area B, energy consumption of the fixing device can be saved. In particular, the first high thermal conductor 181 disposed over the entire area in which the resistive heat generators 31 are arranged in the longitudinal direction enhances the heat transfer efficiency of the heater 23 over the entire area of a main heating region of the heater 23 (that is, an area facing an image formation area of the sheet passing through the fixing device) and reduces the temperature unevenness of the heater 23 and the temperature unevenness of the fixing belt 21 in the longitudinal direction.

In addition, the combination of the first high thermal conductor 181 and the resistive heat generator 31 having a Positive Temperature Coefficient (PTC) characteristic effectively prevents an overheating of the non-sheet passing region (that is the region of the fixing belt that is not in contact with the small sheet) of the fixing belt 21 when small sheets pass through the fixing device 20. The PTC characteristic is a characteristic in which the resistance value increases as the temperature increases, for example, a heater output decreases under a constant voltage. The resistive heat generator 31 having the PTC characteristic effectively reduces the amount of heat generated by the resistive heat generator 31 in the non-sheet passing region, and the first high thermal conductor 181 effectively transfers heat from the non-sheet passing region in which the temperature rises to a sheet passing region that is a region of the fixing belt contacting the sheet. As a result, the overheating of the non-sheet passing region is effectively prevented.

Figure 53:
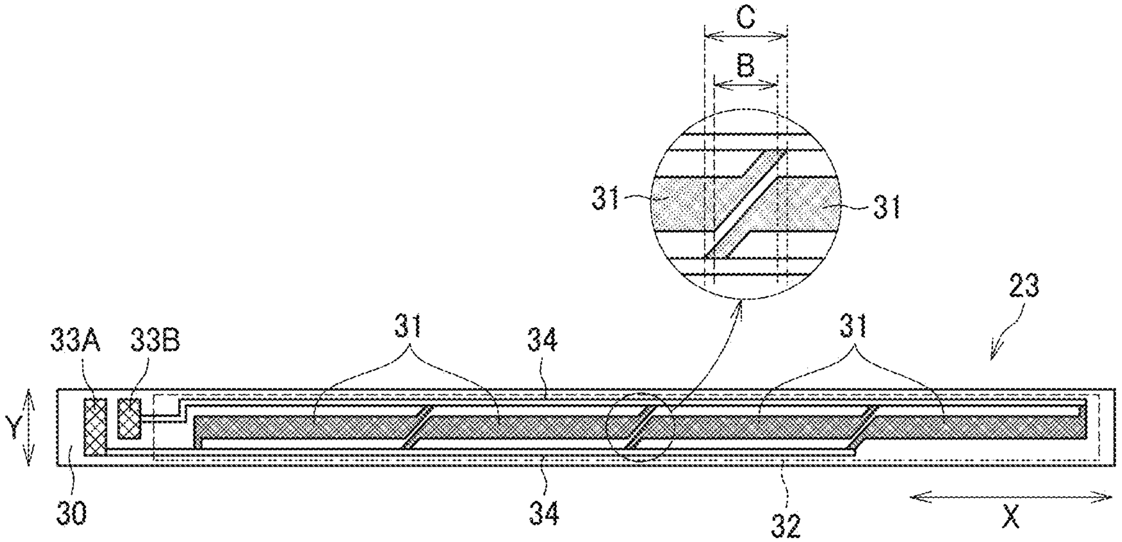
FIG. 53 is a plan view of a heater to illustrate enlarged separation areas.

The first high thermal conductor 181 may be disposed opposite an area around the separation area B because the small heat generation amount in the separation area B decreases the temperature of the heater 23 in the area around the separation area B. For example, the first high thermal conductor 181 facing an enlarged separation area C that includes the separation area B and an area around the separation area B as illustrated in FIG. 53 enhances the heat transfer efficiency of the separation area B and the area around the separation area B in the longitudinal direction and effectively reduces the temperature unevenness in the longitudinal direction of the heaters 23. The first high thermal conductor 181 facing the entire region in which all the resistive heat generators 31 are arranged in the longitudinal direction reduces the temperature unevenness of the heater 23 (and the fixing belt 21) in the longitudinal direction.

Figure 54:
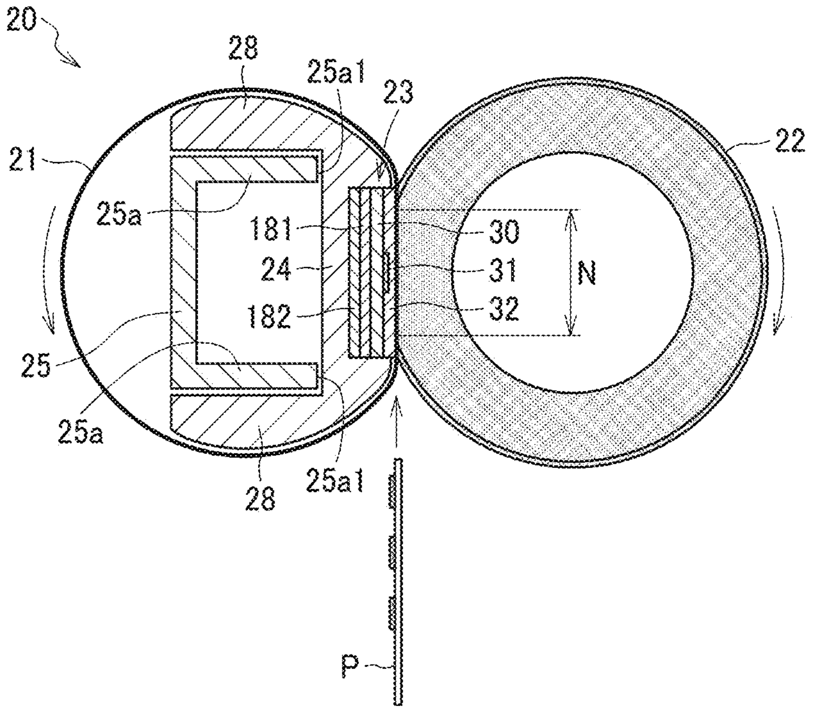
FIG. 54 is a cross-sectional view of a fixing device having a configuration different from the fixing devices according to the above-described embodiments.

FIG. 54 is a cross-sectional view of a fixing device having a configuration different from the fixing devices described above.

The fixing device 20 illustrated in FIG. 54 includes a second high thermal conductor 182 between the heater holder 24 and the first high thermal conductor 181. The second high thermal conductor 182 is disposed at positions different from the position of the first high thermal conductor 181 in the lateral direction in FIG. 54 that is a direction in which the heater holder 24, the stay 25, and the first high thermal conductor 181 are layered. Specifically, the second high thermal conductor 182 is disposed so as to overlap the first high thermal conductor 181. The fixing device in the present embodiment includes the temperature sensor 26 (that is, the thermistor), which is the same as the fixing device illustrated in FIG. 48. FIG. 54 illustrates a cross section in which the temperature sensor 26 is not disposed.

The second high thermal conductor 182 is made of a material having thermal conductivity higher than the thermal conductivity of the base 30, such as graphene or graphite. In the present embodiment, the second high thermal conductor 182 is made of a graphite sheet having a thickness of 1 mm. Alternatively, the second high thermal conductor 182 may be a plate made of aluminum, copper, or silver.

Figure 55:
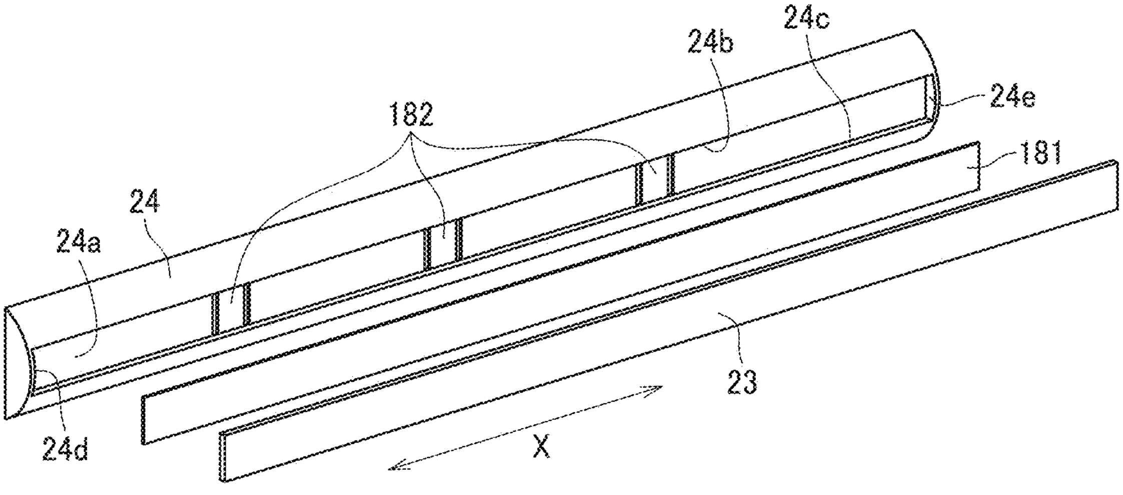
FIG. 55 is a perspective view of the heater, the first high thermal conductor, the second high thermal conductor, and the nip formation pad illustrated in FIG. 54.

As illustrated in FIG. 55, multiple second high thermal conductors 182 are arranged on the recessed portion **24*a* of the heater holder 24 at intervals in the longitudinal direction. The heater holder 24 has recesses deeper than the other portion. The second high thermal conductors 182 are disposed at the recesses. Clearances are formed between the heater holder 24 and both sides of the second high thermal conductor 182 in the longitudinal direction. The clearance prevents heat transfer from the second high thermal conductor 182 to the heater holder 24, and the heater 23 efficiently heats the fixing belt 21. In FIG. 55, the guide 28 illustrated in FIG. 54** is omitted.

Figure 56:
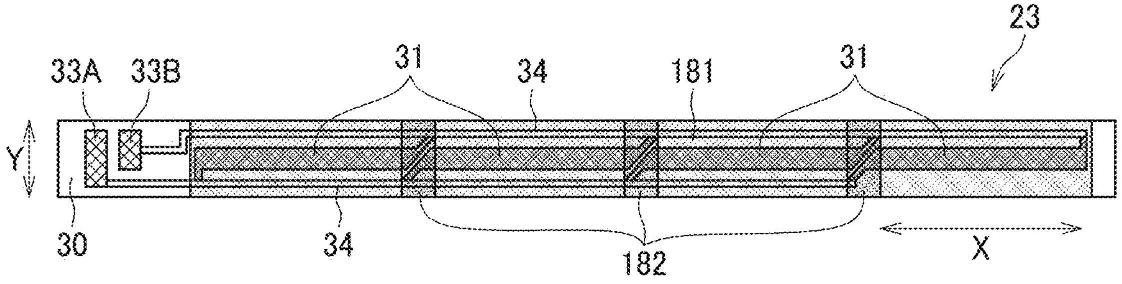
FIG. 56 is a plan view of a heater to illustrate an arrangement of second high thermal conductors on the first high thermal conductor.

As illustrated in FIG. 56, each of the second high thermal conductors 182 (see the hatched portions) is disposed at a position corresponding to the separation area B in the longitudinal direction indicated by the arrow X and faces at least a part of each of the neighboring resistive heat generators 31 in the longitudinal direction. In particular, each of the second high thermal conductors 182 in the present embodiment faces the entire separation area B. FIG. 56 (and FIG. 58 described below) illustrates the first high thermal conductor 181 facing the entire region in which all the resistive heat generators 31 are arranged in the longitudinal direction. The range in which the first high thermal conductor 181 is disposed in the longitudinal direction is not limited to the above.

Figure 57:
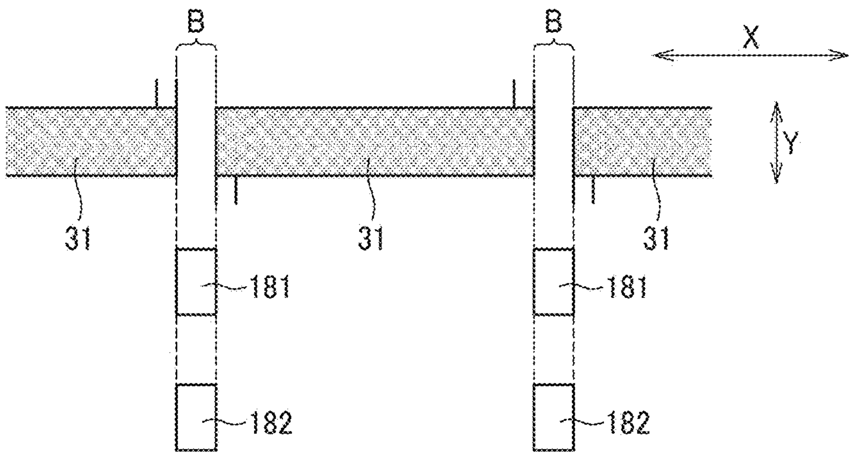
FIG. 57 is a schematic diagram of another arrangement of first high thermal conductors and second high thermal conductors.

The fixing device according to the present embodiment includes the second high thermal conductor 182 disposed at a position corresponding to the separation area B in the longitudinal direction and the position at which at least a part of each of the neighboring resistive heat generators 31 faces the second high thermal conductor 182 in addition to the first high thermal conductor 181. The above-described structure further enhances the heat transfer efficiency in the separation area B in the longitudinal direction and more efficiently reduces the temperature unevenness of the heater 23 in the longitudinal direction. As illustrated in FIG. 57, the first high thermal conductor 181 and the second high thermal conductor 182 may be disposed opposite the entire gap area between resistive heat generators 31. The above-described structure enhances the heat transfer efficiency of the part of the heater 22 corresponding to the gap area to be higher than the heat transfer efficiency of the other part of the heater 22. In FIG. 57, for the sake of convenience, the resistive heat generators 31, the first high thermal conductors 181, and the second high thermal conductors 182 are shifted in the vertical direction of FIG. 57 but are disposed at substantially the same position in the direction intersecting the longitudinal direction indicated by the arrow Y. However, the present disclosure is not limited to the above. The first high thermal conductor 181 and the second high thermal conductor 182 may be disposed opposite a part of the resistive heat generators 31 in the direction intersecting the longitudinal direction or may be disposed so as to cover the entire resistive heat generators 31 in the direction intersecting the longitudinal direction.

Both the first high thermal conductor 181 and the second high thermal conductor 182 may be made of a graphene sheet. The first high thermal conductor 181 and the second high thermal conductor 182 made of the graphene sheet have high thermal conductivity in a predetermined direction along the plane of the graphene, that is, not in the thickness direction but in the longitudinal direction. Accordingly, the above-described structure can effectively reduce the temperature unevenness of the fixing belt 21 in the longitudinal direction and the temperature unevenness of the heater 23 in the longitudinal direction.

Figure 60:
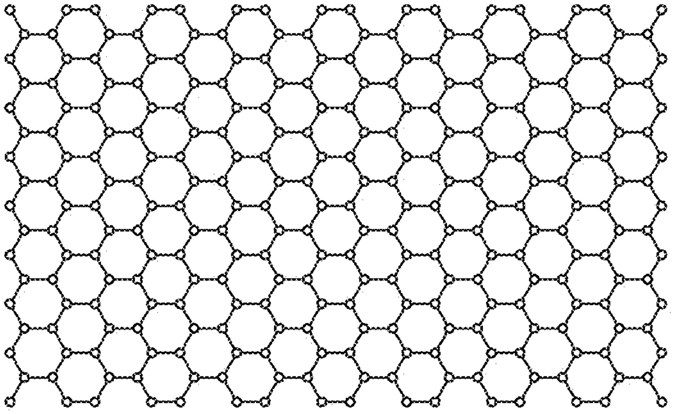
FIG. 60 is a schematic diagram illustrating a two-dimensional atomic crystal structure of graphene.

Graphene is a flaky powder. Graphene has a planar hexagonal lattice structure of carbon atoms, as illustrated in FIG. 60. The graphene sheet is typically a single layer. The graphene sheet may contain impurities in a single layer of carbon or may have a fullerene structure. The fullerene structures are typically recognized as compounds including an even number of carbon atoms, which form a cage-like fused ring polycyclic system with five and six membered rings, including, for example, C60, C70, and C80 fullerenes or other closed cage structures having three-coordinate carbon atoms.

Graphene sheets are artificially made by, for example, a chemical vapor deposition (CVD) method.

The graphene sheet is commercially available. The size and thickness of the graphene sheet or the number of layers of the graphite sheet described below are measured by, for example, a transmission electron microscope (TEM).

Figure 61:
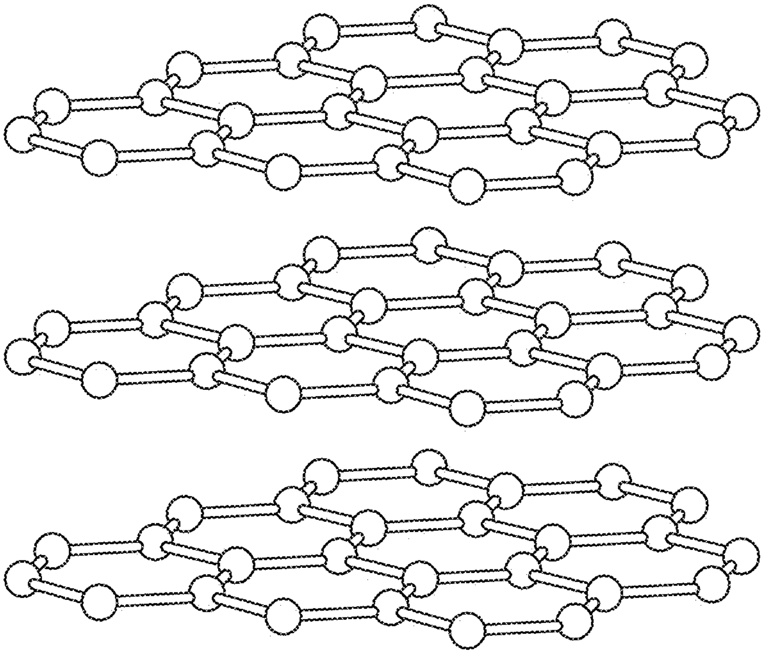
FIG. 61 is a schematic diagram illustrating a three-dimensional atomic crystal structure of graphite.

Graphite obtained by multilayering graphene has a large thermal conduction anisotropy. As illustrated in FIG. 61, the graphite has a crystal structure formed by layering a number of layers each having a condensed six membered ring layer plane of carbon atoms extending in a planar shape. Among carbon atoms in this crystal structure, adjacent carbon atoms in the layer are coupled by a covalent bond, and carbon atoms between layers are coupled by a van der Waals bond. The covalent bond has a larger bonding force than a van der Waals bond. Therefore, there is a large anisotropy between the bond between carbon atoms in a layer and the bond between carbon atoms in different layers. In other words, the first high thermal conductor 181 and the second high thermal conductor 182 that are made of graphite each have the heat transfer efficiency in the arrangement direction larger than the heat transfer efficiency in the thickness direction of the first high thermal conductor 181 and the second high thermal conductor 182 (that is, the stacking direction of these components), reducing the heat transferred to the heater holder 24. Accordingly, the above-described structure can efficiently decrease the temperature unevenness of the heater 23 in the longitudinal direction and can minimize the heat transferred to the heater holder 24. Since the first high thermal conductor 181 and the second high thermal conductor 182 that are made of graphite are not oxidized at about 700 degrees or lower, the first high thermal conductor 181 and the second high thermal conductor 182 each have an excellent heat resistance.

The physical properties and dimensions of the graphite sheet may be appropriately changed according to the function required for the first high thermal conductor 181 or the second high thermal conductor 182. For example, the anisotropy of the thermal conduction can be increased by using high-purity graphite or single-crystal graphite or by increasing the thickness of the graphite sheet. Using a thin graphite sheet can reduce the thermal capacity of the fixing device so that the fixing device can perform high-speed printing. A width of the first high thermal conductor 181 or a width of the second high thermal conductor 182 in the direction intersecting the longitudinal direction may be increased in response to a large width of the nip N or a large width of the heater 23.

From the viewpoint of increasing mechanical strength, the number of layers of the graphite sheet is preferably 11 or more. The graphite sheet may partially include a single layer portion and a multilayer portion.

Figure 58:
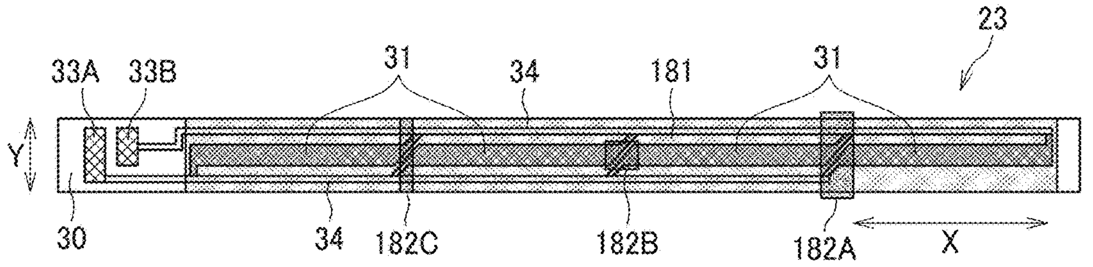
FIG. 58 is a plan view of a heater, illustrating still another example of the arrangement of the second high thermal conductor.

As long as the second high thermal conductor 182 faces a part of each of the neighboring resistive heat generators 31 and at least a part of the gap area between the neighboring resistive heat generators 31, the configuration of the second high thermal conductor 182 is not limited to the configuration illustrated in FIG. 56. For example, as illustrated in FIG. 58, a second high thermal conductor 182A may be longer than the base 30 in the direction intersecting the longitudinal direction indicated by the arrow Y, and both ends of the second high thermal conductor 182A in the direction intersecting the longitudinal direction may be outside the base 30 in FIG. 58. A second high thermal conductor 182B may be disposed in a range in which the resistive heat generators 31 are provided in the direction Y. A second high thermal conductor 182C may be disposed to face a part of the gap area and a part of each of the neighboring resistive heat generators 31.

Figure 59:
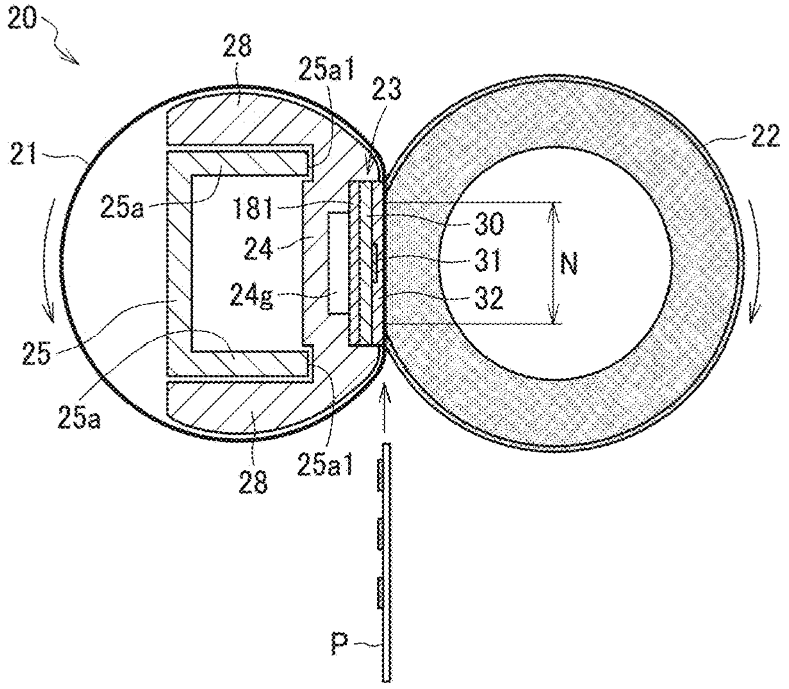
FIG. 59 is a cross-sectional view of a fixing device having a configuration different from the fixing devices according to the above-described embodiments.

The fixing device according to an embodiment illustrated in FIG. 59 has a gap between the first high thermal conductor 181 and the heater holder 24 in the thickness direction that is the lateral direction in FIG. 59. In other words, the fixing device has a gap **24*g* serving as a thermal insulation layer in a part of a region of the recessed portion 24*a* (see FIG. 55) of the heater holder 24 in which the heater 23, the first high thermal conductor 181, and the second high thermal conductors 182 are disposed. The gap 24*g* is in the part of the region of the recessed portion 24*a* in the longitudinal direction, and the second high thermal conductor 182 is not in the part. For this reason, FIG. 59 does not include the second high thermal conductor 182. The gap 24*g* has a depth deeper than the depth of the recessed portion 24*a* of the heater holder 24. The above-described structure minimizes the contact area between the heater holder 24 and the first high thermal conductor 181. The gap 24*g* prevents heat transfer from the first high thermal conductor 181 to the heater holder 24, and the heater 23 efficiently heats the fixing belt 21. In the cross section of the fixing device at a longitudinal position in which the second high thermal conductor 182 is disposed, the second high thermal conductor 182 is in contact with the heater holder 24 as illustrated in FIG. 54** of the above-described embodiment.

The gap **24*g* in the present embodiment is in an entire area in which the resistive heat generators 31 are disposed in the direction intersecting the longitudinal direction that is the vertical direction in FIG. 59. The above-described configuration efficiently prevents heat transfer from the first high thermal conductor 181 to the heater holder 24, and the heater 23 efficiently heats the fixing belt 21. The fixing device may include a thermal insulation layer made of heat insulator having a lower thermal conductivity than the thermal conductivity of the heater holder 24 instead of a space like the gap 24***g* serving as the thermal insulation layer.

In the present embodiment, the second high thermal conductor 182 is different from the first high thermal conductor 181, but the present embodiment is not limited to this. For example, the first high thermal conductor 181 may have a thicker portion than the other portion so that the thicker portion faces the separation area B and functions as the second high thermal conductor 182.

In the above, various configurations of the fixing device and the image forming apparatus in which the embodiments of the present disclosure can be applied are described. Applying the embodiments to the various configurations of the fixing device and the image forming apparatus gives effects similar to the above-described effects in the embodiments. Applying any one of the above-described embodiments of the present disclosure to any one of the above-described fixing devices can reduce the discharge of FP/UFP to the outside. As a result, the environmentally friendly image forming apparatus reducing the discharge of FP/UFP can be provided.

In the above description, the embodiments of the present disclosure are applied to the fixing device incorporated in the electrophotographic image forming apparatus as illustrated in FIG. 1. However, the present disclosure is not limited to this. The embodiments of the present disclosure may be applied to a heating device other than the fixing device, such as a drying device that is included in an inkjet image forming apparatus and dries liquid such as ink applied to a sheet.

Figure 62:
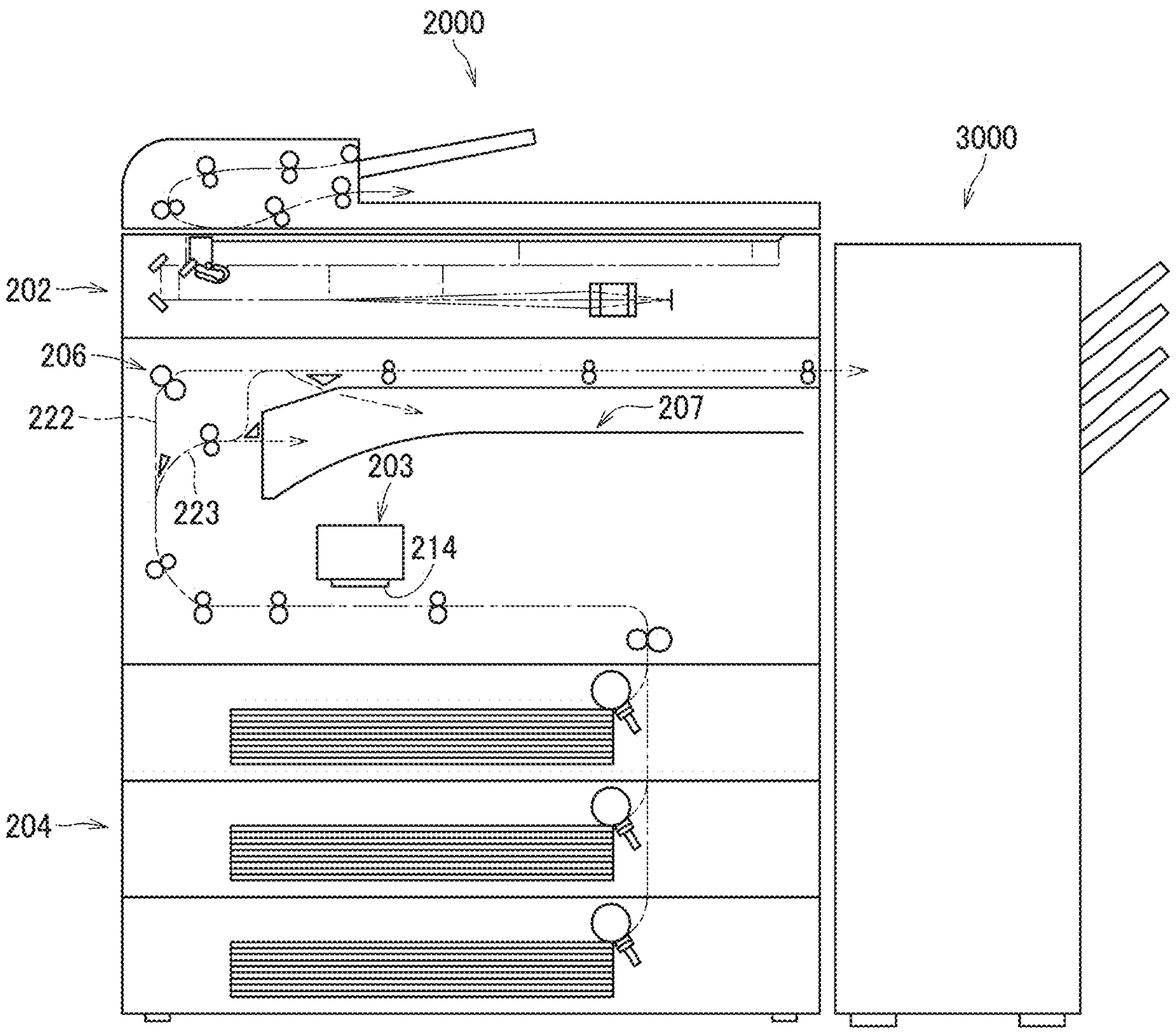
FIG. 62 is a schematic cross-sectional view of an inkjet image forming apparatus including a drying device according to an embodiment of the present disclosure.

FIG. 62 is a schematic cross-sectional view of an inkjet image forming apparatus including a drying device according to an embodiment of the present disclosure.

An inkjet image forming apparatus 2000 illustrated in FIG. 62 includes an image reading device 202, an image forming device 203, a sheet supplying device 204, a drying device 206, and an output section 207. A sheet aligning apparatus 3000 is disposed beside the inkjet image forming apparatus 2000.

In response to an instruction to start a printing operation, the sheet supplying device 204 feeds a sheet such as a sheet of paper as a recording medium in the inkjet image forming apparatus 2000. When the sheet is conveyed to the image forming device 203, the image forming device 203 discharges ink from a liquid discharge head 214 to the sheet according to the image data of a document read by the image reading device 202 or print data instructed to print by a terminal, to form an image on the sheet.

The sheet bearing the image is selectively guided to a conveyance passage 222 or a conveyance passage 223. When the sheet is guided to the conveyance passage 222, the sheet passes through the drying device 206. When the sheet is guided to the conveyance passage 223, the sheet does not pass through the drying device 206. When the sheet is guided to the drying device 206, the drying device 206 accelerates the drying of the ink on the sheet. The sheet is then guided to the output section 207 or the sheet aligning apparatus 3000. By contrast, when the sheet is guided to the conveyance passage 223 along which the sheet does not pass through the drying device 206, the sheet is directly guided to the output section 207 or the sheet aligning apparatus 3000. The sheet aligning apparatus 3000 aligns and places the sheets guided to the sheet aligning apparatus 3000.

Figure 63:
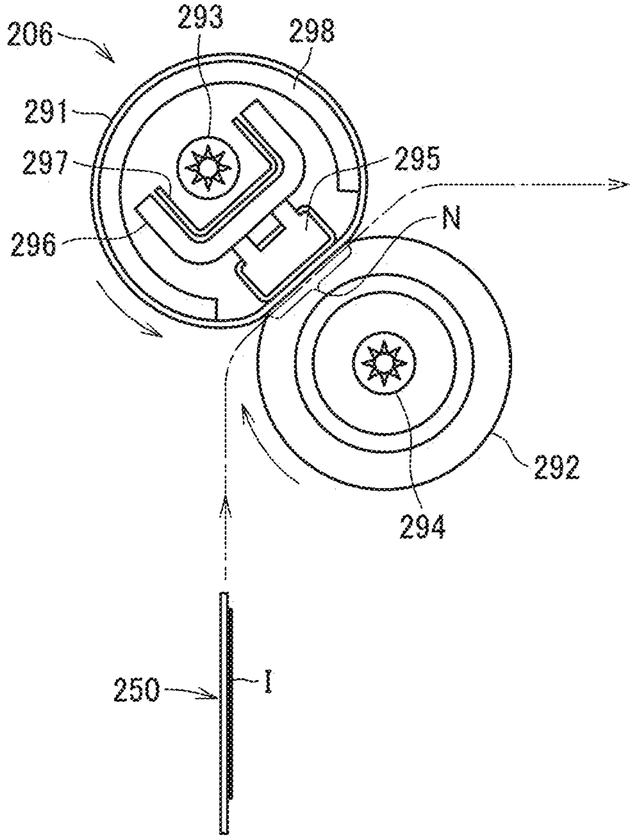
FIG. 63 is a schematic cross-sectional view of the drying device of FIG. 62.

FIG. 63 is a schematic cross-sectional view of the drying device 206 installed in the inkjet image forming apparatus 2000.

As illustrated in FIG. 63, the drying device 206 includes a heating belt 291 as the first rotator, a heating roller 292 as the second rotator, a first heater 293 as the heat source that heats the heating belt 291, a second heater 294 as the heat source that heats the heating roller 292, a nip formation pad 295, a stay 296 as the reinforcement, a reflector 297, and belt holders 298 as the rotator holders that hold the heating belt 291 such that the heating belt 291 can rotate.

The nip formation pad 295 contacts an outer peripheral surface of the heating roller 292 via the heating belt 291 to form a nip N between the heating belt 291 and the heating roller 292. As illustrated in FIG. 63, when a sheet 250 bearing an image formed by the ink I is conveyed to the nip N of the drying device 206, the sheet 250 is heated while being conveyed by the heating belt 291 and the heating roller 292 rotating in the directions indicated by arrows in FIG. 63. Thus, the drying of the ink I on the sheet 250 is accelerated.

In the drying device 206 installed in the inkjet image forming apparatus 2000, since the heating belt 291 is rotatably held by the pair of belt holders 298 disposed at both ends of the heating belt 291 in the longitudinal direction of the heating belt 291, the lubricant is used to reduce sliding friction between the heating belt 291 and the belt holder 298. As a result, heating the heating belt 291 causes the temperature rise of the belt holder 298, which may generate the FP/UFP from the lubricant adhering to the belt holder 298. Accordingly, applying any one of the embodiments of the present disclosure to the drying device 206 and placing the cover covering the opening of the rotator holder (that is the belt holder 298) supporting the heating belt 291 can reduce the discharge of the FP/UFP from the heating belt 291 to the outside.

Figure 64:
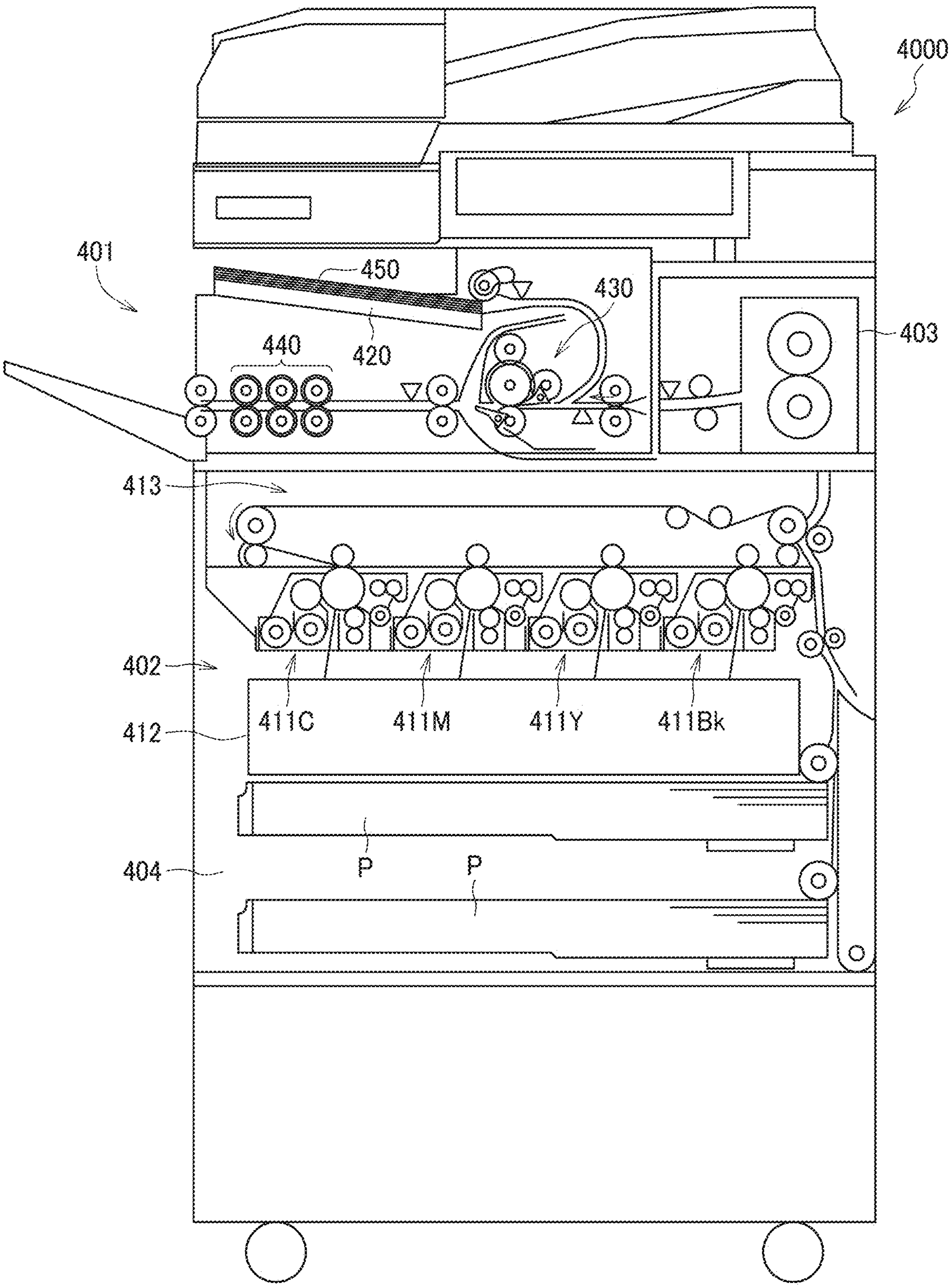
FIG. 64 is a schematic cross-sectional view of an image forming apparatus including a laminating device according to an embodiment of the present disclosure.

FIG. 64 is a schematic cross-sectional view of an image forming apparatus including a laminating device to which any one of the embodiments of the present disclosure is applicable.

An image forming apparatus 4000 that is illustrated in FIG. 64 includes a laminator 401, an image forming device 402, a fixing device 403, and a sheet feeding device 404 as a recording-medium supplier. The image forming device 402 includes multiple image forming units 411C, 411M, 411Y, and 411Bk, an exposure device 412, and a transfer device 413.

The laminator 401 is a heating device that applies heat and pressure to two sheets between which another sheet is inserted, to fix said another sheet between the two sheets under the heat and the pressure. Specifically, the laminator 401 includes a sheet supplier 420, a sheet separator 430, and heat and pressure rollers 440. The sheet supplier 420 supplies a sheet 450. The sheet separator 430 separates the sheet supplied from the sheet supplier 420 into two sheets. The heat and pressure rollers 440 as rotators convey the two separated sheets between which said another sheet is inserted, while applying heat and pressure to the sheets and said another sheet. The thermal pressure roller 440 is heated by a heat source such as the heater. A pair of rotator holders such as a pair of bearings rotatably holds both ends of the heat and pressure roller 440 in the longitudinal direction of the heat and pressure roller 440.

The sheet feeding device 404 supplies the sheet P as the recording medium to the image forming device 402, and the image forming device 402 forms an image on the sheet P. Subsequently, the sheet P is conveyed to the fixing device 403 to fix the image onto the sheet P. Since the image forming operation in the image forming device 402 and the fixing process in the fixing device 403 are basically the same as those described in the above embodiments, a redundant description is omitted.

The sheet P subjected to the fixing process is conveyed to the laminator 401 and inserted between two sheets separated from each other. Then, the heat and pressure rollers 440 apply heat and pressure to the sheet P sandwiched between the two sheets to fix the sheet P between the sheets. The sheets and the sheet P thus thermally pressed and fixed are ejected to the outside of the image forming apparatus 4000.

The heat source such as the heater heats the heat and pressure roller 440, which may cause the temperature rise of the lubricant inside the heat and pressure roller 440. As a result, the FP/UFP may be generated. Accordingly, applying any one of the embodiments of the present disclosure to the laminator 401 including the above-described heat and pressure roller 440 and placing the cover covering the opening of the rotator holder supporting the heat and pressure roller 440 can reduce the discharge of the FP/UFP from the heat and pressure roller 440 to the outside.

The embodiments described above are given by way of example, and unique advantageous effects are achieved for each of the following aspects given below.

First Aspect

In a first aspect, a heating device includes a rotator, a heater, lubricant, a rotator support, and a cover. The rotator has an internal space inside a loop of the rotator. The heater heats the rotator. The lubricant is applied to an inner circumferential surface of the rotator. The rotator support supports an end of the rotator in a longitudinal direction of the rotator. The rotator support has a first opening communicating with the internal space of the rotator and penetrating through the rotator support to extend in the longitudinal direction. The cover covers the first opening and has a second opening communicating between the internal space of the rotator and an external space outside the cover.

Second Aspect

In a second aspect, the second opening in the heating device according to the first aspect is at a position different from the first opening in a plane orthogonal to the longitudinal direction of the rotator.

Third Aspect

In a third aspect, the second opening in the heating device according to the first aspect or the second aspect is spaced apart from the first opening in the longitudinal direction.

Fourth Aspect

In a fourth aspect, the second opening in the heating device according to any one of the first to third aspects is below the first opening.

Fifth Aspect

In a fifth aspect, the second opening in the heating device according to any one of the first to fourth aspects has an opening area having 25% or less of a surface area of an internal space of the cover.

Sixth Aspect

In a sixth aspect, the cover in the heating device according to any one of the first to fifth aspects has an internal space having a volume that is equal to or larger than 8 $cm^3$.

Seventh Aspect

In a seventh aspect, the heating device according to any one of the first to sixth aspects further includes a conductive wire passing through the second opening and connected to the heater.

Eighth Aspect

In an eighth aspect, the cover in the heating device according to any one of the first to seventh aspects supports the heater.

Ninth Aspect

In a ninth aspect, a fixing device includes the heating device according to any one of the first to eighth aspects.

Tenth Aspect

In a tenth aspect, an image forming apparatus includes the heating device according to any one of the first to eighth aspects.

The above-described embodiments are illustrative and do not limit the present disclosure. Thus, numerous additional modifications and variations are possible in light of the above teachings. For example, elements and/or features of the embodiment and variation may be combined with each other and/or substituted for each other within the scope of the present disclosure.

The advantages achieved by the embodiments described above are examples and therefore are not limited to those described above.

The invention claimed is:

1. A heating device which is an image forming apparatus fixing device, the heating device comprising:

a rotator having an internal space inside a loop of the rotator;

a heater to heat the rotator;

lubricant applied to an inner circumferential surface of the rotator;

a rotator support to support an end of the rotator in a longitudinal direction of the rotator, the rotator support having a first opening:

communicating with the internal space of the rotator; and penetrating through the rotator support to extend in the longitudinal direction; and a cover covering the first opening, the cover having a second opening communicating between the internal space of the rotator and an external space outside the cover, the cover including an internal space to retain particles of the lubricant received from the first opening, the second opening located in the internal space of the cover.

2. The heating device according to claim 1, wherein:

the second opening is at a position different from the first opening in a plane orthogonal to the longitudinal direction of the rotator.

3. The heating device according to claim 1, wherein;

the second opening is spaced apart from the first opening in the longitudinal direction.

4. The heating device according to claim 1, wherein: the second opening is below the first opening.

5. The heating device according to claim 1, wherein: the second opening has an opening area having 25% or less of a surface area of an internal space of the cover.

6. The heating device according to claim 1, wherein: the internal space of the cover has a volume that is equal to or larger than 8 $cm^3$.

7. The heating device according to claim 1, further comprising: a conductive wire passing through the second opening and connected to the heater.

8. The heating device according to claim 1, wherein; the cover supports the heater.

9. A fixing device comprising: the heating device according to claim 1.

10. An image forming apparatus comprising: the heating device according to claim 1.

11. The heating device according to claim 1, wherein: the rotator is an endless belt.

12. The heating device according to claim 11, further comprising: a pressure roller pressed against an outer circumferential surface of the endless belt to form a nip therebetween.

13. The heating device according to claim 1, wherein: the heater is a planar heater including at least one resistive heat generator.

14. The heating device according to claim 1, wherein: the rotator support includes a side plate, and the cover is attached to an outer face of the side plate.

15. The heating device according to claim 14, wherein: the cover includes an attachment plate having a hole to receive a fastener to attach the cover to the side plate.

16. The heating device according to claim 1, wherein: the cover is box-shaped and includes a bottom wall that faces the first opening and a plurality of side walls that surround a periphery of the first opening.

17. The heating device according to claim 16, wherein: the second opening penetrates the bottom wall of the cover.

18. The heating device according to claim 1, wherein: the cover has a hemispherical shape.

19. The heating device according to claim 1, wherein: the cover includes a heat-resistant material selected from the group consisting of resin and metal.

20. A heating device which is an image forming apparatus fixing device, the heating device comprising:

a rotator having an internal space inside a loop of the rotator;

a heater to heat the rotator;

lubricant applied to an inner circumferential surface of the rotator;

a rotator support to support an end of the rotator in a longitudinal direction of the rotator, the rotator support having a first opening:

communicating with the internal space of the rotator; and penetrating through the rotator support to extend in the longitudinal direction;

a cover covering the first opening, the cover having a second opening communicating between the internal space of the rotator and an external space outside the cover; and a conductive wire passing through the second opening and connected to the heater.

* * * * *